United States Patent
Pan et al.

(10) Patent No.: US 11,943,724 B2
(45) Date of Patent: Mar. 26, 2024

(54) BROADCAST CHANNEL TRANSMISSION AND DEMODULATION

(71) Applicant: INTERDIGITAL PATENT HOLDINGS, INC., Wilmington, DE (US)

(72) Inventors: Kyle Jung-Lin Pan, Saint James, NY (US); Fengjun Xi, San Diego, CA (US); Steven Ferrante, Doylestown, PA (US); Chunxuan Ye, San Diego, CA (US); Janet A. Stern-Berkowitz, Little Neck, NY (US); Nirav B. Shah, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 569 days.

(21) Appl. No.: 16/482,871

(22) PCT Filed: Jan. 26, 2018

(86) PCT No.: PCT/US2018/015430
§ 371 (c)(1),
(2) Date: Aug. 1, 2019

(87) PCT Pub. No.: WO2018/144337
PCT Pub. Date: Aug. 9, 2018

(65) Prior Publication Data
US 2019/0357159 A1    Nov. 21, 2019

Related U.S. Application Data

(60) Provisional application No. 62/454,621, filed on Feb. 3, 2017, provisional application No. 62/500,702, filed on
(Continued)

(51) Int. Cl.
*H04W 56/00* (2009.01)
*H04L 1/00* (2006.01)
(Continued)

(52) U.S. Cl.
CPC ......... *H04W 56/001* (2013.01); *H04L 1/0071* (2013.01); *H04L 1/1861* (2013.01);
(Continued)

(58) Field of Classification Search
CPC ............. H04W 56/001; H04W 72/046; H04W 72/0466; H04L 1/0071; H04L 1/1861; H04L 5/0007; H04L 5/0051; H04L 5/10
(Continued)

(56) References Cited

U.S. PATENT DOCUMENTS

| 9,184,882 B2 | 11/2015 | Adjakple et al. |
| 9,271,288 B2 | 2/2016 | Chen et al. |

(Continued)

FOREIGN PATENT DOCUMENTS

| CN | 104104636 A | 10/2014 |
| EP | 3634040 A1 | 4/2020 |

(Continued)

OTHER PUBLICATIONS

El Hattachi et al., "NGMN 5G White Paper," Version 1.0 (Feb. 2015).

(Continued)

*Primary Examiner* — Rasheed Gidado
(74) *Attorney, Agent, or Firm* — Volpe Koenig

(57) ABSTRACT

A method and apparatus are disclosed for demodulating a NR-PBCH signal. The method may comprise receiving a primary SS and an SSS. The received SSS signal may be used as a reference signal to detect demodulation reference signals of the NR-PBCH. These demodulation reference signals may be interleaved with data on the NR-PBCH. In one method, the NR-PBCH DMRS are associated with an SSB index in an effort to improve randomization in the synchronization process. The NR-PBCH payload may be demodulated using the PSS and/or SSS and the DMRS. In
(Continued)

one embodiment, the NR-PBCH DMRS may mapped to DMRS REs on a frequency first and time second mapping basis.

16 Claims, 33 Drawing Sheets

Related U.S. Application Data on May 3, 2017, provisional application No. 62/519,751, filed on Jun. 14, 2017, provisional application No. 62/543,155, filed on Aug. 9, 2017.

(51) Int. Cl.
| | |
|---|---|
| H04L 1/18 | (2023.01) |
| H04L 1/1829 | (2023.01) |
| H04L 5/00 | (2006.01) |
| H04L 5/10 | (2006.01) |
| H04W 72/04 | (2023.01) |
| H04W 72/044 | (2023.01) |

(52) U.S. Cl.
CPC .......... *H04L 5/0007* (2013.01); *H04L 5/0051* (2013.01); *H04L 5/10* (2013.01); *H04W 72/046* (2013.01); *H04W 72/0466* (2013.01)

(58) Field of Classification Search
USPC ......................................................... 370/329
See application file for complete search history.

(56) References Cited

U.S. PATENT DOCUMENTS

| | | | |
|---|---|---|---|
| 9,674,827 B2 | 6/2017 | Liu et al. | |
| 9,735,942 B2 | 8/2017 | Xu et al. | |
| 10,349,365 B2 | 7/2019 | Seo et al. | |
| 2011/0237283 A1 | 9/2011 | Shan et al. | |
| 2012/0250642 A1 | 10/2012 | Qu et al. | |
| 2013/0194931 A1 | 8/2013 | Lee et al. | |
| 2013/0287064 A1 | 10/2013 | Seo et al. | |
| 2014/0177562 A1* | 6/2014 | Li | H04L 5/0064 370/329 |
| 2015/0023263 A1 | 1/2015 | Son et al. | |
| 2016/0043849 A1 | 2/2016 | Lee et al. | |
| 2018/0091341 A1* | 3/2018 | Sadiq | H04L 5/0008 |
| 2018/0131489 A1* | 5/2018 | Ly | H04L 5/0023 |
| 2018/0192404 A1* | 7/2018 | Maaref | H04L 5/0044 |
| 2018/0198659 A1* | 7/2018 | Ko | H04L 5/005 |
| 2018/0279388 A1* | 9/2018 | Miao | H04W 76/10 |
| 2019/0140806 A1* | 5/2019 | Andersson | H04L 27/2666 |
| 2020/0067755 A1* | 2/2020 | Pan | H04L 27/2656 |
| 2020/0221403 A1* | 7/2020 | Gao | H04W 72/005 |

FOREIGN PATENT DOCUMENTS

| | | |
|---|---|---|
| RU | 2289883 C2 | 12/2006 |
| RU | 2595952 C2 | 8/2016 |
| WO | 2006130502 A2 | 12/2006 |
| WO | 2009109854 A2 | 9/2009 |
| WO | WO-2011015065 A1 * | 2/2011 ........... H04B 7/0413 |
| WO | 2018/068723 A1 | 4/2018 |
| WO | 2018/191011 A1 | 10/2018 |

OTHER PUBLICATIONS

Huawei et al., "NR Primary and Secondary Synchronization Signals Design," 3GPP TSG RAN WG1 Meeting #87, R1-1611261, Reno, USA (Nov. 14-18, 2016).
Interdigital Communications, "On NR-PBCH Transmission," 3GPP TSG RAN WG1 Meeting #88bis, R1-1705500, Spokane, Washington, USA (Apr. 3-7, 2017).
Interdigital Communications, "On System Information Delivery in NR," 3GPP TSG RAN WG1 Meeting #88bis, R1-1705501, Spokane, Washington, USA (Apr. 3-7, 2017).
Interdigital Inc., "On DMRS Designs for NR-PBCH," 3GPP TSG RAN WG1 Nr AH#2, R1-1710918, Qingdao, P.R. China (Jun. 27-30, 2017).
Interdigital Inc., "On NR Physical Broadcast Channel," 3GPP TSG RAN WG1 Meeting #89, R1-1708327, Hangzhou, P.R. China (May 15-19, 2017).
International Telecommunication Union, "IMT Vision—Framework and overall objectives of the future development of IMT for 2020 and beyond; M Series Mobile, radio determination, amateur and related satellite services," Recommendation ITU-R M.2083-0 (Sep. 2015).
Mediatek Inc., "TDM Based Unified SS Block Design for Both Above and Below 6 GHz," 3GPP TSG RAN WG1 Ad Hoc Meeting, R1-1700159, Spokane, Washington, USA (Jan. 16-20, 2017).
Nokia et al., "DL Signals for Mobility Measurements in NR," 3GPP TSG-RAN WG1 NR Ah Meeting, R1-1701063, Spokane, Washington, USA (Jan. 16-20, 2017).
Nokia et al., "SS Bandwidth, Numerology and Multiplexing," 3GPP TSG-RAN WG1 NR AH Meeting, R1-1701056, Spokane, Washington, USA (Jan. 16-20, 2017).
Third Generation Partnership Project, "Technical Specification Group Radio Access Network; NR; Physical channels and modulation (Release 15)," 3GPP TS 38.211 V15.0.0 (Dec. 2017).
Third Generation Partnership Project, "Technical Specification Group Radio Access Network; Study on Scenarios and Requirements for Next Generation Access Technologies; (Release 14)," 3GPP TR 38.913 V0.3.0 (Mar. 2016).
Third Generation Partnership Project, "Technical Specification Group Radio Access Network; Study on Scenarios and Requirements for Next Generation Access Technologies; (Release 14)," 3GPP TR 38.913 V14.3.0 (Jun. 2017).
Third Generation Partnership Project, "Technical Specification Group Radio Access Network; Study on Scenarios and Requirements for Next Generation Access Technologies; (Release 14)," 3GPP TR 38.913 V14.1.0 (Dec. 2016).
Third Generation Partnership Project, "Technical Specification Group Radio Access Network; Evolved Universal Terrestrial Radio Access (E-UTRA); Physical channels and modulation (Release 14)," 3GPP TS 36.211 V14.1.0 (Dec. 2016).
Third Generation Partnership Project, "Technical Specification Group Radio Access Network; Evolved Universal Terrestrial Radio Access (E-UTRA); Physical channels and modulation (Release 15)," 3GPP TS 36.211 V15.0.0 (Dec. 2017).
Third Generation Partnership Project, "Technical Specification Group Radio Access Network; Evolved Universal Terrestrial Radio Access (E-UTRA); Physical channels and modulation (Release 14)," 3GPP TS 36.211 V14.5.0 (Dec. 2017).
Zte et al., "Idle mode RRM measurements," 3GPP TSG-RAN WG1 NR AH Meeting, R1-1700106, Spokane, Washington, USA (Jan. 16-20, 2017).
Zte et al., "NR-PBCH and Delivery of Minimum SI," 3GPP TSG-RAN WG1 NR AH Meeting, R1-1700101, Spokane, Washington, USA (Jan. 16-20, 2017).
LG Electronics, "NR PDCH Design," 3GPP TSG RAN WG1 NR Ad-Hoc Meeting, R1-1700460, Spokane, USA (Jan. 16-20, 2017).
Mediatek Inc., "Broadcast channel design for system information acquisition," 3GPP TSG RAN WG1 AH_NR Meeting, R1-1700151, Spokane, USA (Jan. 16-20, 2017).
Zte et al., "Considerations on SS block design," 3GPP TSG RAN WG1 Meeting #87, R1-1611268, Reno, USA (Nov. 14-18, 2016).
Qualcomm Incorporated, "Multi-beam SYNC design," 3GPP TSG RAN WG1 Meeting #86b, R1-1610159, Lisbon, Portugal (Oct. 10-14, 2016).
Fujitsu, "Consideration on timing indication based on SS block," 3GPP TSG RAN WG1 NR Ad-Hoc#2, R1-1710231, Qingdao, P.R. China (Jun. 27-30, 2017).
Fujitsu, "Discussion on DMRS for NR-PBCH," 3GPP TSG RAN WG1 NR Ad-Hoc#2, R1-1710232, Qingdao, P.R. China (Jun. 27-30, 2017).

(56) References Cited

OTHER PUBLICATIONS

Intel Corporation, "SS block composition," 3GPP TSG RAN WG1 Meeting #89, R1-1707337, Hangzhou, P.R. China (May 15-19, 2017).
Nokia et al., "Remaining details on SS sequence design," 3GPP TSG RAN WG1 Meeting #89, R1-1708231, Hangzhou, P.R. China (May 15-19, 2017).
Sony, "Considerations on SS block Compositions," 3GPP TSG RAN WG1 Nr Ad-Hoc#2, R1-1711658, Qingdao, P.R. China (Jun. 27-30, 2017).
Kinwei, "Discussion on timing indication based on SS block," 3GPP TSG RAN WG1 NR Ad-Hoc#2, R1-1710223, Qingdao, P.R. China (Jun. 27-30, 2017).

\* cited by examiner

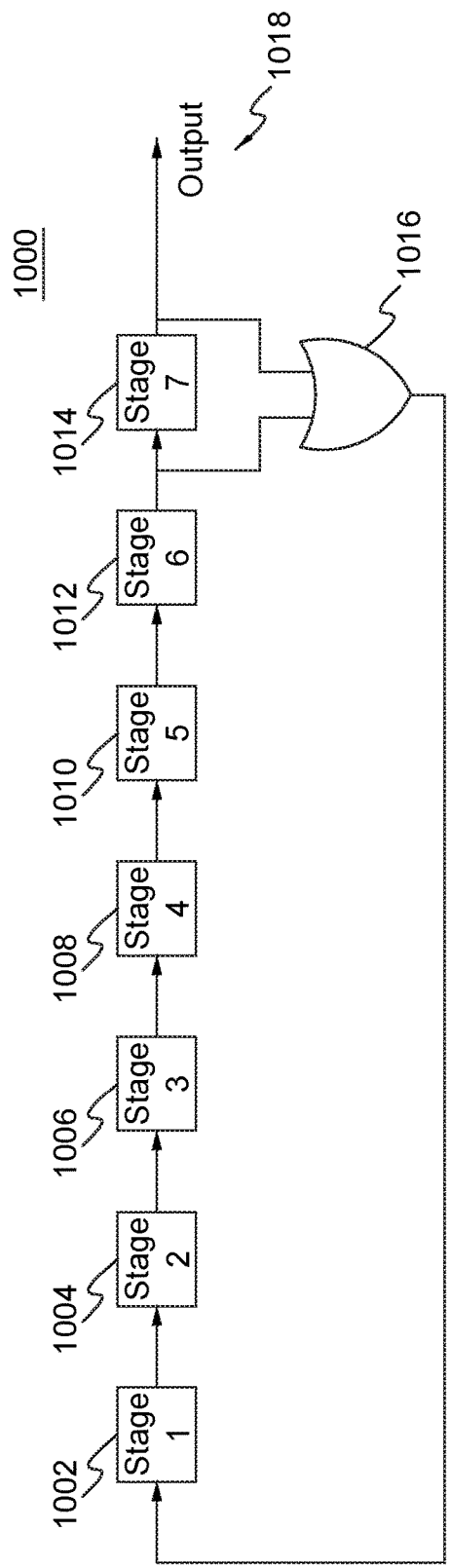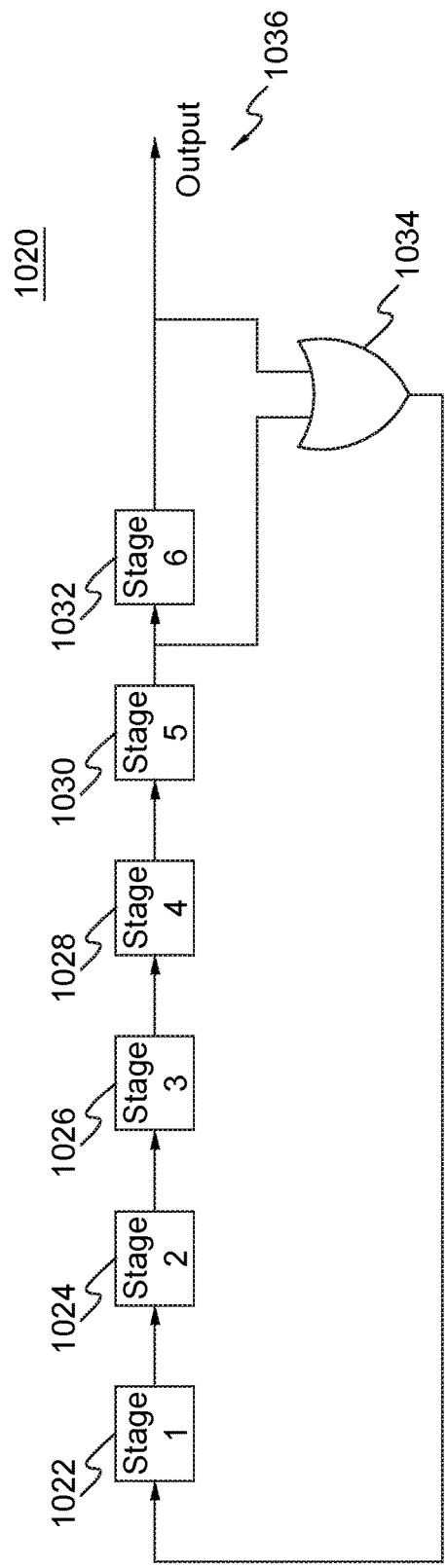

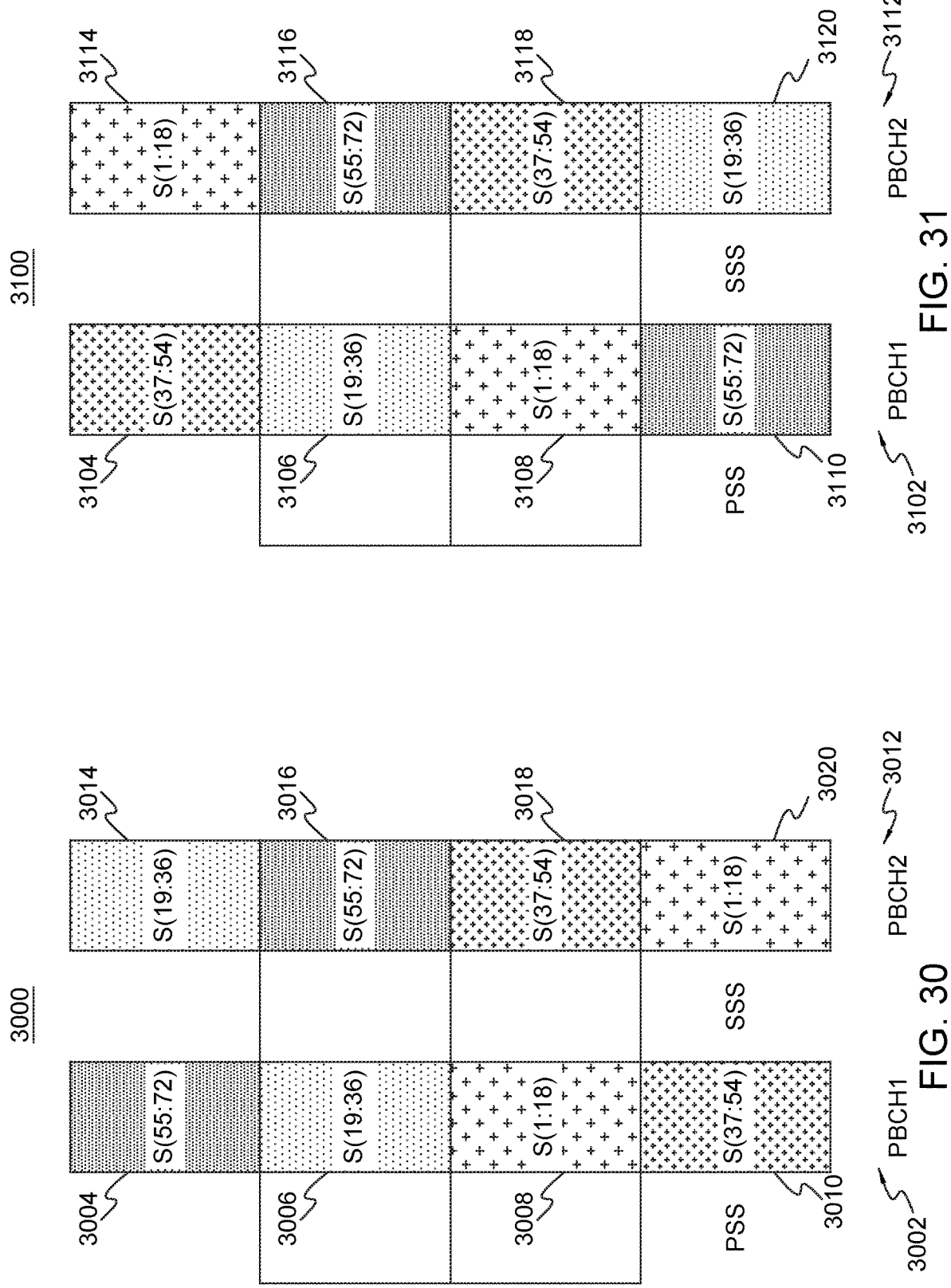

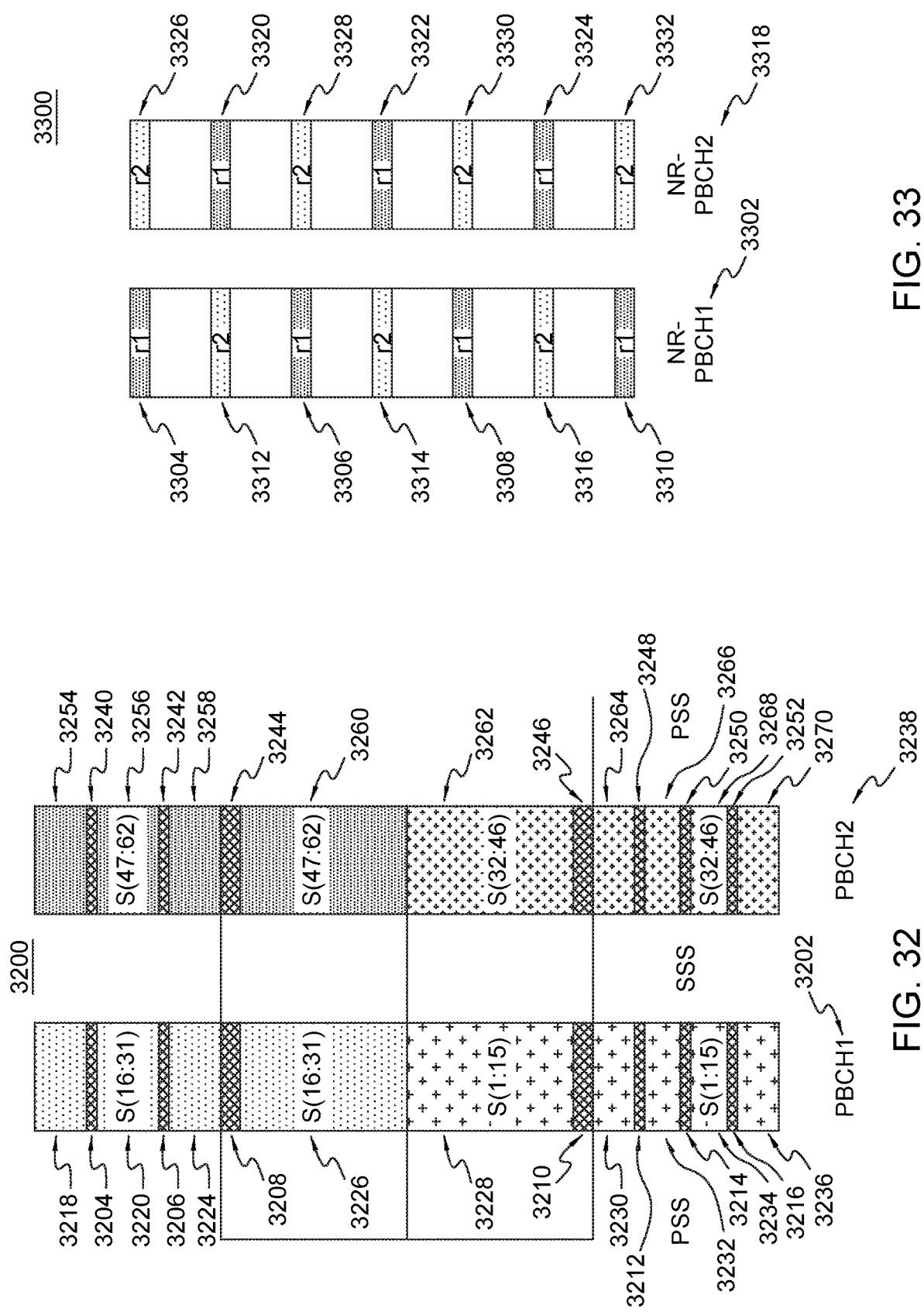

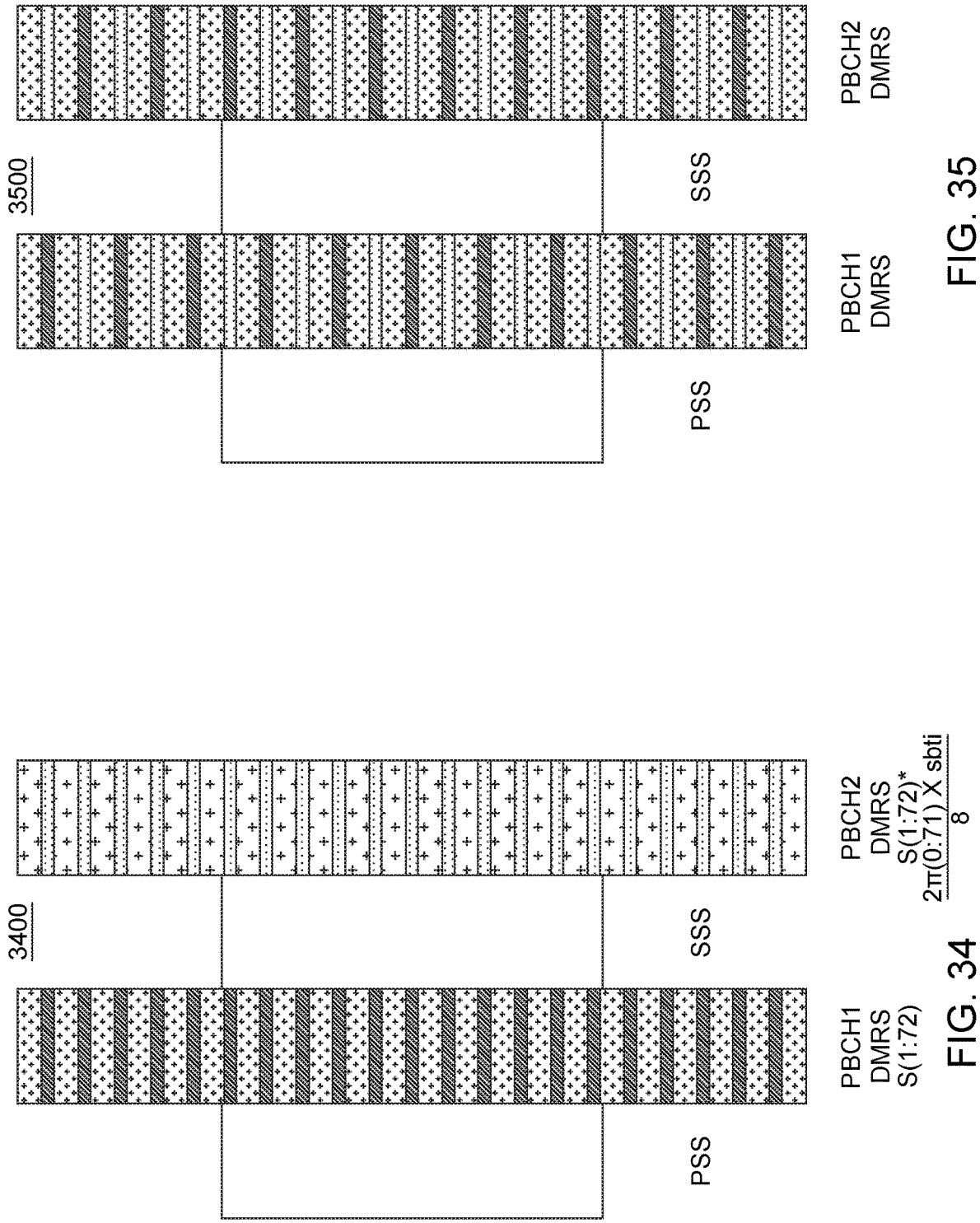

Table 1: Values of DMRS REs with Cyclic shifts using SBTI

FIG. 36

| | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| 0 | 1.0+0.0i | 1.0+0.0i | 1.0+0.0i | 1.0+0.0i | 1.0+0.0i | 1.0+0.0i | 1.0+0.0i | 1.0+0.0i | 1.0+0.0i | 1.0+0.0i | 1.0+0.0i | 1.0+0.0i | 1.0+0.0i | 1.0+0.0i | 1.0+0.0i | 1.0+0.0i | 1.0+0.0i | 1.0+0.0i |
| 1 | 1.0+0.0i | 0.7+0.7i | 0.0+1.0i | -0.7+0.7i | -1.0+0.0i | -0.7-0.7i | -0.0-1.0i | 0.7-0.7i | 1.0-0.0i | 0.7+0.7i | 0.0+1.0i | -0.7+0.7i | -1.0+0.0i | -0.7-0.7i | -0.0-1.0i | 0.7-0.7i | 1.0-0.0i | 0.7+0.7i |
| 2 | 1.0+0.0i | 0.0+1.0i | -1.0+0.0i | -0.0-1.0i | 1.0-0.0i | 0.0+1.0i | -1.0+0.0i | -0.0-1.0i | 1.0-0.0i | 0.0+1.0i | -1.0+0.0i | -0.0-1.0i | 1.0-0.0i | -0.0+0.0i | -1.0+0.0i | -0.0-1.0i | 1.0-0.0i | -0.0+0.0i |
| 3 | 1.0+0.0i | -0.7+0.7i | -0.0-1.0i | 0.7+0.7i | -1.0+0.0i | 0.7-0.7i | 0.0+1.0i | -0.7-0.7i | 1.0-0.0i | -0.7+0.7i | -0.0-1.0i | 0.7+0.7i | -1.0+0.0i | 0.7-0.7i | -0.0+1.0i | -0.7-0.7i | 1.0-0.0i | -0.0+0.7i |
| 4 | 1.0+0.0i | -1.0+0.0i | 1.0-0.0i | -1.0+0.0i | 1.0-0.0i | -1.0+0.0i | 1.0-0.0i | -1.0+0.0i | 1.0-0.0i | -1.0+0.0i | 1.0-0.0i | -1.0+0.0i | 1.0-0.0i | -1.0+0.0i | 1.0-0.0i | -1.0+0.0i | 1.0-0.0i | -1.0+0.0i |
| 5 | 1.0+0.0i | -0.7-0.7i | 0.0+1.0i | 0.7-0.7i | -1.0+0.0i | 0.7+0.7i | -0.0-1.0i | -0.7+0.7i | 1.0-0.0i | -0.7-0.7i | -0.0+1.0i | 0.7-0.7i | -1.0+0.0i | 0.7+0.7i | -0.0-1.0i | -0.7+0.7i | 1.0-0.0i | -0.0+0.7i |
| 6 | 1.0+0.0i | -0.0-1.0i | -1.0+0.0i | 0.0+1.0i | 1.0-0.0i | -0.0-1.0i | -1.0+0.0i | -0.0+1.0i | 1.0-0.0i | -0.0-1.0i | -1.0+0.0i | 0.0+1.0i | 1.0-0.0i | -0.0+1.0i | -1.0+0.0i | 0.0+0.0i | 1.0-0.0i | -0.0+0.0i |
| 7 | 1.0+0.0i | 0.7-0.7i | -0.0+1.0i | -0.7-0.7i | -1.0+0.0i | -0.7+0.7i | 0.0+1.0i | 0.7+0.7i | 1.0-0.0i | 0.7-0.7i | -0.0-1.0i | -0.7-0.7i | -1.0+0.0i | -0.0+0.7i | -0.0-1.0i | 0.7+0.7i | 1.0-0.0i | 0.7-0.7i |

BROADCAST CHANNEL TRANSMISSION AND DEMODULATION

CROSS REFERENCE TO RELATED APPLICATIONS

This application is a National Stage Entry of PCT Application No. PCT/US2018/015430 filed Jan. 26, 2018 and claims the benefit of U.S. Provisional Application Ser. No. 62/454,621 filed on Feb. 3, 2017, U.S. Provisional Application Ser. No. 62/500,702 filed on May 3, 2017, U.S. Provisional Application Ser. No. 62/519,751 filed on Jun. 14, 2017 and U.S. Provisional Application No. 62/543,155 filed on Aug. 9, 2017, the contents of each of which are hereby incorporated by reference herein.

BACKGROUND

Legacy cellular systems such as 4th Generation Long Term Evolution (LTE) employ relatively simple synchronization procedures. For example, in LTE a physical broadcast channel (PBCH) always uses the same bandwidth as both a primary synchronization signal (PSS) and secondary synchronization signal (SSS). As such, in Legacy LTE systems, both are allocated in the same 6 resource blocks (RBs) in the frequency domain. Because of the frequency correlation, a receiver of a wireless transmit/receive unit (WTRU) may utilize both the PSS and SSS as a reference signal for PBCH demodulation.

However, in New Radio (NR), a NR-PBCH may consume more bandwidth and may be allocated more RBs than NR-SSS. In NR, PBCH may occupy 24 RBs compared to 12 RBs of the SSS. Therefore, in NR, SSS is no longer a good reference signal for PBCH demodulation because of the disparity in terms of frequency.

Furthermore, in LTE, PBCH may also use a common reference signal (CRS) as a reference signal for PBCH demodulation when it is present. But in NR, CRS is not present due to the fact that NR attempts to minimize an always on signal. So, CRS is no longer suitable as a reference signal for NR-PBCH demodulation. For improved performance of NR-PBCH demodulation, accurate channel estimation may be required, especially when a one-shot detection is considered. Therefore, a new reference signal (RS) design for accurate and efficient NR-PBCH demodulation may be employed for a new NR-PBCH/NR-SS structure.

SUMMARY

A method and apparatus are disclosed for demodulating a New Radio PBCH (NR-PBCH) signal. The method may comprise receiving a primary SS (PSS) and a secondary synchronization signal (SSS). The received SSS signal may be used as a reference signal to detect demodulation reference signals of the NR-PBCH. These demodulation reference signals may be interleaved with data on the NR-PBCH. In one method, the NR-PBCH demodulation reference signals (DMRS) are associated with a synchronization signal block (SSB) index in an effort to improve randomization in the synchronization process.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 10A is a circuit diagram of a 7 stage M-sequence shifter;

FIG. 10B is a circuit diagram of a 6 stage M-sequence shifter;

FIG. 30 is an example of a combined time and frequency swapped repetition;

FIG. 31 is a second example of a combined time and frequency swapped repetition;

FIG. 32 is an example of a length 62 sequence with repetition in frequency;

FIG. 33 is an example of an NR-PBCH DMRS distribution of two sequences in a comb pattern;

FIG. 34 is an example of a DMRS and STBI indication using cyclic shifts;

FIG. 35 is an example of a DMRS and STBI indication using cyclic shifts in a comb pattern; and FIG. 36 is a sequence of rows which represent different cyclic shifts used to indicate SBTI.

DETAILED DESCRIPTION

Figure 1A:
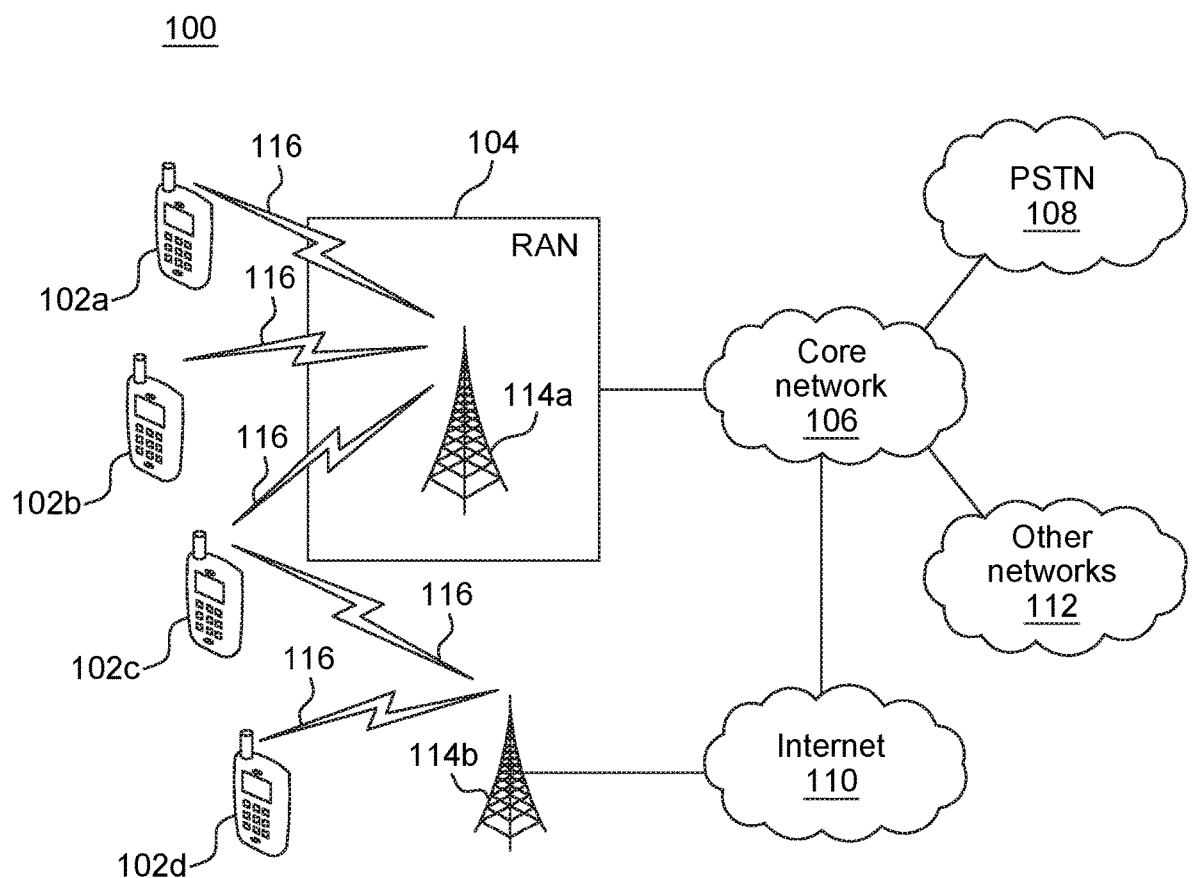
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
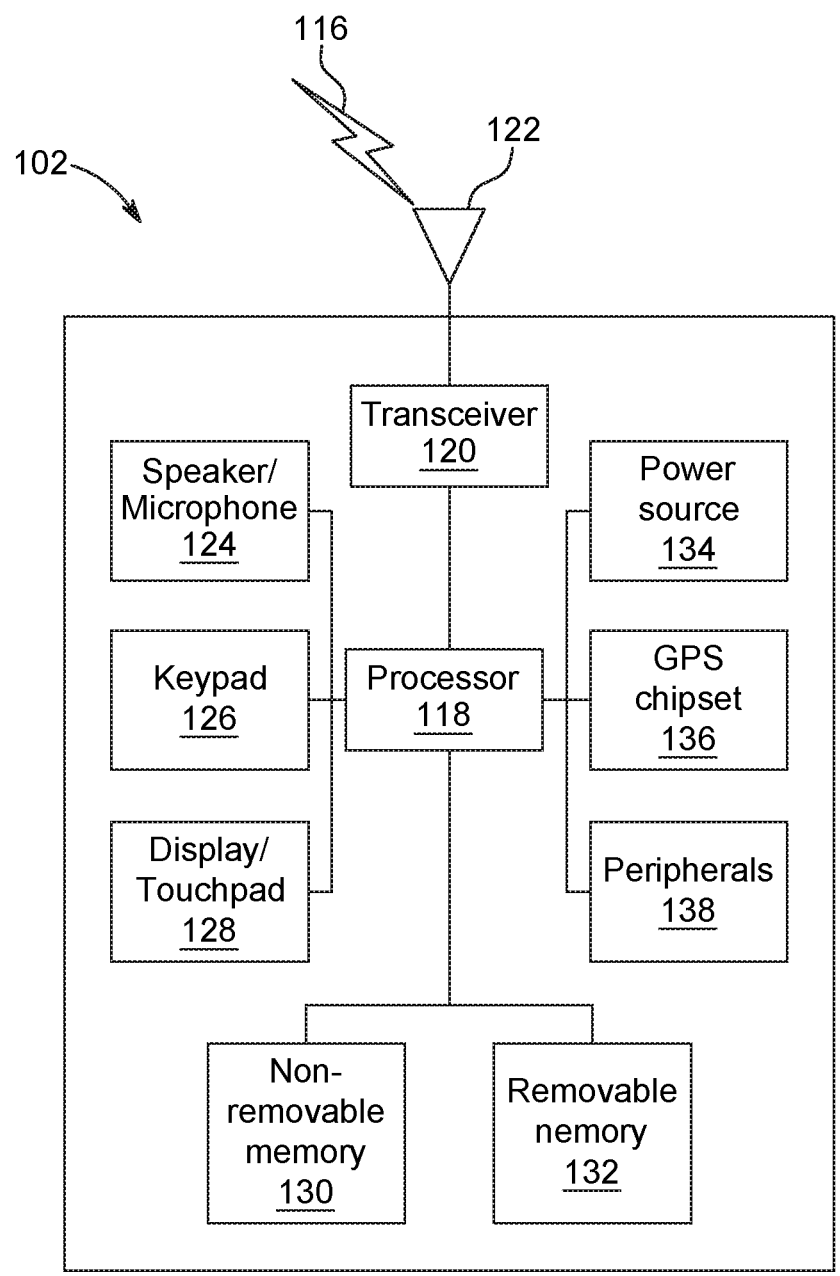
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
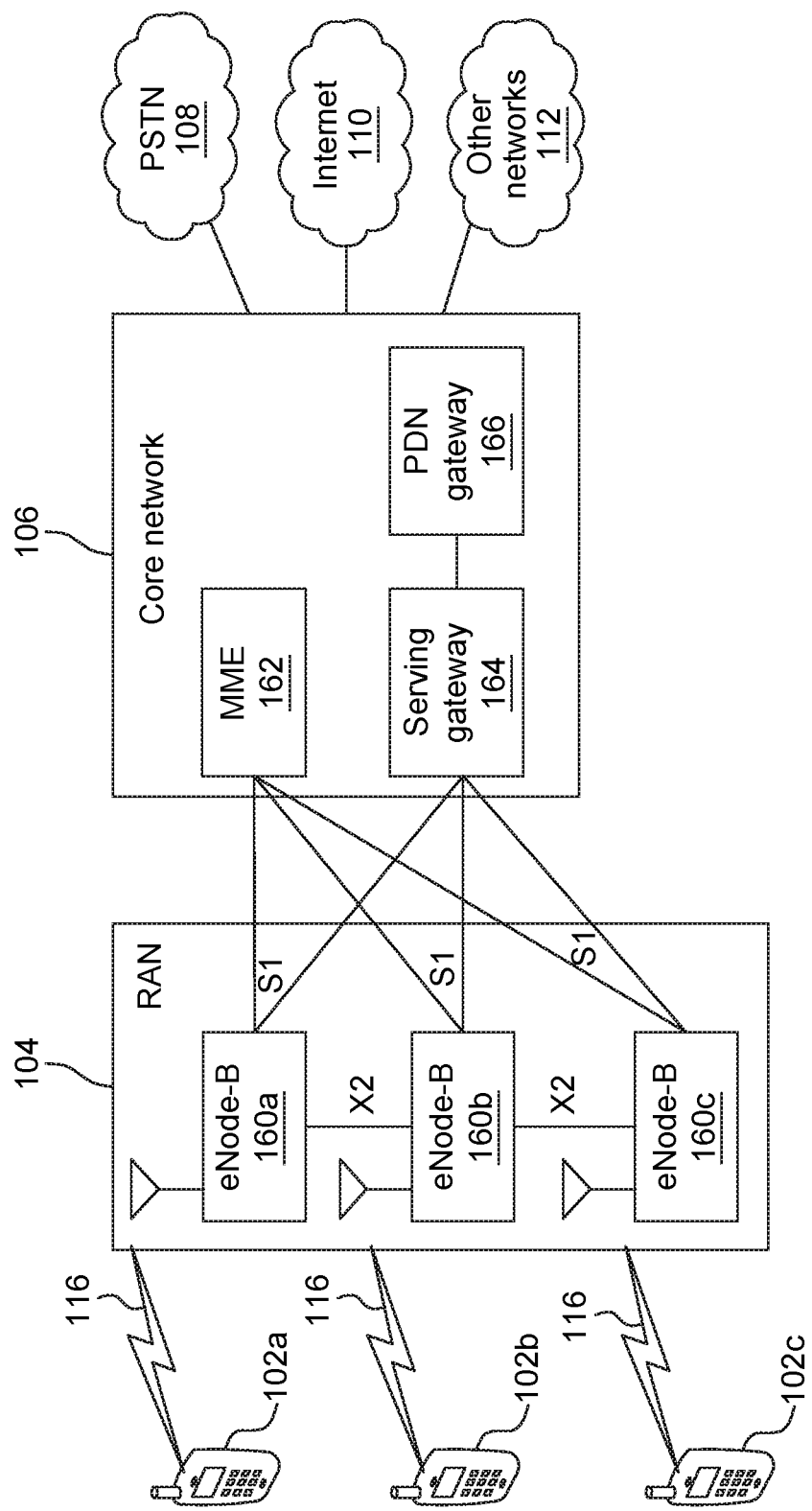
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz.

In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
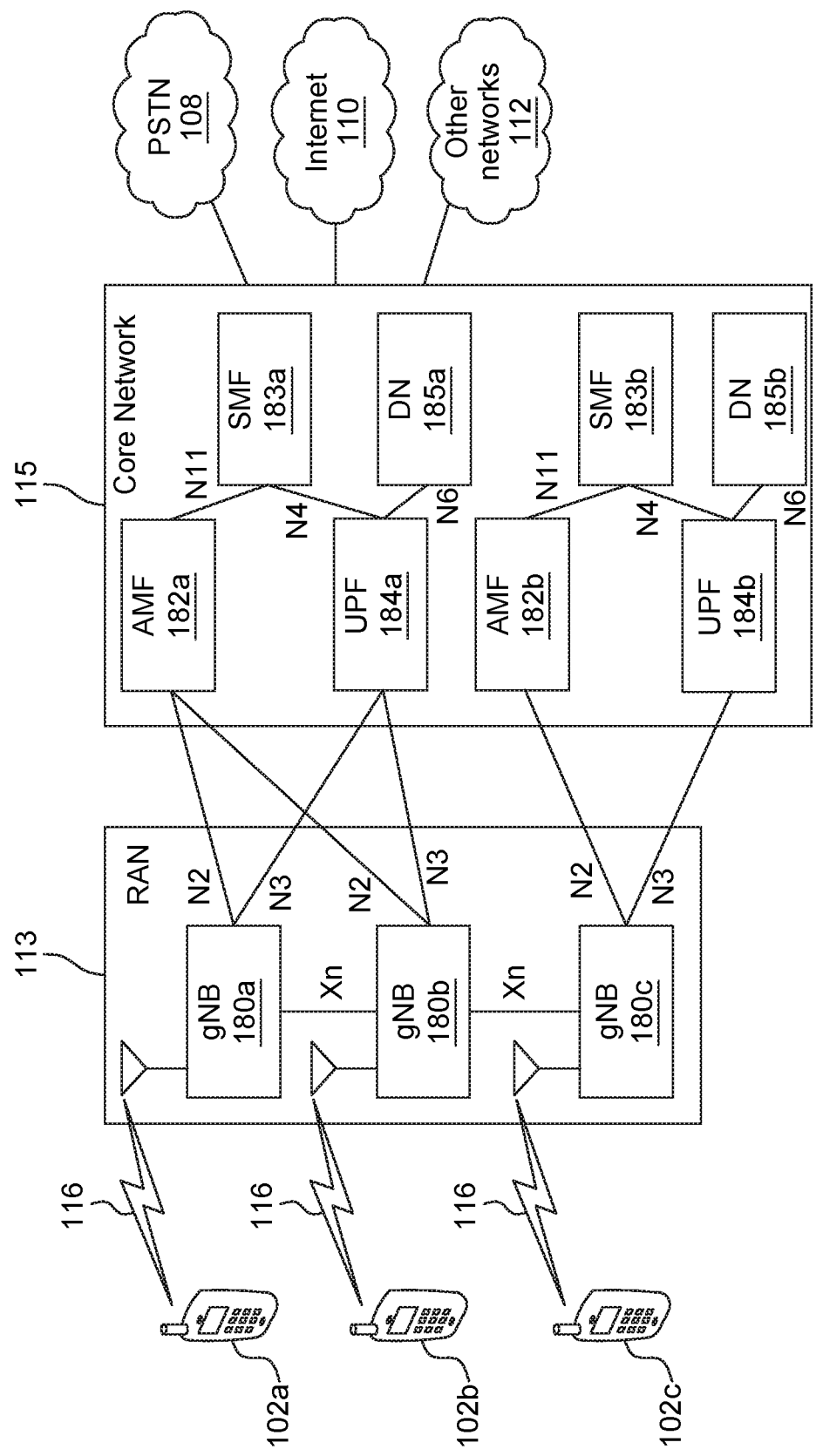
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Based on the general requirements set out by the ITU Radio communication Sector (ITU-R), Next Generation Mobile Networks (NGMN) group and 3$^{rd}$ Generation Partnership Project (3GPP), a broad classification of the use cases for emerging 5G systems may be depicted as follows: Enhanced Mobile Broadband (eMBB), Massive Machine Type Communications (mMTC) and Ultra Reliable and Low latency Communications (URLLC). Different use cases may focus on different requirements such as higher data rate, higher spectrum efficiency, low power and higher energy efficiency, lower latency and higher reliability. A wide range of spectrum bands ranging from 700 MHz to 80 GHz are being considered for a variety of deployment scenarios.

It is well known that as the carrier frequency increases, the severe path loss becomes a crucial limitation to guarantee a sufficient coverage area. Transmission in millimetre wave systems could additionally suffer from non-line-of-sight losses, for example, diffraction loss, penetration loss, oxygen absorption loss, foliage loss, etc. During initial access, a base station and WTRU may need to overcome these high path losses and discover each other. Utilizing dozens or even hundreds of antenna elements to generated beam formed signal is an effective way to compensate the severe path loss by providing significant beam forming gain. Beamforming techniques may include digital, analog and hybrid beamforming.

Cell search is the procedure by which a WTRU acquires time and frequency synchronization with a cell and detects the Cell ID of that cell. LTE synchronization signals are transmitted are transmitted in the 0th and 5th subframes of every radio frame and are used for time and frequency synchronization during initialization. As part of the system acquisition process, a WTRU synchronizes sequentially to the OFDM symbol, slot, subframe, half-frame, and radio frame based on the synchronization signals. The two synchronization signals are primary synchronization signal (PSS) and secondary synchronization signal (SSS). The PSS is used to obtain slot, subframe and half-frame boundary. It also provides physical layer cell identity (PCI) within the cell identity group. The SSS is used to obtain the radio frame boundary. It also enables the WTRU to determine the cell identity group, which may range from 0 to 167.

Following a successful synchronization and PCI acquisition, the WTRU decodes the Physical Broadcast Channel (PBCH) with the help of CRS and acquire the MIB information regarding system bandwidth, System Frame Number (SFN) and PHICH configuration. It should be noted the LTE synchronization signals and PBCH are transmitted continuously according to the standardized periodicity.

It was agreed in NR that no blind detection of NR-PBCH transmission scheme or number of antenna ports is required by the WTRU. For NR-PBCH transmission, a single fixed number of antenna port(s) is supported. For NR-PBCH transmission, NR may employ both digital and analog beamforming technologies, especially for high frequency band. Digital beamforming using multi-antenna technologies and/or analog beamforming using single or multi-port beamforming technologies may be considered in NR. For reference signal of NR-PBCH demodulation, NR may employ the use of a synchronization signal (e.g. NR-SSS) or self-contained DMRS for NR-PBCH demodulation. A mobility reference signal (MRS) may also be multiplexed in an SS block if MRS is supported in an SS block. The numerology of NR-PBCH may be the same or different as that of NR-SSS. Embodiments for digital beamforming using multi-antenna technologies, analog beamforming using single or multi-port beamforming technologies or hybrid scheme that combines both digital and analog beamforming have been considered for data transmission in connected mode. The similar technologies should also be considered in idle mode or for initial access and designed for broadcast channel such as NR-PBCH for optimum system performance.

NR-PSS and/or NR-SSS may be used as a reference signal for NR-PBCH demodulation. Alternatively, a reference signal that is dedicated to NR-PBCH may be used. Such reference signal may be self-contained within NR-PBCH signal and channel. Even without an additional signal or reference signal, a receiver may still be able to demodulate an NR-PBCH signal and channel. Such reference signal for demodulation or demodulation reference signal (DMRS) is specific to NR-PBCH and may be multiplexed and embedded within NR-PBCH resources. By doing so an NR-PBCH dedicated demodulation reference signal (DMRS) may be used for NR-PBCH demodulation. The term DMRS may refer to a demodulation reference signal or demodulation reference signals as used herein.

In order to use NR-SS (either NR-PSS or NR-SSS) as a reference signal for NR-PBCH demodulation, time-division multiplexing (TDM) of NR-SS and NR-PBCH may be preferred.

Figure 2:
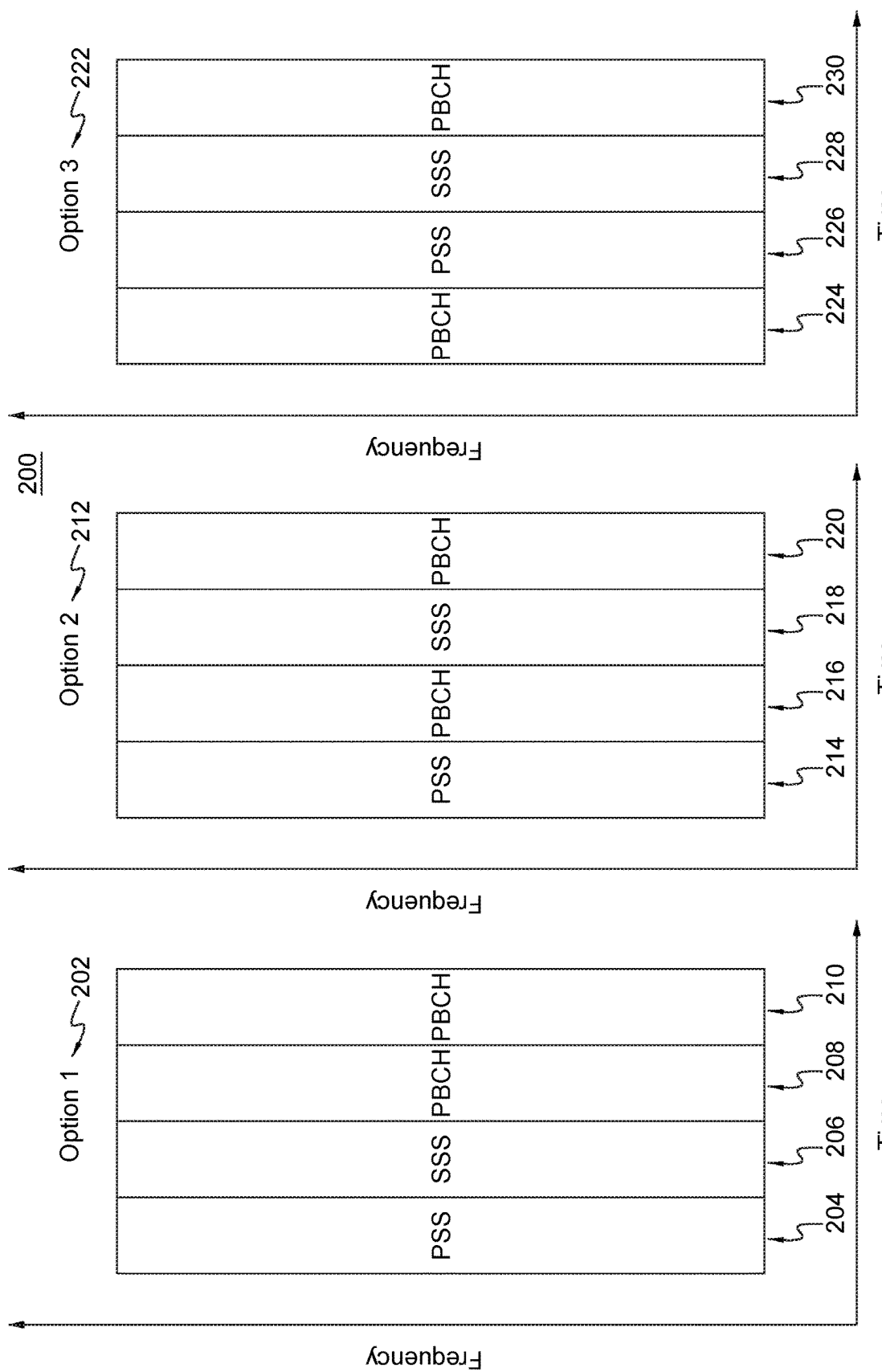
FIG. 2 is an example of new radio (NR) physical broadcast channel (NR-PBCH) multiplexing with an NR primary synchronization channel (SS) (NR-PSS) and NR secondary synchronization channel (NR-SSS) with a repeated NR-PBCH.

FIG. 2 depicts NR-PBCH multiplexing with NR-PSS and NR-SSS, where NR-PBCH, NR-PSS and NR-SSS are multiplexed in a TDM fashion. NR-PBCH signal and channel may be repeated and may be placed before or after NR-SS. Such a design may be used for but is not limited to a carrier frequency offset compensation purpose. As depicted in FIG. 2, each one of PSS 204, 214, 226, SSS 206, 218, 228 and PBCH 208, 210, 216, 220, 224, 230 occupy a same frequency. In a first example, option 1 202, PSS 204 is transmitted prior to SSS 206, followed by first PBCH 208 and second PBCH 210. In option 2 212, PSS 214 is transmitted prior to PBCH 216, followed by SSS 218 and PBCH 220. Option 2 212 may be used to provide PBCH information prior to complete synchronization. In option 2 212, PSS 214 is transmitted before PBCH 216, SSS 218 and PBCH 220. In yet another option, option 3 222, PBCH 224 is transmitted prior to PSS 226 followed by SSS 228 and PBCH 230. Option 3 222 may allow for PBCH information to be received prior to any synchronization information.

Figure 3:
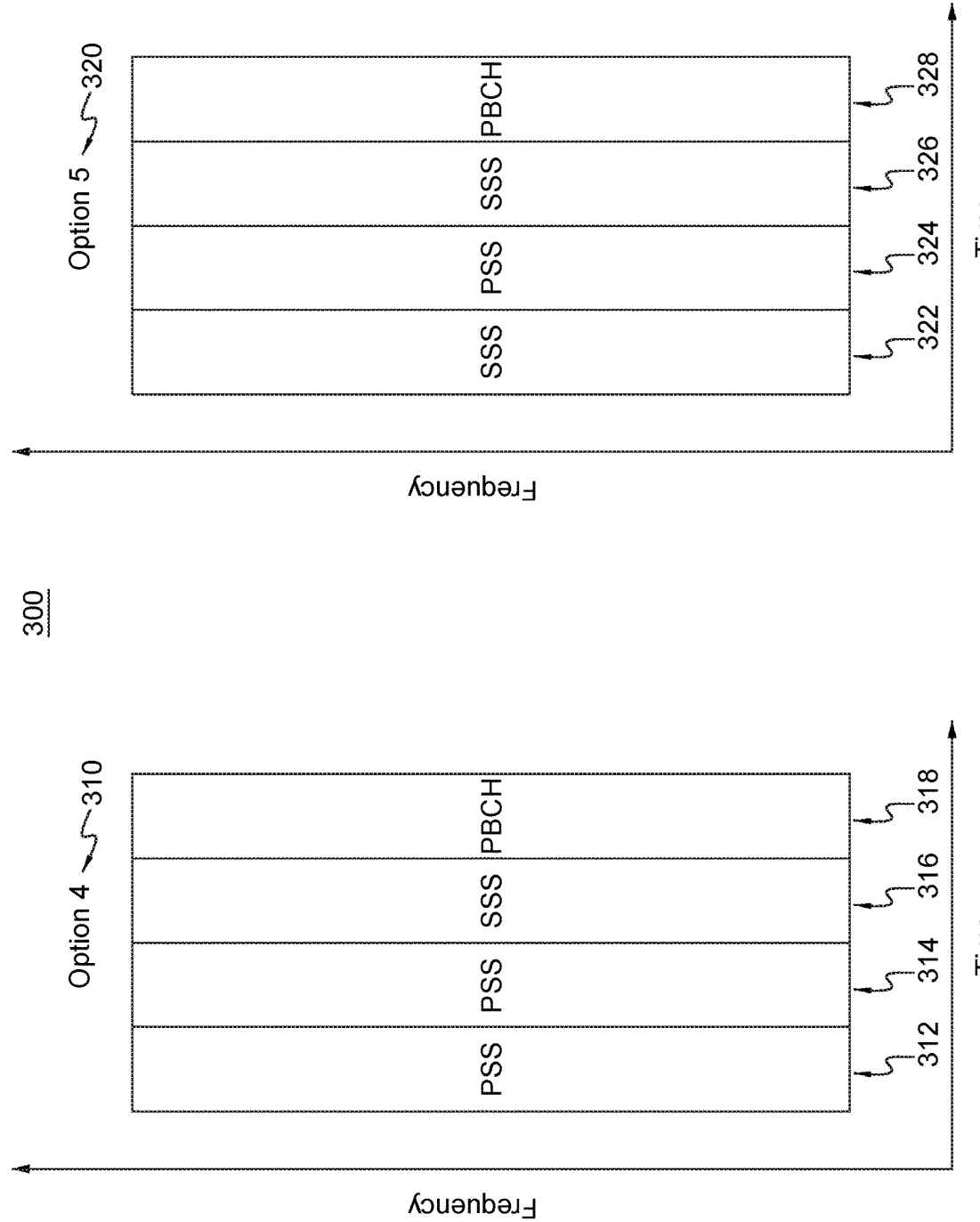
FIG. 3 is an example of an NR-PBCH multiplexing with NR-PSSS and NR-SSS with a repeated NR-SS.

Similarly, FIG. 3 is a timing diagram 300 which depicts use of an NR-SS signal in two different options 310, 320. Either NR-PSS or NR-SSS or both may be repeated and may be placed before or after NR-PBCH. The repeated NR-PSS or NR-SSS may also be used for but is not limited to carrier frequency offset estimation or compensation purposes. As shown in FIG. 3, in option 4 310, a first PSS transmission 312 may be made prior to a second PSS transmission 314. After the second PSS transmission 314 an SSS transmission 316 may be sent followed by a PBCH transmission 318. In option 5 320, an SSS 322 may be transmitted prior to a PSS transmission 324. An SSS transmission 326 may follow the PSS transmission 324 along with an SSS transmission 326 and PBCH transmission 328.

Figure 4:
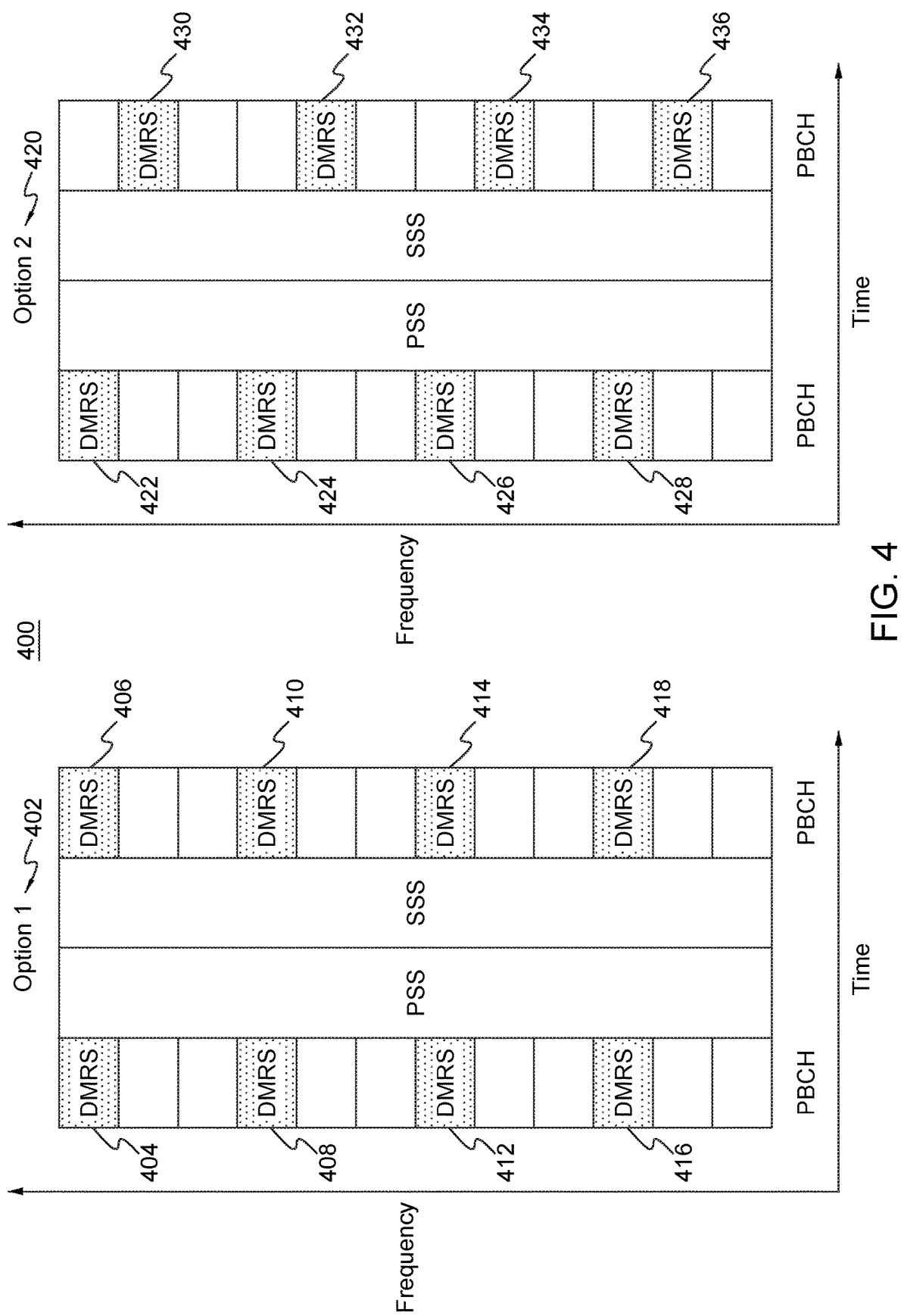
FIG. 4 is an example of an NR-PBCH dedicated demodulation reference signal design 1 using one antenna port.

FIG. 4 is an example illustration of a first NR-PBCH dedicated demodulation reference signal design 400 in which one antenna port is used in two options 401, 420. In both option 1 402 and option 2 420, one antenna port for NR-PBCH dedicated DMRS is used. In the first option, option 1 402, the repeated NR-PBCH dedicated DMRS are placed in the same frequency location or subcarriers in order to assist carrier frequency offset (CFO) estimation. In one example, DMRS 404 is in a same frequency location as DMRS 406; DMRS 408 is in a same frequency location as DMRS 410; DMRS 412 is in a same frequency location as DMRS 414 and DMRS 416 is in a same frequency location as DMRS 418. In a second option, option 2 420, another pattern for NR-PBCH DMRS is used in which DMRS are placed with a fixed offset in frequency domain to cover other frequency locations or subcarriers and/or obtain frequency diversity. For example, if the DMRS density is ⅙ for both the NR-PBCH symbols, the DMRS in the second PBCH OFDM symbol may be offset by 3 REs with respective to the first PBCH OFDM symbol. This may create a perfect comb-pattern for DMRS between two NR-PBCH OFDM symbols. The combined or joint DMRS in two PBCH OFDM symbols may effectively become DMRS density of ⅓ in lower Doppler channels and channel estimation performance may be improved. This may come at an expense of not being able to estimate or correct CFO using DMRS. However, a mapping of data RE in this case may have some data REs repeated in case PBCH data is repeated in the second PBCH OFDM symbol, which may be used for CFO estimation and compensation. As shown in option 2, 420, DMRS 422 is offset from DMRS 430; DMRS 424 is offset from DMRS 432; DMRS 426 is offset from DMRS 434 and DMRS 428 is offset from DMRS 436.

Figure 5:
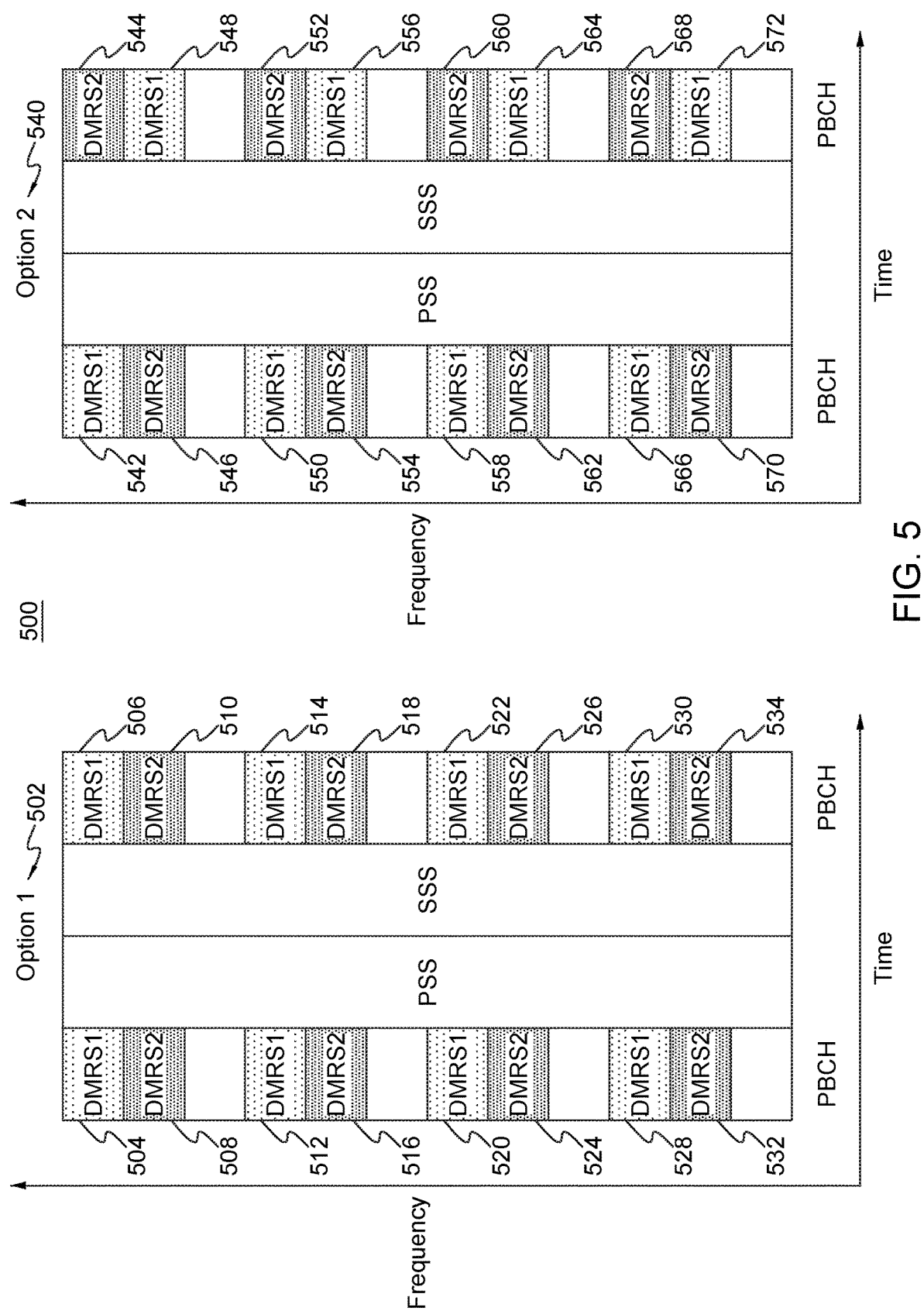
FIG. 5 is an example of an NR-PBCH dedicated demodulation reference signal design 3 using two antenna ports.

FIG. 5 is a third example of an NR-PBCH dedicated demodulation reference signal design 500 using two antenna ports in two options 502, 540. An NR-PBCH dedicated DMRS with two antenna ports is depicted in FIG. 5. In the first option 502 the repeated NR-PBCH dedicated DMRS 504-534 are placed in the same frequency location or subcarriers for each antenna port in order to assist CFO estimation. In the second option, option 2 540 another pattern for NR-PBCH DMRS is used in which DMRS for two antenna ports are placed with a fixed offset in frequency domain to cover other frequency locations or subcarriers and/or obtain frequency diversity. In option 2 540 DMRS1 542, 548, 550, 556, 558, 564, 566, 572 and DMRS2 544, 546, 552, 554, 560, 562, 568, 570 are alternated in frequency.

In one or more embodiments, a hybrid dedicated demodulation reference signal (H-DMRS) may be utilized. Some of the repeated NR-PBCH dedicated DMRS may be placed in the same frequency location or subcarriers for each antenna port in order to assist CFO estimation and others of the repeated NR-PBCH dedicated DMRS may be placed in the different frequency locations or subcarriers and/or obtain frequency diversity.

Figure 6:
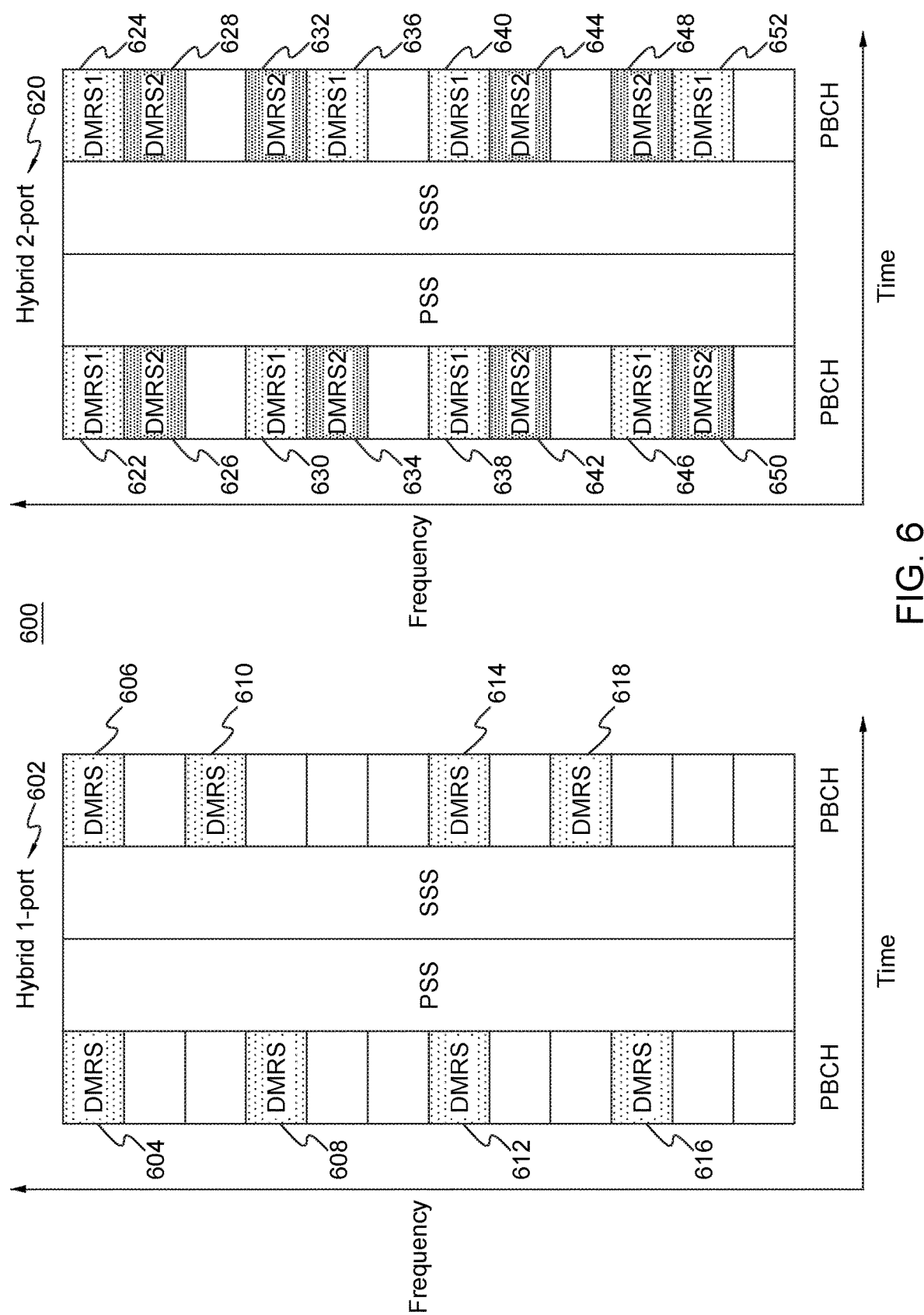
FIG. 6 is an example NR-PBCH hybrid dedicated demodulation reference signal.

FIG. 6 is an illustration 600 of two different NR-PBCH hybrid dedicated demodulation reference signal (H-DMRS) designs 602, 620. As shown in FIG. 6, in a hybrid 1-port approach 602, DMRS 604 may be in a same frequency location as DMRS 606 while DMRS 608 may be in a different frequency location from DMRS 610. DMRS 612 may be located in a same frequency location as DMRS 614, while DMRS 616 is located in a different frequency location from DMRS 618. In a hybrid 2-port 620 approach, DMRS1 622 may be in a same frequency location as DMRS1 624; DMRS2 626 may be in a same frequency location as DMRS2 628; DMRS1 630 may be in a same frequency location as DMRS2 632; DMRS2 634 may be in a same frequency location as DMRS1 636; DMRS1 638 may be in a same frequency location as DMRS1 640; DMRS2 642 may be in a same frequency location as DMRS2 644; DMRS1 646 may be in a same frequency location as DMRS2 648; and DMRS2 650 may be in a same frequency location as DMRS1 652. DMRS is transmitted on two different ports. In an example, DMRS1 is transmitted from antenna port 1 and DMRS2 is transmitted from antenna port two with a fixed offset in frequency. If the offset is zero, the DMRS for both antenna ports have the same frequency locations In an embodiment, a non-uniform DMRS density which may employ a different density of demodulation reference signal (DMRS) may be used. In the a OFDM symbol of NR-PBCH, a higher density DMRS may be placed to assist in channel estimation. However, a lower density of DMRS may be placed in the second OFDM symbol of NR-PBCH for reducing the overhead of the DMRS. These DMRS may be the same as the DMRS for the same sub-carrier in the first OFDM symbol of NR-PBCH, which may facilitate estimation of the CFO. This may decrease the code-rate. As the second symbol is closer to the SSS, channel estimation may be supported through use of the SSS.

Figure 7:
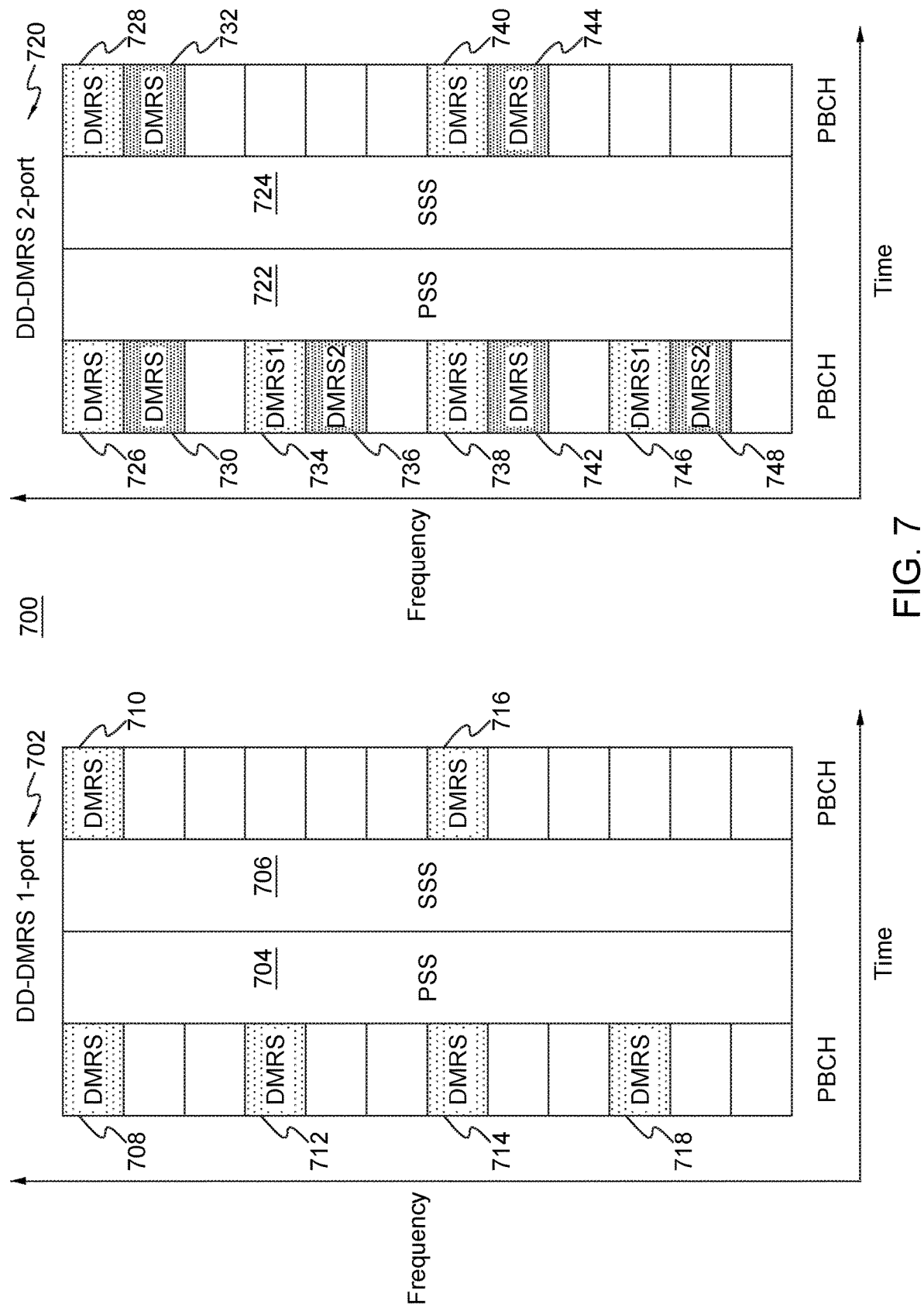
FIG. 7 is an example of a non-uniform density NR-PBCH dedicated demodulation reference signal.

FIG. 7 depicts a non-uniform density NR-PBCH demodulation reference signal 700 for use in two different configuration options 702, 720. In an embodiment, precoding may or may not be applied to the pilot sub-carrier. Precoding may also be used to remove the common phase error for the second OFDM symbol, hence improving detection performance of NR-PBCH at the receiver.

NR-PBCH/SS multiplexing embodiments as well as DMRS allocation embodiments may allow for both efficient and high performing NR-PBCH demodulation. FIG. 4 and FIG. 5 show how the DMRS may be mapped to the same frequency location across symbols to, for example, improve the performance of CFO estimation. These FIGs also show that the DMRS may be mapped with a fixed frequency offset between symbols, which may improve channel estimation due to the frequency diversity obtained.

Both of these performance enhancing techniques may be realized using a hybrid DMRS mapping similar to that shown in FIG. 6. In FIG. 7 and other embodiments, the PSS and/or SSS may be used to assist in the channel estimation where the DMRS density is lower. This may be referred to as a diverse density (DD) method. FIG. 7 illustrates a DD-DMRS 1-port 702 and DD-DMRS 2-port 720 embodiments. In the DD-DMRS 1-port 702 embodiment, a PSS signal 704 may be transmitted before an SSS signal 706. Prior to the PSS signal 704 DMRS 708, 712, 714, 718 may be transmitted at a first time. After the SSS signal 706, DMRS signals 710, 716 may be transmitted at a second time. At the second time there may be a lower number of DMRS transmitted. DMRS signals 708, 710, 714, 716 of the first and second time may partially overlap in frequency as shown. In the DD-DMRS 2-port 720 example, more DMRS signals 726-744 may be transmitted as compared to the DD-DMRS 1-port 702 example. These DMRS 726-744 may be transmitted before the PSS 722 and after the SSS 724, similar to the 1-port option 702.

Figure 8:
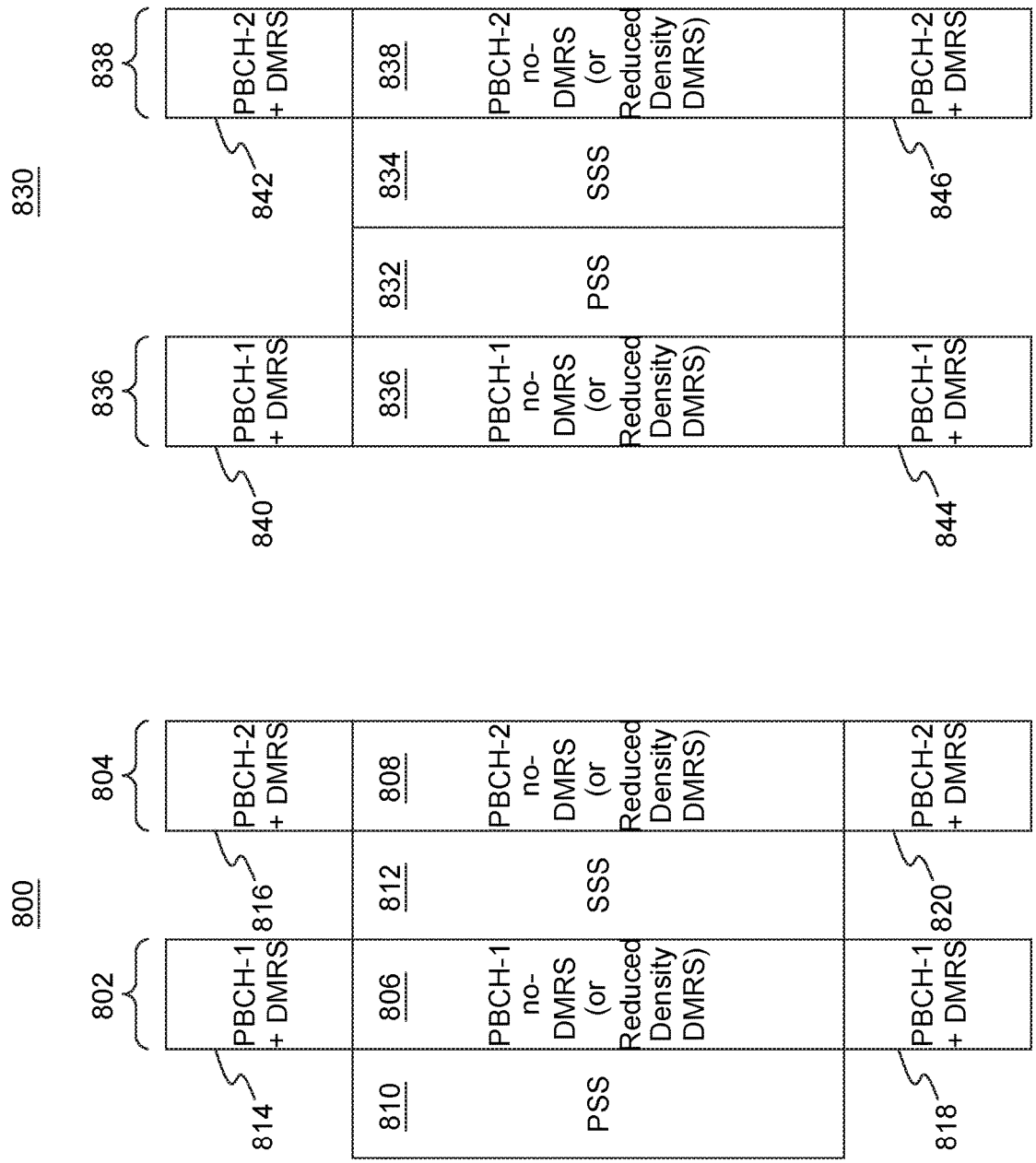
FIG. 8 is an example of an uneven demodulation reference signal (DMRS) density depending on PSS/SSS bandwidth.

In one example, the NR-PSS and NR-SSS having a different bandwidth allocation compared to NR-PBCH. For example, the NR-PSS and NR-SSS may use 12 RBs, whereas PBCH uses 24 RBs. Hence there are 12 RBs of PBCH which overlaps with NR-PSS/NR-SSS and another 12 which don't overlap with NR-PSS/NR-SSS. In the receiver after the detection of cell-ID, NR-PSS and NR-SSS may be considered as known sequences that may serve as reference symbols for demodulating the overlapping RBs of the NR-PBCH. This technique may be used to improve performance and/or increase efficiency of the design. A performance improvement may be realized by allowing the NR-PSS and/or NR-SSS to assist in the channel estimation, while efficiency is realized by allowing the reduction or even full removal of the DMRS within the SS bandwidth. This concept is illustrated in FIG. 8. The left side 800 of FIG. 8 shows a design where SS Block mapping order is NR-[PSS PBCH1 SSS PBCH2]. The right side 830 of FIG. 8 shows a design where the SS Block mapping order is NR-[PBCH1 PSS SSS PBCH2]. The same design for DMRS may apply to other possible mapping orders are NR-[PSS-SSS-PBCH1-PBCH2], NR-[PSS-PBCH1-PBCH2-SSS].

As shown in FIG. 8, the center RBs 806, 808 of NR-PBCH symbol one 802 or symbol two 804 have no-DMRS or a reduced density DMRS. This increases number of REs available for data transmission and hence reduces the effective code-rate for the same payload. If the channel estimation performance is similar, a reduced effective coding rate may improve the performance. If no DMRS are used for the center RBs, PSS 810, or SSS 812 or both may be used for channel estimation. If reduced density DMRS are used for the center RBs, PSS 810, SSS 812 or both may use as additional assistance along with existing DMRS to do 2D channel estimation for center RBs. PBCH1 DMRS 814 and 818 may contain DMRS at full density. The same may be true for PBCH2 DMRS 816 and 820. It should also be noted that the reduction in NR-PBCH density may also depend on the distance from the NR-SSS. In the case of NR-[PSS PBCH1 SSS PBCH2] 800, both the NR-PBCH may have same density for DMRS or may have no DMRS. However, in the NR-[PBCH1 PSS SSS PBCH2] configuration 830, PBCH1 may have a higher DMRS density than PBCH2 even in the RBs which are overlapping with NR-PSS and NR-SSS.

As shown in the NR-[PBCH1 PSS SSS PBCH2] configuration 830, PSS 832 and SSS 834 are in-between PBCH1 836 and PBCH2 838. PBCH1 836 and PBCH2 838 are comprised of no or reduced density DMRS in center frequency sections 836 and 838. PBCH1 DMRS 840 and 844 may contain DMRS at full density. The same may be true for PBCH2 DMRS 842 and 846.

The DMRS density may be ⅓, ¼, ⅙ or another density depending on a chosen design. If DMRS density is ⅓, it may mean that one out of three resource elements (REs) is used for DMRS. Similarly, if DMRS density is ¼ or ⅙, it may mean that one out of four and six resource elements (REs) is used for DMRS respectively.

The various options disclosed may provide different performance advantages as well as efficiency enhancements that may be applicable in different scenarios. In order to allow for all possible options, simple signalling may be provided, for example, on the NR-SSS and/or a new radio tertiary synchronization signal (NR-TSS) to indicate which option is being used.

Figure 9:
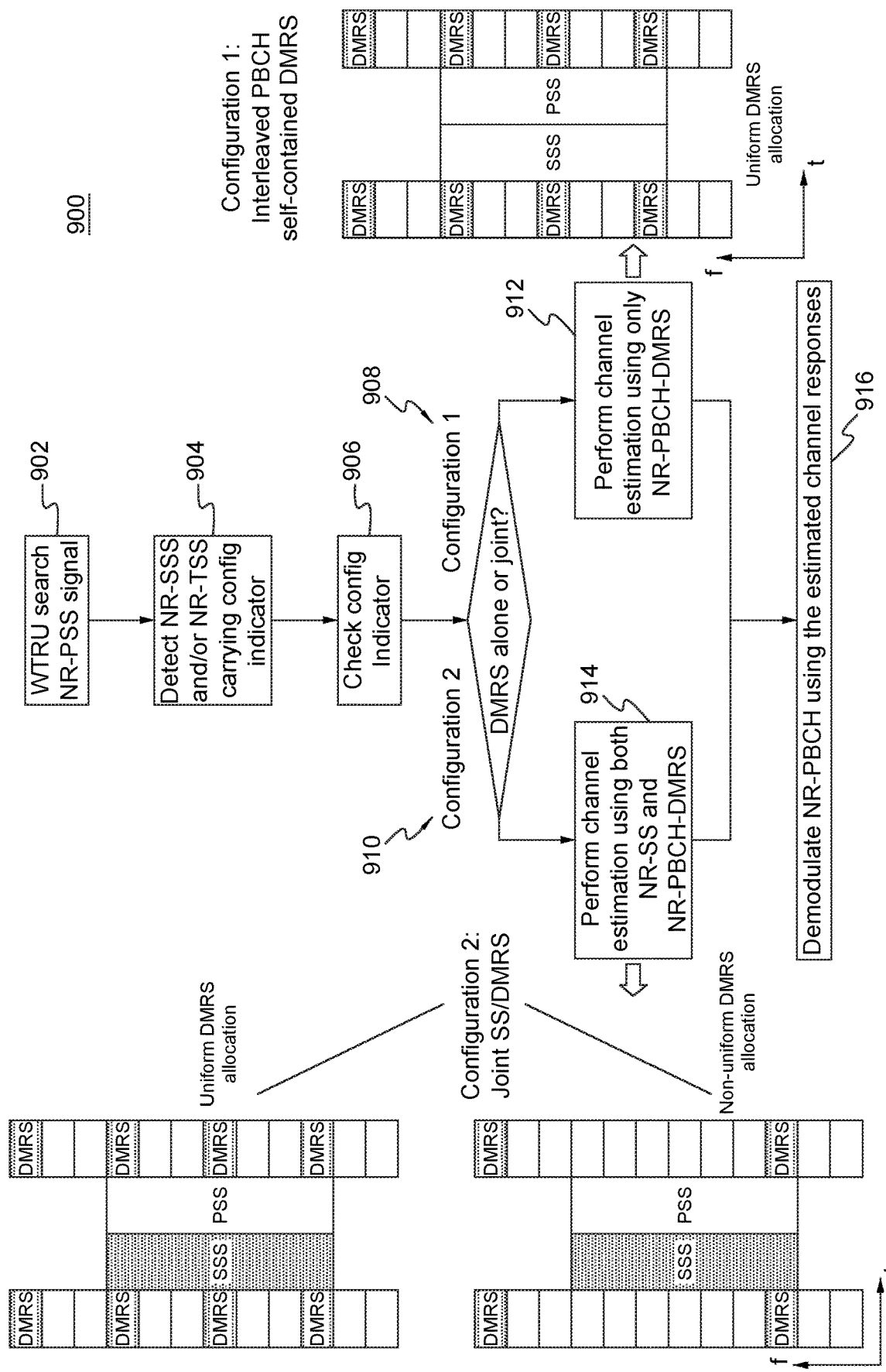
FIG. 9 is an example of a configurable NR-PBCH demodulation.

FIG. 9 is a flow diagram 900 which details an exemplary performance of a configurable NR-PBCH demodulation. The following example procedure may be used at the receiver. A NR-PSS signal may be searched for 902. Timing and frequency information may be acquired 904 using NR-PSS/NR-SSS. The configuration indicator carried on the NR-SSS indicating reference signal configuration may be decoded and the configuration indicator may be checked 906. As an example, FIG. 9 illustrates two overall reference configurations, configuration 1 908 and configuration 2 910. In configuration 1 908, PBCH reference signals are self-contained using DMRS. The DMRS may be mapped according to one of the various configurations shown in FIGS. 4-7. This information may also be carried on the NR-SSS. In configuration 2 910, joint SS/DMRS reference signals are provided. An exemplary scenario, for configuration 2 910 may be when the PBCH bandwidth is greater that the SS bandwidth and hence a reduced DMRS density may be used in the overlapping bandwidth. This may be in accordance with an embodiment disclosed with reference to one or more of FIG. 7 or 8 among others. Regardless of choice between configuration 1 908 or configuration 2 910, NR-PBCH may be ultimately demodulated 916 using estimated channel responses.

Examples of this non-uniform DMRS mapping of configuration 2 910 are shown in FIG. 7 and FIG. 8. The exact density of DMRS in the overlapping region may span from one in reference to using the same density in the non-overlapping regions, to zero, in reference to no DMRS in the overlapping region. Additionally, the DMRS mapping portions may use any of the same techniques shown on the same techniques shown in FIGS. 4-6. Finally, as in the configuration 1 906 case, this lower level of configuration may also be signalled from the NR-SSS and/or NR-TSS. Channel estimation using DMRS only (configuration 1 908) may be performed 912. Alternatively, channel estimation using joint SS/DMRS (configuration 2 910) may be selected 914 as appropriate. A receiver may use a 2D (Time-Frequency) based algorithm for better joint interpolation across time and frequency. An OFDM symbol for NR-PBCH may be received. The channel estimate to equalize and detect the NR-PBCH symbols may be used and the symbols may be decoded 916 using the appropriate channel decoder, for example using polar decoding.

NR-PBCH may be transmitted on N OFDM symbols. In a first embodiment, NR-PBCH coded bits are mapped across REs in N PBCH symbols, where N is the number of PBCH symbols in a NR-SS block. In a second embodiment, NR-PBCH coded bits are mapped across REs in a PBCH symbol, the NR-PBCH symbol is copied to N−1 NR-PBCH symbol in a NR-SS block.

For example, for the case where N=2, the following may be used: in the first embodiment, NR-PBCH coded bits are mapped across REs in both PBCH symbols. In the second embodiment, NR-PBCH coded bits are mapped across REs in NR-PBCH symbol, the NR-PBCH symbol is copied to the second NR-PBCH symbol NR-SS block In the first embodiment, wherein NR-PBCH coded bits are mapped across REs in both PBCH symbols: NR-PBCH coded bits are mapped across REs in N PBCH symbols without repetition. An NR-PBCH resource may be allocated in different ways. The frequency first mapping solution may be used. The data to RE mapping may be mapped in frequency first order. RE mapping may be performed in frequency first and then time second. RE mapping in frequency may be followed by RE mapping in time. RE mapping may be applied to data, DMRS, sequence or the like. In this case, the QPSK symbols generated from data coming from the channel encoder are first mapped to first NR-PBCH OFDM symbol followed by the second or remaining N−1 NR-PBCH OFDM symbol. A time first mapping may be used. The QPSK symbols generated from data coming from channel encoder may be first mapped to a first RE of each NR-PBCH OFDM symbol followed by a second RE of each NR-PBCH OFDM symbol and so on. A hybrid method may be used where the QPSK symbols generated from data coming from channel encoder are first mapped to first (n) RB of each NR-PBCH OFDM symbol followed by second (n) RB of each NR-PBCH OFDM symbol. 'n' may be a predefined or configured integer known to both transmitter and receiver.

In the second embodiment, wherein NR-PBCH coded bits are mapped across REs in an NR-PBCH symbol, the NR-PBCH symbol is copied to the second NR-PBCH symbol NR-SS block, NR-PBCH coded bits are mapped across REs in a PBCH symbols with repetition. In a simple design, NR-PBCH data (and/or DMRS) may be copied on to the second or the remaining N−1 NR-PBCH OFDM symbol. In another embodiment, frequency hopping of data may be performed. The data mapped to one RB in first NR-PBCH symbol may be mapped to other RB in second NR-PBCH symbol. The pattern of this frequency hopping is known to receiver and hence it may be able to combine them increasing frequency of the decoding. The DMRS in this case may not frequency hop. Hence CFO may be estimated at the receiver using the DMRS location. In other embodiment, frequency hopping may be used only for the 12 RBs which are not overlapping with NR-PSS and NR-SSS. In one embodiment, an offset may be applied in a second PBCH symbol with respect to the first PBCH symbol. This offset may be in terms of a phase of data symbols. This phase offset may be detected at the receiver and implicit information may be decodable. For example, if the phase difference between the first and second symbols are [0, pi/2, pi, 3pi/2] 2 bits of implicit information may be indicated. It also may be possible to have a known shift which is based on cell ID. In this case, the purpose may not be to indicate anything, but rather to randomize the data using a cell-specific shift. This offset may be in terms of frequency location of the data symbols. Similar to phase, this may be cell-specific shift that may be known to increase randomization or used to blindly decode a few bits. The shift may also be a frequency shift, time shift, phase shift or the like or combination of one or more of them.

In an embodiment, a hybrid design may be implemented. In this hybrid design, the first center 12 RBs of both PBCH symbols may be filled with all the data. This data may then be copied to the side 12 RBs, for example, 6+6 on both the sides of center. This design is important as all the data symbols are present in center RBs. If SNR is good, this permits the WTRU to detect PBCH using a smaller bandwidth, for example, the 12 RBs in the middle. In this way, a WTRU only has to receive and demodulate the center 12 RB, which may also save power. Frequency hopping may or may not be used here.

If frequency hopping is used, the center part of first symbol may be copied on 12 RBs of second symbol; the center part of second symbol may be copied on 12 RBs of first symbol. As a receiver knows this pattern, it may carefully extract and assemble the DMRS block before sending to the channel decoder. This may result in a better performance at the WTRU with a lower SNR; while combining at the receiver, careful demapping of the RE is needed.

In another embodiment, a RE mapping may be as a function Cell ID and/or SS Block ID. This embodiment is motivated by the randomization of interference. Before detecting NR-PBCH, a WTRU should have detected the Cell ID using NR-PSS/NR-SSS. Also, in some cases, SS Block ID might be already known before decoding the NR-PBCH. This may be the case, for example, if TSS was transmitted and the SS Block ID was carried by TSS, or some prior knowledge about SS block index is available.

It may be desirable to use the DMRS RE mapping as a function of cell ID or SS block index or both. If the frequency location of DMRS is dependent on cell-ID, it may reduce the interference from neighboring cells. For example, this may include a shift of a location for DMRS for one, multiple or all of the OFDM symbols for NR-PBCH. In one or more embodiments, the term SS block ID, SS block index and SS block time index may be used interchangeably.

At the receiver, once a WTRU detects NR-PSS/NR-SSS, the Cell ID and/or SS Block ID is known. A WTRU may be able to identify the locations for DMRS of NR-PBCH using Cell ID and/or SS Block ID and the mapping function. The WTRU may then continue with the channel estimation for PBCH using DMRS. PBCH demodulation and decoding is then followed. As different cells are transmitting DMRS on different locations, the interference may be reduced, mitigated or avoided.

To achieve even better randomization, the sequence of DMRS (e.g., sequence or scrambling sequence) may also be dependent on cell ID or SS block index or both. The sequence of DMRS (e.g., sequence or scrambling sequence) may also be dependent on other information such as half radio frame indication, either jointly, individually or separately with SS block index or cell ID. DMRS may use any of different sequences. The options may include an M sequence, a Gold sequence, a ZC sequence or PN sequences. Different parameters of these sequences may be function of the cell ID or SS block index.

In any of the above cases, DMRS for PBCH may be also used as DMRS for PDSCH. This is true for the RBs occupied by PBCH. Rate matching may be used to convert (512) coded bits to all the used data REs which may change depending on DMRS design.

Different sequences may be used as DMRS for the NR-PBCH. One of the sequences of interest is a maximal length sequence (M-Sequence). Due to optimal noise-like characteristics and very good correlation properties, M-Sequences may serve a dual purpose. M-Sequences may be used to deliver information and also may serve as reference symbols for demodulation of the NR-PBCH.

As an example, if 24 RBs are allocated for NR-PBCH, then 2 DMRS may exist in each RB in each OFDM symbol. Hence, in each OFDM symbol 48 symbols may be needed as a DMRS. There may be a design choice to have a lower or higher number of DMRS based on a particular embodiment or implementation choice. M Sequences have lengths of $2^M-1$, making different options possible.

FIG. 10A illustrates circuitry 1000 configured to produce a length 7 M-sequence. As shown in FIG. 10A, there are 7 stages 1002-1014 representing 7 bits available for shifting. At each clock pulse of the circuitry, a bit from stage 6 1012 is shifted into stage 7 1014, from stage 5 1010 into stage 6 1012, from stage 4 1008 into stage 5 1010, from stage 3 1006 into stage 4 1008, from stage 2 1004 into stage 3 1006, and from stage 1 1002 into stage 2 1004. The output of stage 7 1014 is OR-ed 1016 with an output of stage 6 1012 and fed into stage 1 1002. In this way, an input bit is continually shifted into stage 1. Output 1018 is illustrated from stage 7 1014. In this way, an M-Sequence of length 127 may be generated from a shift register of length 7 using 7 stages. This may be used for one or both of the OFDM symbols of NR-PBCH.

FIG. 10B illustrates M-Sequence of length 63 which may be generated from a shift register 1020 of length 6. In this way, there are only 6 stages 1022-1032 shown in FIG. 10B. Output 1036 may be achieved from stage 6 1032. OR 1034 of stage 5 1030 and stage 6 1032 may be fed into stage 1 1022. This sequence may be used for one or both of the OFDM symbols of NR-PBCH with some repetition or padding along with some known symbols. For example, all ones may be padded to match length of sequence to number of DMRS needed. It also may be possible to generate a length 31 M-Sequence using a shift register of length 5 and repeat it to cover all the DMRS of each OFDM symbol. A same or different sequence may be used for the other OFDM symbols. It is also possible to concatenate two different M-Sequences of a same or different length. This may enable two shifts at the cost of higher correlation. This increases the amount of information to be transmitted at the expense of confidence on the detection. However, if the sequence is long, this may be a viable option. An M-Sequence may be also scrambled with another sequence or another PN Sequence may also be used. The parameters like shift or the polynomial of the sequence may be a function of the cell-ID. This may enable orthogonal DMRS between different cells.

A higher length M-Sequence may provide for a better correlation property. These sequences may be use with different shifts. Using different shifts, it may be possible to indicate [5,6,7] bits of information implicitly using a 31, 62, or 127 M-Sequence bit length. One option may include but is not limited to indicating an SS Block index, indicating details to aid channel decoding of NR-PBCH including information about polar codes and a Beam-ID. This may further be used for any other information that needs very low latency. If SS Block ID is not indicated using the DMRS but known prior to the decoding of the NR-PBCH, the parameters like shift or the polynomial of the sequence may be a function of SS Block ID. The shift may be, but is not limited to, a frequency shift, time shift, phase shift, location shift or the like. A combination of these shift types may also be used.

Figure 11:
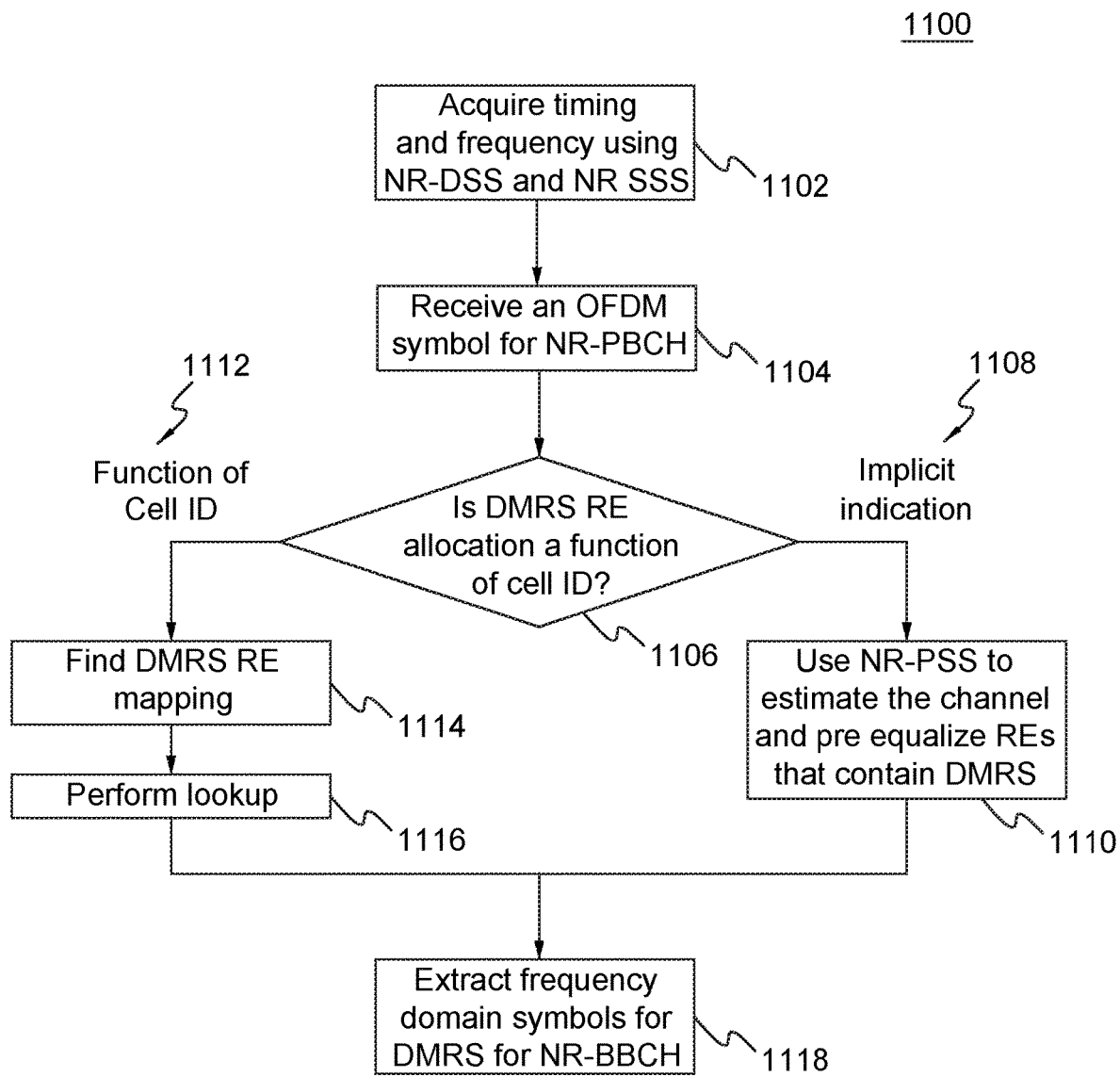
FIG. 11 is a flowchart of a procedure for receiver processing and information detection.

FIG. 11 is a flowchart 1100 which illustrates a procedure used for exemplary receiver processing and information detection. A receiver may first acquire timing and frequency 1102 using NR-PSS and NR-SSS. The receiver may receive 1104 an OFDM symbol for NR-PBCH. DMRS RE allocation may be a function 1106 of cell-ID and/or SS Block ID, and the DMRS RE mapping may be found based on the cell-ID and/or SS Block ID. The SS Block ID may be indicated implicitly 1108 in DMRS, the receiver may use 1110 NR-PSS to estimate the channel and pre-equalize the REs that contain DMRS for NR-PBCH. The receiver may then extract 1118 frequency domain symbols for DMRS for NR-PBCH. These symbols are correlated with the original M-Sequence that was used to generate DMRS for PBCH. A strong peak will be given at one of the offsets. This will give the information embedded in DMRS, similar to SS-Block Index. If multiple M-Sequences are used, with careful extraction and correlation, transmission-shifts for each M sequences may be identified. Using the detected shift, a local copy of DMRS may be generated. This may then be used to detect and decode the NR-PBCH. The DMRS sequence may be a function of 1112 cell-ID and/or SS Block ID and a local copy of DMRS based may be generated based on the cell-ID and/or SS Block ID. The local copy of DMRS may be used for channel estimation for NR-PBCH and to demodulate/decode NR-PBCH. A local copy may be found 1114 via a lookup 1116 in a local table or database.

In another embodiment, ZC sequences may be used as DMRS for the NR-PBCH. They may be used to deliver information using different cyclic shifts and also serve as reference symbols for demodulation of the NR-PBCH. As an example, if 24 RBs are allocated for NR-PBCH, 2 DMRS in each RB in each OFDM symbol may be had. Hence, in each OFDM symbol, N symbols may be needed for DMRS. N may be 48 in one embodiment. A length of a ZC sequence may be selected to match the number of DMRS. The best root for the ZC sequence may be determined by simulation.

It is also possible to concatenate two different ZC sequences of a same or different length. A ZC sequence may be also scrambled with another PN sequence or M sequence. Parameters, for example, a root of ZC sequence or the cyclic shift of the ZC the sequence may be a function of the cell-ID. This may enable orthogonal DMRS between different cells. The higher the length of the ZC-Sequence, the better the correlation property. These sequences may be used with different cyclic shifts. Using different shifts, it may be possible to carry [4,5,6] bits of information for 31, 62, 127 length of ZC-Sequences respectively, which may be used to indicate information to aid channel decoding of NR-PBCH, This may include information about polar encoding and/or decoding including Beam-ID. It is also possible to use different roots of ZC sequence. A WTRU may be able to blindly identify the ZC sequence used. This may be used to convey implicit information as well. This may be used for any other information that needs very low latency. If SS Block ID is not indicated using the DMRS but known prior to the decoding of the NR-PBCH, the parameters like root of ZC sequence or the cyclic shift of the ZC the sequence may be a function of SS Block ID.

For receiver processing, the following procedure may be used to detect information. A receiver may first acquire timing and frequency using NR-PSS/NR-SSS. The receiver may receive an OFDM symbol for NR-PBCH. DMRS RE allocation may be a function of cell-ID and/or SS Block ID and the DMRS RE mapping may be acquired based on the cell-ID and/or SS Block ID. The DMRS sequence may be a function of cell-ID and/or SS Block ID and a local copy of DMRS may be generated based on the cell-ID and/or SS Block ID. A local copy of DMRS may be used for channel estimation for NR-PBCH and demodulate/decode NR-PBCH.

Gold sequences may also be used for DMRS. Gold sequences may be generated by multiplying two M sequences with each other. These M sequences should be generated from irreducible primitive polynomials and both the polynomial should be preferred pair. For the design following process may be used.

Two M Sequences may be generated from preferred pair polynomial. Two different shifts are used (m0 and m1) for both. These are then XOR-ed. This sequence is BPSK modulated and then repeated or truncated to fill all DMRS.

If the chosen length of the M sequences is 31 which may be repeated, a combination of the following polynomial may be used. Octal values are in the order of 45, 75, 67.

For: $g(x)=x5+x2+1$ $x(\bar{i}+5)=(x(\bar{i}+2)+x(\bar{i}))\bmod 2,\ 0\leq \bar{i}\leq 25$ For: $g(x)=x5+x4+x3+x2+1$ $x(\bar{i}+5)=(x(\bar{i}+4)+x(\bar{i}+3)+x(\bar{i}+2)+x(\bar{i}))\bmod 2,\ 0\leq \bar{i}\leq 25$ For: $g(x)=x5+x4+x2+x+1$ $x(\bar{i}+5)=(x(\bar{i}+4)+x(\bar{i}+2)+x(\bar{i}+1)+x(\bar{i}))\bmod 2,\ 0\leq \bar{i}\leq 25$ Other irreducible primitive polynomials are not excluded (Octal value 51, 37, 73). Initialization as follows may be used but other initialization may not be precluded:

$x(0)=0,\ x(1)=0,\ x(2)=0,\ x(3)=0, x(4)=1$

If the length of M Sequences 63 (for higher density DMRS) a combination of following polynomial may be used (Octal value in order are 103, 147, 155)

For: $g(x)=x6+x+1$ $x(\bar{i}+6)=(x(\bar{i}+1)+x(\bar{i}))\bmod 2,\ 0\leq \bar{i}\leq 56$ For: $g(x)=x6+x5+x2+x+1$ $x(\bar{i}+6)=(x(\bar{i}+5)+x(\bar{i}+2)+x(\bar{i}+1)+x(\bar{i}))\bmod 2,\ 0\leq \bar{i}\leq 56$ For: $g(x)=x6+x5+x3+x2+1$ $x(\bar{i}+6)=(x(\bar{i}+5)+x(\bar{i}+3)+x(\bar{i}+2)+x(\bar{i}))\bmod 2,\ 0\leq \bar{i}\leq 56$ Other irreducible primitive polynomials are not excluded (Octal values 133, 141, 163). Initialization as follows may be used but other initialization may not be precluded:

$x(0)=0,\ x(1)=0,\ x(2)=0,\ x(3)=0, x(4)=0\ x(5)=1$

Shifts in two sequence may be defined using the following equations. Where the s1, s2 are the two sequences of length L. m0 and m1 are two shifts. Value of n goes from 0 to L−1.

$s_1^{(m0)}(n)=\tilde{s}_1((n+m0)\bmod L)$ $s_2^{(m1)}(n)=\tilde{s}_2((n+m1)\bmod L)$ A combination function m0 and m1 may be used to indicate the following: details to aid channel decoding of NR-PBCH, which may include information about polar encoding and/or decoding; and a beam-ID.

In another option, parameters such as the polynomial of the sequence and/or the shift of the sequence(s) may be a function of the cell-ID. This may enable orthogonal DMRS between different cells. If SS Block ID is not indicated using the DMRS but known prior to the decoding of the NR-PBCH, those parameters may also be a function of SS Block ID.

For receiver processing, the following procedure may be used to detect the information: the receiver may first acquire timing and frequency using NR-PSS/NR-SSS; the receiver may receive an OFDM symbol for NR-PBCH; the DMRS RE allocation may be a function of cell-ID and/or SS Block ID and the DMRS RE mapping may be acquired based on cell-ID and/or SS Block ID; the DMRS sequence may be a function of cell-ID and/or SS Block ID, a local copy of DMRS may be generated based on cell-ID and/or SS Block ID; a local copy of DMRS may be used for channel estimation for NR-PBCH and to demodulate/decode the NR-PBCH.

The NR-PBCH may employ precoder cycling techniques to improve performance. In this case, the NR-PBCH reference signal(s), DMRS and/or SS, may or may not also be precoded using the same precoder cycling pattern as the NR-PBCH data. Assuming the same precoder is used, the precoder cycling may be applied either in the frequency domain or the time domain. For frequency domain precoder cycling some different options that may be used are detailed below:

A single precoder per NR-PBCH may be uses. A single precoder may be applied to all the RBs, for example, 24 RBs, NR-PBCH data and associated reference signals. The DMRS may be generated from a single sequence, for example, a M, ZC or Gold Sequence, since a longer sequence may improve detection performance. The DMRS may also be generated from two separate sequences split over the bandwidth.

A single precoder per RBG may be used. The RBs, along with the associated reference signals, in the PBCH may be divided into multiple RB groups (RBG) and a different precoder may be applied to each group. It should be noted that using different precoders may increase frequency diversity and hence improve performance. In general, the RBG may vary from 1 to N, where N is the number of RBs in the NR-PBCH, which in this case reverts back to the option above. The pattern may be known by the WTRU either via signaling from the SS or defined prior. Each RBG may use a different sequence; however it may be important to adjust the number of DMRS and length of sequences to match each other. Sequence length should be such that an attempt to achieve optimal correlation properties is made, and as such a particular sequence may span more multiple RBGs.

A single precoder may be used per sub-RB. In an exemplary scenario, one precoder may be used per RE, subcarrier or OFDM symbol for PBCH. A predefined precoder cycling pattern may be used across REs, subcarriers or OFDM symbols for PBCH. One precoder per DMRS group may be used. One DMRS group may be defined as half RB, partition of RB, or RE group (REG). An association between DMRS REs and data REs in a PBCH may be defined. This may also improve frequency diversity.

Precoder cycling may also be applied in the time domain. For time domain precoder cycling, some different options that may be used are detailed herein.

A single precoder may be applied for all NR-PBCH transmissions. In this case, a single precoder is applied to all PBCH data and reference signals. Different Precoders per modulo(n) NR-PBCH transmissions may be applied. In this case, a different precoder is applied for each NR-PBCH transmission per modulo(n). For example, when n=2 the following may apply: NR-PBCH transmission (0) applies precoder (0), NR-PBCH transmission (1) applies precoder (1), NR-PBCH transmission (3) applies precoder (0), NR-PBCH transmission (4) applies precoder (1), etc. Cycling may allow different WTRUs to obtain enhanced performance on different NR-PBCH transmissions based on each WTRUs unique spatial and frequency domain channel characteristics.

In each of the above cases, when there is more than one precoder being applied per NR-PBCH, the cycling pattern may be chosen to maximize the spatial and frequency diversity. In open loop schemes, this cycling pattern is pre-determined and may be chosen for example based on spatial properties for the precoder beams generated. Frequency domain characteristics may also be considered when choosing the precoder pattern in order to maximize the diversity in the frequency domain.

In order to use both NR-SS and self-contained DMRS for NR-PBCH demodulation, an indication may be introduced to indicate to a WTRU whether NR-SS and self-contained DMRS may be used jointly for channel estimation and coherent combining for NR-PBCH demodulation. A quasi-co-located (QCL) indicator may be introduced for initial access and NR-PBCH demodulation. When two signals are transmitted from two different antennas, the channels experienced by the two antennas may still have many large-scale properties in common. For example, the two signals may have the same or similar Doppler spread or shift, average delay, average delay spread or average gain, therefore they may be used by the WTRU in the setting of parameters for channel estimation. However when these two antennas are separated in distance, signals from these two antenna ports may differ even in terms of large-scale properties. A QCL indicator may be used to indicate the long-term channel properties of different antenna ports and different reference signals. For example, NR-SS and PBCH-dedicated DMRS may be assumed QCL even they are not in the same antenna port. In multiple transmission point (TRP) (multi-TRP) transmission, NR-SS and PBCH-dedicated DMRS may not be assumed QCL depending on whether or not they are in the same location or not. A QCL indicator may be indicated in NR-SS signal. If a message-based NR-SS is used, the QCL indicator may be carried by a Sync payload. If a sequence-based NR-SS is used, the QCL may be embedded in either NR-PSS or NR-SSS or combination of both. For example, different frequency and/or time relative offset may be used to indicate QCL. Different root indices or cyclic shifts of ZC sequence may be used to indicate QCL. Furthermore, different combinations of X and Y components in either NR-PSS or NR-SSS may be used to indicate QCL. Once QCL is indicated to the WTRU, the WTRU may use both NR-PSS and/or NR-SSS as combined reference signal together with NR-PBCH-dedicated DMRS for channel estimation. QCL-aided initial access and NR-PBCH demodulation may be performed. Such QCL parameters may include but not limited to Doppler spread or shift, channel average delay, channel average delay spread, channel average gain, beam correlation and spatial correlation.

Figure 12:
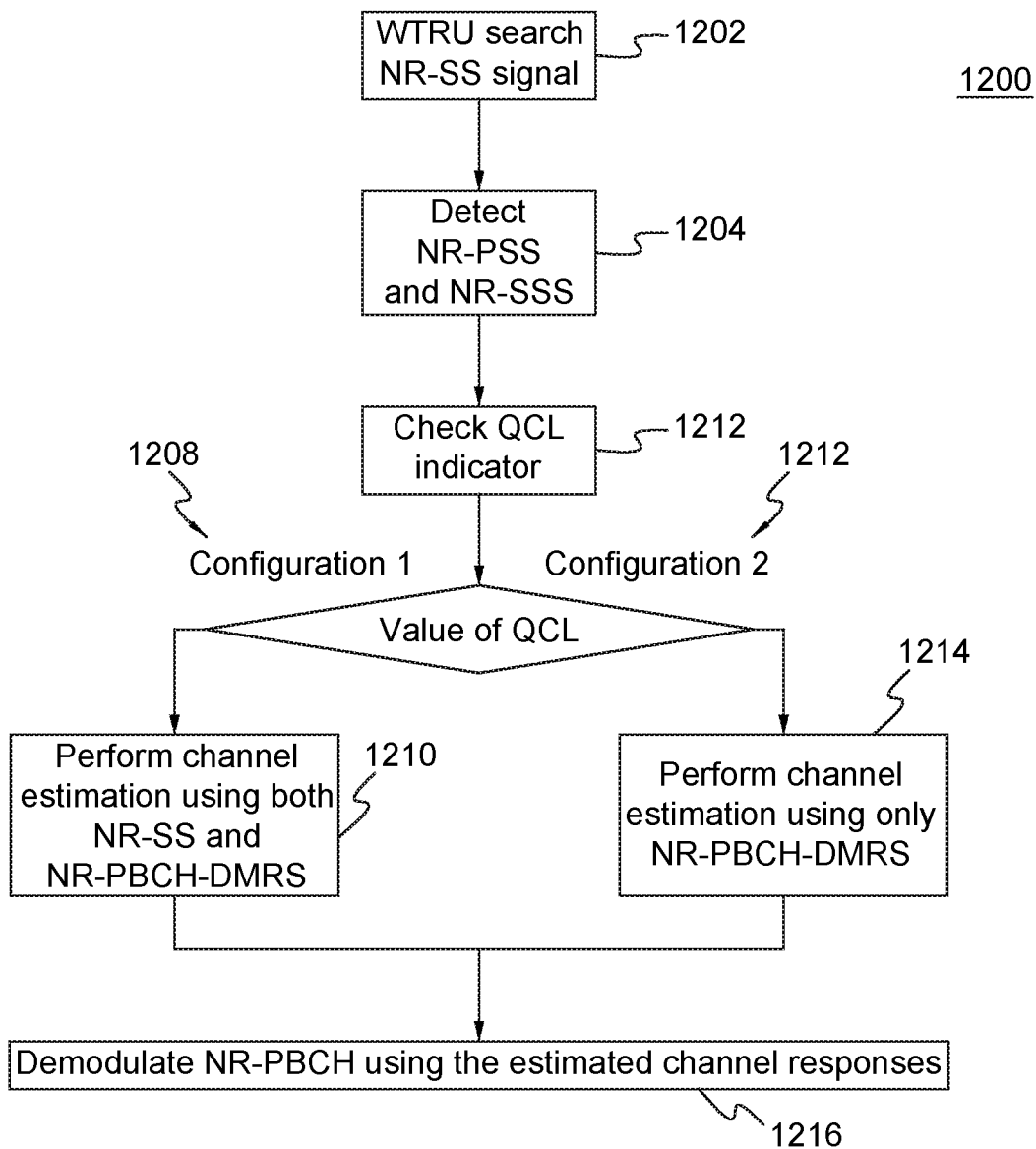
FIG. 12 is an example a QCL indicator-aided or assisted initial access procedure and NR-PBCH demodulation.

FIG. 12 is a flowchart 1200 which illustrates an example a QCL indicator-aided or assisted initial access procedure and NR-PBCH demodulation. Demodulation of an NR-PBCH assisted by a QCL indicator is depicted in FIG. 12. In this method, a QCL indicator is introduced to assist NR-PBCH demodulation. Depending on the value of the QCL, different configurations of channel estimation may be used for NR-PBCH demodulation. One exemplary method for NR-PBCH demodulation assisted by a QCL indicator is detailed as follows. A WTRU may search 1202 for an NR-SS signal and may detect 1204 NR-PSS and NR-SSS. A received QCL indicator and/or the value of the QCL indicator may be checked. If the QCL indicates a first configuration, for example configuration 1 1208, the WTRU may perform channel estimation 1210 using both NR-SS and NR-PBCH-DMRS. If the QCL indicates a second configuration, for example configuration 2 1212, the WTRU may perform channel estimation 1214 using only NR-PBCH-DMRS. The WTRU may demodulate 1216 the NR-PBCH signal and channel using the estimated channel responses from either configuration 1 1208 or configuration 2 1212.

Multi-antenna technologies may be used for transmission of NR-PBCH. For example, two port space frequency block coding (SFBC) and two port precoder cycling may be used as multi-antenna technologies for NR-PBCH. A single antenna port may also be used for simplicity reasons. When more than one multi-antenna technology is used for NR-PBCH, information for multi-antenna technologies used for NR-PBCH may be indicated to a WTRU. Such indication may be conveyed via NR-PSS and/or NR-SSS to indicate the one or more multi-antenna technologies or in one embodiment, a MIMO scheme or method to use for NR-PBCH. Both digital and analog beamforming technologies may be used. A hybrid digital and analog beamforming scheme may also be used.

Precoder cycling may be used as one of the indicated multi-antenna technologies. Both open-loop and semi-open loop methods may be used. A precoder using a large delay cyclic delay diversity (CDD) and/or small delay CDD, may be used. Precoder cycling patterns may be performed in time and/or frequency and may be predetermined and known to the WTRU. Both an NR-PBCH signal and a channel comprising self-contained DMRS within the NR-PBCH signal may use the same precoder sets and the same precoder cycling patterns may be applied. A gNB or TRP may perform digital beam sweeping in time and/or frequency. Digital beamforming using precoder cycling or SFBC may be combined with analog beamforming and beam sweep for NR-PBCH.

Exemplary precoder cycling designs for NR-PBCH are disclosed herein. A transmission of NR-PBCH may be based on two antenna ports with precoder cycling. The transmission on these two ports may have the same or different kinds of precoders and precoder schemes, for example, open-loop (including large delay CDD or small delay CDD), semi-open loop or the like may be utilized.

In semi open-loop, the gNB or TRP may apply a precoder, which may be expressed as $W=W_1 \cdot W_2$, where the wideband precoding matrix $W_1$ represents the long-term statistics and the (narrow band) precoding matrix $W_2$ represents an instantaneous channel condition. In a semi open-loop PBCH scheme, the long-term precoding matrix $W_1$ is fed back from one or more WTRUs to the gNB. This may actually define the set of DFT beams to be used for this WTRU, implying the approximate direction of the WTRU. It should be noted that this semi open-loop procedure may work for a connected mode WTRU. If WTRUs of a cell are located in certain small range of areas of a gNB, then the semi open-loop PBCH scheme might be applied, where $W_1$ may be determined by the WTRU locations. The gNB may then cycle the narrow band precoding matrix $W_2$ to determine a final precoder. The cycling patterns may be in time and/or frequency domain.

A digital precoder or an analog beamformer may be used for $W_1$ and a digital beamformer may be used for $W_2$. One exemplary design may use analog beamforming, for example, $W_1$ based on DFT and a digital precoder $W_2$. Precoder cycling may be performed on $W_2$.

In another exemplary design, a digital $W_1$, for example, DFT-based and $W_2$ may be used. Precoder cycling may be performed on $W_2$ or both $W_1$ and $W_2$.

In another exemplary design, a digital $W_1$, for example, a precoder codebook-based and $W_2$ may be used. Precoder cycling may be performed on $W_2$, or both $W_1$ and $W_2$. Precoder cycling may be performed on analog, digital beamforming or precoding or combination of the two.

Figure 13:
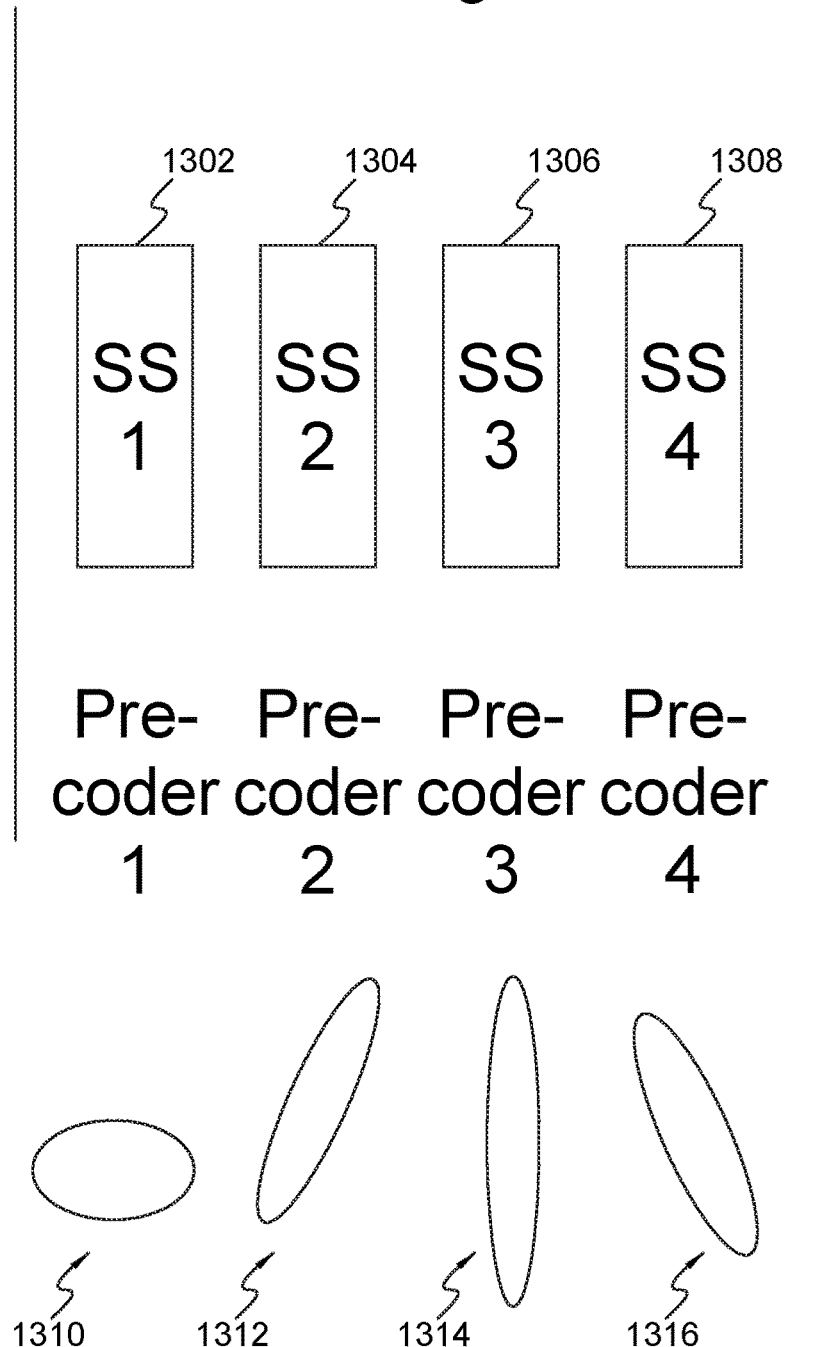
FIG. 13 is an example of using SS blocks associated with different precoders.

FIG. 13 is an example 1300 of using SS blocks associated with different precoders. In an open-loop CDD transmission of PBCH, the CDD coefficients could be applied at subcarrier level or at RB level. The cycling patterns could be in time and/or frequency domain. Since the PBCH is repeatedly broadcast over a certain time period, each PBCH message may be associated with a transmission pattern of PBCH. FIG. 13 shows an example of 4 SS blocks 1302-1308 each having the same contents. Each SS block 1302-1408 may be associated with a different precoder 1310-1316, which points the PBCH message to different directions. In this example, SS1 1302 is associated with precoder 1 1310, SS2 1304 is associated with precoder 2 1312, SS3 1306 is associated with precoder 3 1314 and SS4 1308 is associated with precoder 1 1316. Each one of precoder 1-4 1310-1316 is shown drawn for illustration purposes only. A quality of each one of the precoders selected may be similar to or different from traditional MIMO precoders of 4G. For example, a three dimensional (3D) precoder may be used. In this way, a third dimension may consider WTRU elevation in a vertical domain. Other precoders may support highly parallel antenna technology. Existing MIMO precoding, for example 4G technologies may also be used. Existing codebooks may be used. New codebooks may be added on top of existing codebooks in a backwards compatible and/or flexible deployment scenario.

Figure 14:
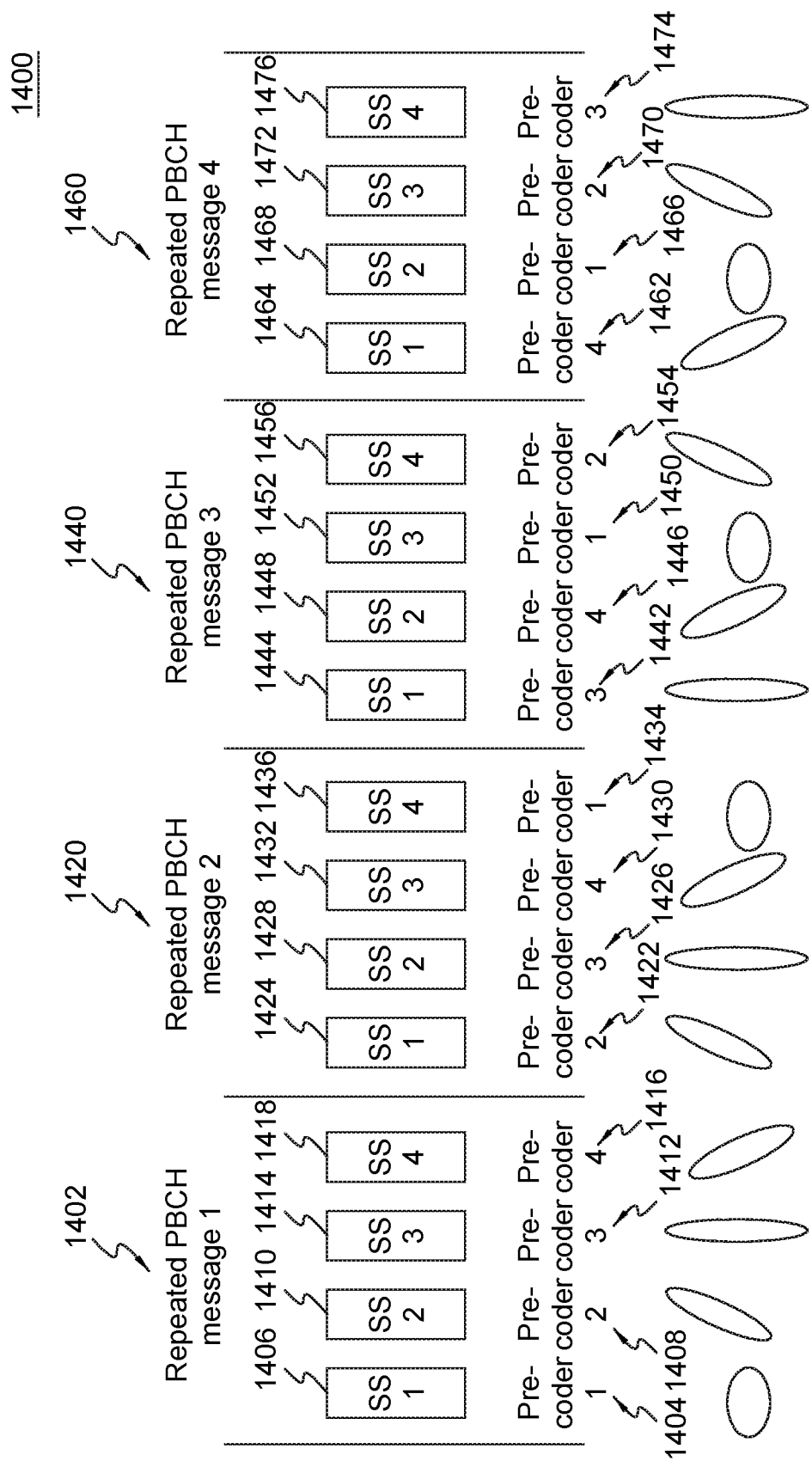
FIG. 14 is an example of using SS blocks associated with different precoders, shifted over different PBCH messages.

FIG. 14 illustrates examples 1400 of which SS blocks are associated with different precoders, shifted over different PBCH messages 1402, 1420 1440, 1460. Among different PBCH messages 1402, 1420 1440, 1460, the association between precoder and SS block might be the same or might be different. In one embodiment the association may be shifted. FIG. 14 shows an example illustrating ways in which the association of the precoder and the SS block shifts with PBCH messages 1402, 1420 1440, 1460. Specifically, for the first PBCH message 1402, the SS block i is associated with precoder i. In this way, pre-coder 1 1404 is associated with SS block 1 1406, pre-coder 2 1408 is associated with SS block 2 1410, pre-coder 3 1412 is associated with SS block 3 1414 and pre-coder 4 1416 is associated with SS block 4 1418. For the second PBCH message 1420, the SS block i is associated with precoder i+1 mod 4; etc. In this way, pre-coder 2 1422 is associated with SS block 1 1424, pre-coder 3 1426 is associated with SS block 2 1428, pre-coder 4 1430 is associated with SS block 3 1432 and pre-coder 1 1434 is associated with SS block 4 1436. In message 3 1440, pre-coder 3 1442 is associated with SS block 1 1444, pre-coder 4 1446 is associated with SS block 2 1448, pre-coder 1 1450 is associated with SS block 3 1452 and pre-coder 2 1454 is associated with SS block 4 1456. In message 4 1460, pre-coder 4 1462 is associated with SS block 1 1464, pre-coder 1 1466 is associated with SS block 2 1468, pre-coder 2 1470 is associated with SS block 3 1472 and pre-coder 3 1474 is associated with SS block 4 1476. As noted above with respect to FIG. 13, various precoding schemes may be used with FIG. 14 as well. Some precoding schemes may include nonlinear precoding (NLP) schemes, for example, Tomlinson-Harashima precoding or vector perturbation. Other hybrid precoding schemes may involve semi-dynamic or dynamic switching between linear precoding and NLP.

Figure 15:
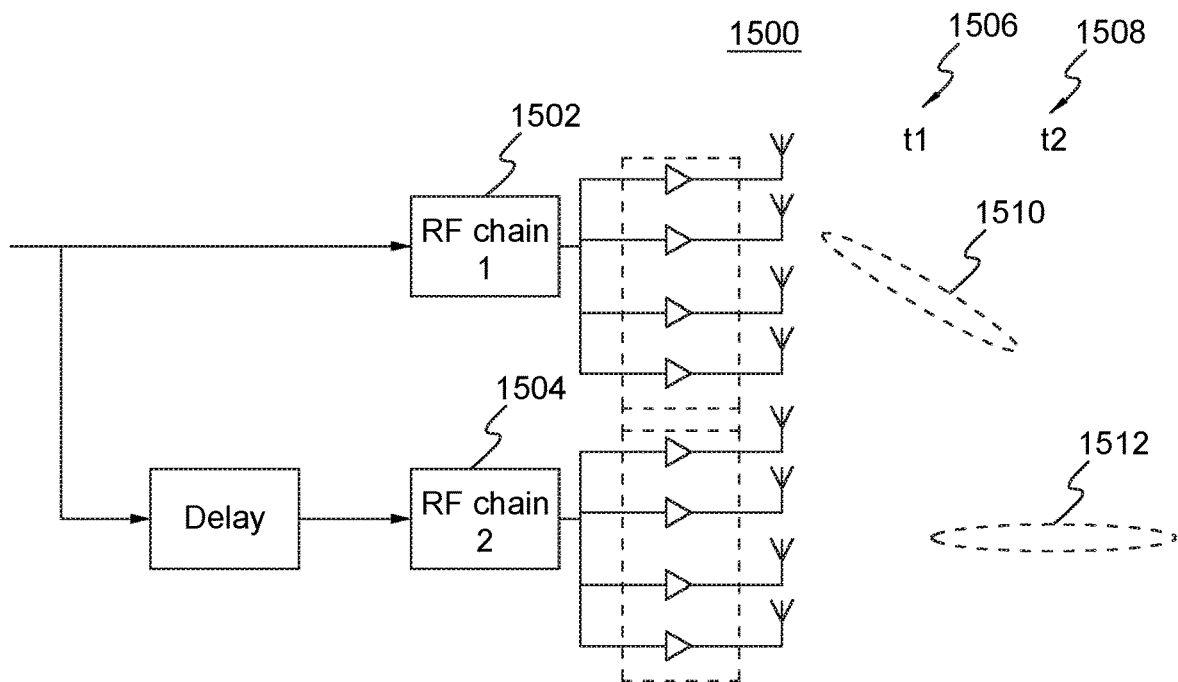
FIG. 15 is an illustration of an exemplary combining two port cyclic delay diversity (CDD) with analog beamforming for diversity.

FIG. 15 is an illustration of transmission circuitry 1500 configured for an exemplary combination of two port cyclic delay diversity (CDD) with analog beamforming for diversity. The above digital beam sweeping scheme of FIG. 14 could be combined with an analog beam sweep. FIG. 15 shows an example of combining CDD with analog beamforming. This is aimed at exploring more diversity gain over spatial, frequency and time domains. FIG. 15 illustrates two RF chains, RF chain 1 1502 and RF chain 2 1504. RF chain 1 1502 circuitry may be configured to transmit 1510 at time t1 1506 using a first precoder. After a delay period which may be implemented, for example by a timer or clock circuitry 1510, a second transmission may be sent 1512 by RF chain 2 1504 using a second precoder. Second transmission may be sent at time t2 1508. First transmission 1510 and second transmission 1512 may overlap in time partially, fully or not at all.

Figure 16:
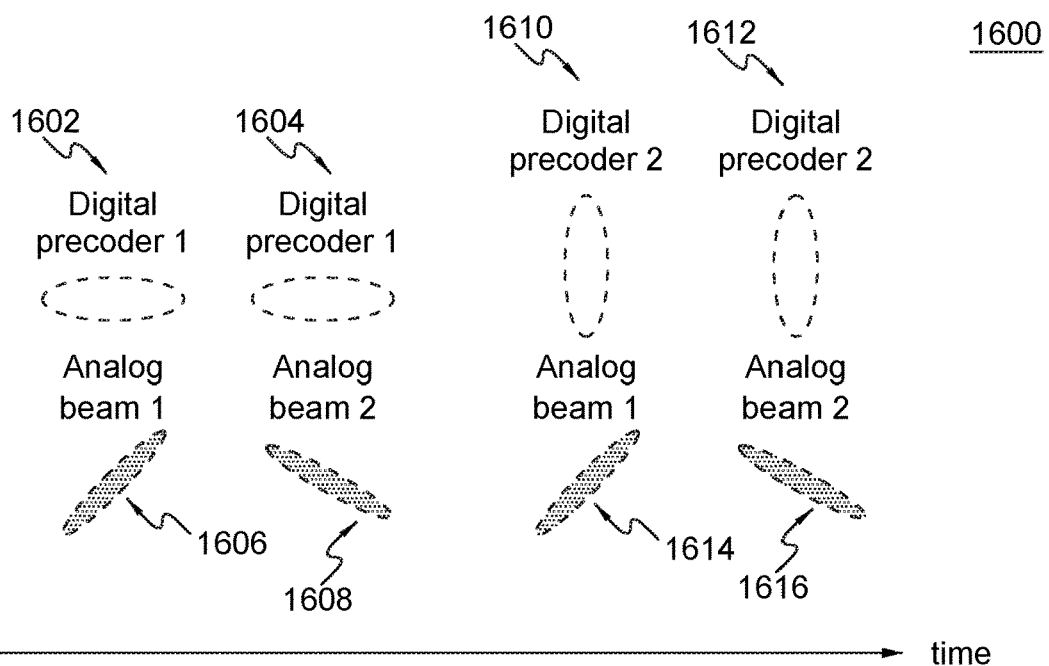
FIG. 16 is an illustration of an exemplary combination of digital and analog beam forming in time domain.
Figure 17:
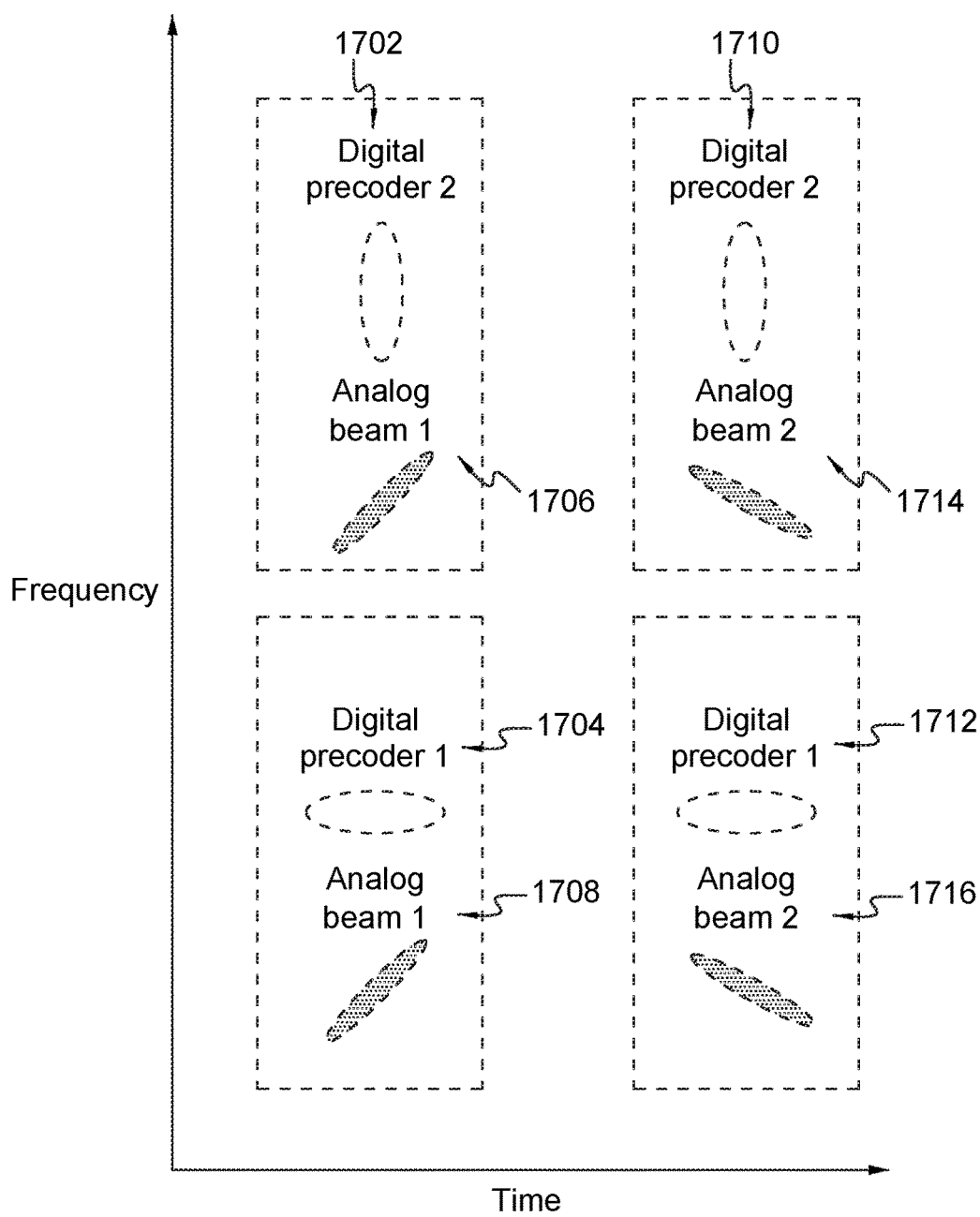
FIG. 17 is an illustration of an exemplary combination of digital and analog beam forming in time domain and frequency domain.

FIG. 16 is an illustration 1600 of an exemplary combination of digital and analog beam forming shown in time domain. Suppose there are $n_1$ patterns in digital beam sweeping MIMO schemes, and $n_2$ patterns in analog beam sweeping schemes. The total of $n_1 \cdot n_2$ combinations for cycling may be supported. An exemplary combination is shown in FIG. 14, where $n_1=n_2=2$. Furthermore, only an $n_2$ beam sweep for an analog beam may be needed, while the digital beam sweep is kept simultaneously. An alternative embodiment is to do the $n_2$ beam sweep for analog beam sweep in time domain, while the $n_1$ beam sweep for digital sweep may be done in the frequency domain, as shown in FIG. 17. As shown in FIG. 16, a same digital precoder 1602 and 1604 may be used for a first and second transmission. For those same transmissions, two different analog beams 1606 and 1608 may be generated. For a third and fourth transmission, a second digital precoder 1610 and 1612 may be used. Second digital precoders 1610 and 1612 may be the same digital precoder. Analog beam 1 1614 and analog beam 2 1616 may be different analog beams to achieve diversity.

FIG. 17 is an illustration of an exemplary combination of digital and analog beam forming in time and frequency domain. In this embodiment, alternative analog beams are illustrated in time domain while alternative digital beams are shown in frequency domain. With reference to FIG. 17, in a first transmission in time a second digital precoder 1702 is used in a same frequency as a first digital precoder 1704. At the same time, two same analog beams 1706 and 1708 are transmitted. As a second transmission at another time, two different digital precoders 1710 and 1712 are used along with two same analog beams 1714 and 1716.

Figure 18:
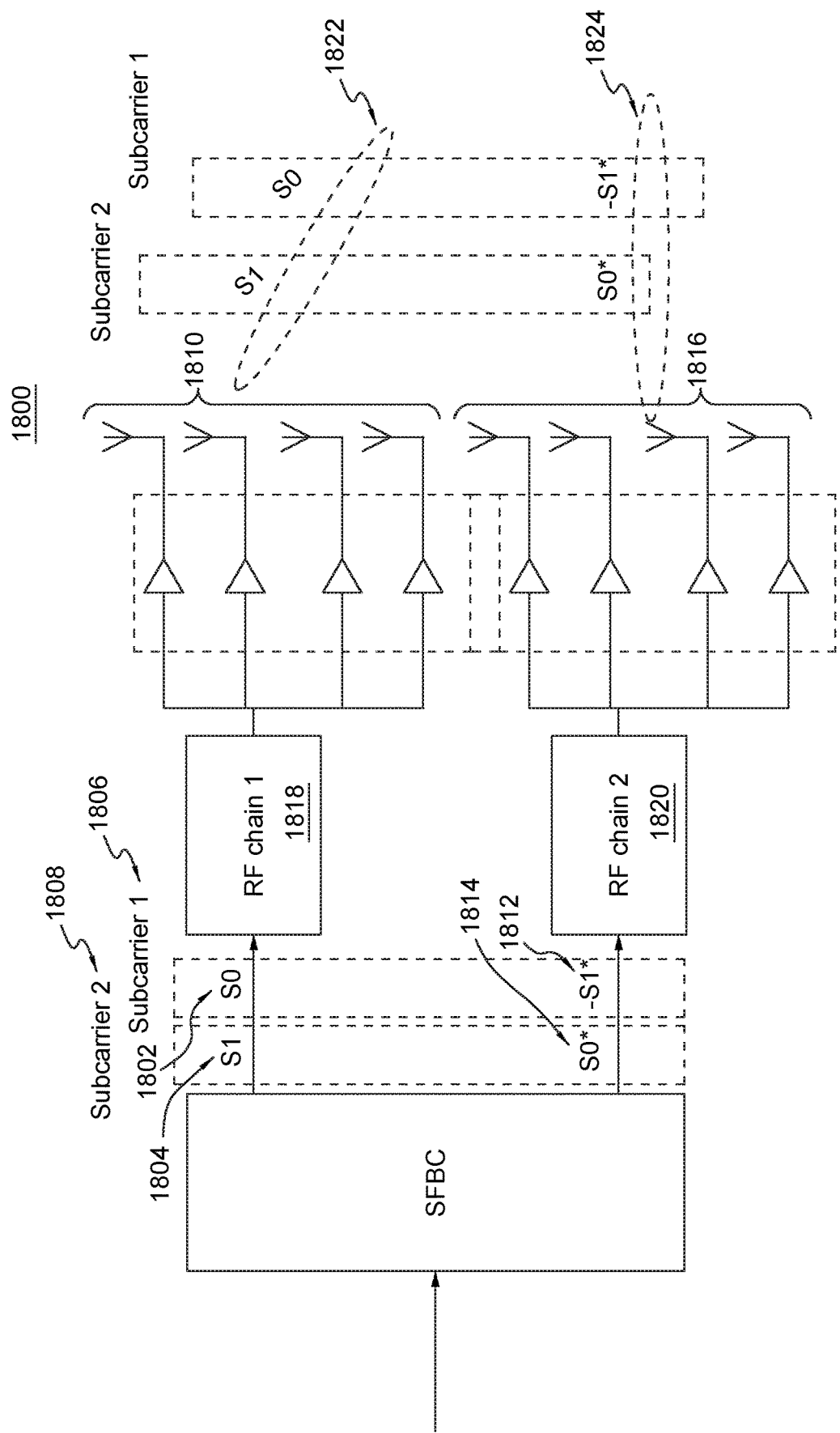
FIG. 18 is an illustration of an exemplary combining two port space frequency block coding (SFBC) with analog beamforming for diversity.

FIG. 18 is an illustration of an exemplary combining two port space frequency block coding (SFBC) transmitter 1800 with analog beamforming for transmit diversity. Using circuitry as shown in FIG. 18, transmission of NR-PBCH may be based on one or more transmit diversity schemes including a two port SFBC scheme. In a high frequency band for example, a transmission on each port may be associated with multiple antenna elements, and the analog beamforming on each port could be used for further diversity gain. FIG. 18 shows exemplary SFBC designs combined with analog beamforming to achieve further diversity gain. As shown, the symbols S0 1802 and S1 1804 are sent over different subcarriers, subcarrier 1 1806 and subcarrier 2 1808, on antenna port 1 1810, while the symbols −S1* 1814 and S0* 1812 are sent over different subcarriers, subcarrier 1 1806 and subcarrier 2 1808, on antenna port 2 1816. In this example, diversity in the digital domain is achieved via the reversing of S1 1804, S0 1802 and S0* 1814, −S1* 1812. In this way, a bit stream provided to each of RF chain 1 1818 and RF chain 2 1820 is inverse. In the analog domain, RF chain 1 1818 and RF chain 2 1820 may each use different beamforming techniques. If so, there may be different beams shapes 1822 and 1824 transmitted to a receiver.

In one embodiment, the analog beamforming circuitry may adjust beam direction and beam width for each of the antenna ports 1810 and 1816 in an SFBC scheme 1800. The control of the analog beamforming may be dependent on prior knowledge of WTRU geographic distributions. WTRU geographic distributions or beam-location profiles may be provided by WTRUs via uplink signalling or grant-free access.

Communication at frequencies above 6 GHz for 5G NR will likely rely on highly directional transmission and reception. The first steps for establishing a reliable link are the so called initial access procedures, including cell search, PBCH transmission, and an RACH procedure. The procedures associated with the current 4G LTE systems may be used as a baseline. However, since LTE is limited to below 6 GHz, directional transmission and reception is not required and is not built into these initial access procedures. Therefore new initial access procedures may need to be designed that take into account the additional complexities that are associated with directional communication systems. Each transmission and reception beam may cover a limited angular space and therefore a procedure for identifying a beam pair that may be used for communication may need to be established. This procedure may be performed via a beam sweep at the transmission and/or reception points. An addition of a beam sweep procedure may add significant complexity and power consumption, overhead, latency and the like may need to be taken into account.

A conventional beam sweep procedure may be include a TRP and WTRU "testing" all combinations of beam pairs and choosing the beam pair that may provide the best performance. The "testing" may be performed by the TRP transmitting a known sequence on a given beam while the WTRU receives a given beam and measures the resulting SINR. The measurement may be repeated for all possible beam pairs and the beam pair that returns the maximum SINR value is chosen. A framework for this type of procedure has been defined at the TRP for 5G NR as depicted in FIG. 19.

Figure 19:
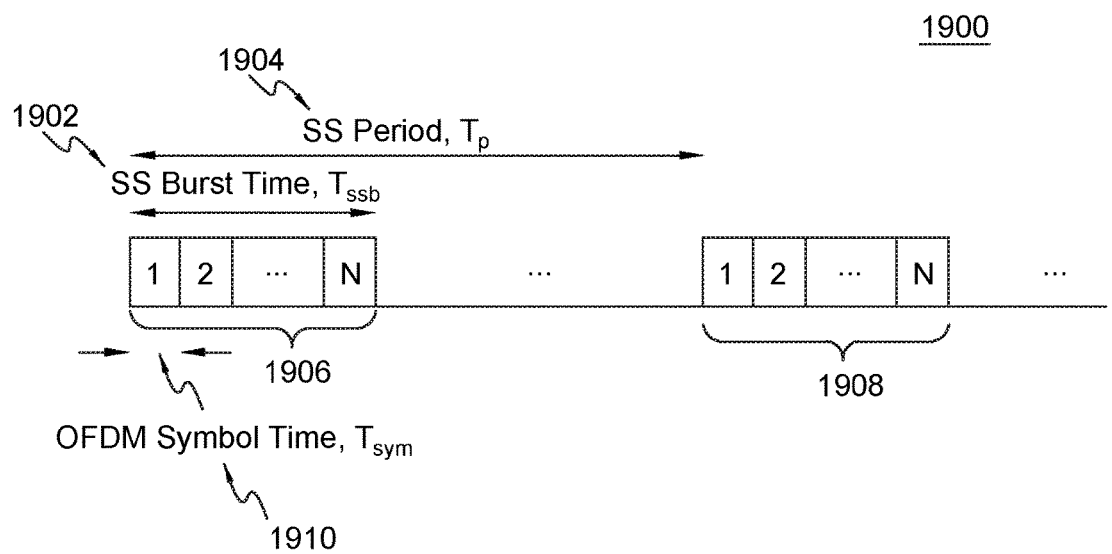
FIG. 19 is an example transmission point (TRP) transmission structure for initial access.

FIG. 19 is an exemplary TRP transmission structure 1900 which may be used for initial access. Transmission of the initial access based signals occur during a synchronization signal burst time, $T_{ssb}$ 1902 and repeats every $T_p$ seconds of an SS period 1904. To accommodate a beam sweep procedure $T_{ssb}$ 1902 may be comprised of an integer number of OFDM symbols 1906 and 1908, where, as an example, each OFDM symbol is transmitted at an OFDM symbol time $T_{sym}$ 1910 with a different beam that covers a different angular region. Using this basic framework, a WTRU may additionally sweep through a set of beams and ultimately decide on a beam pair to use for subsequent communications. In this way, for any time $T_p$ seconds it may be possible to cycle through and test a plurality of plurality of beams during initial synchronization. This may provide for a substantial performance improvement as opposed to performing an additional test after synchronization.

Figure 20:
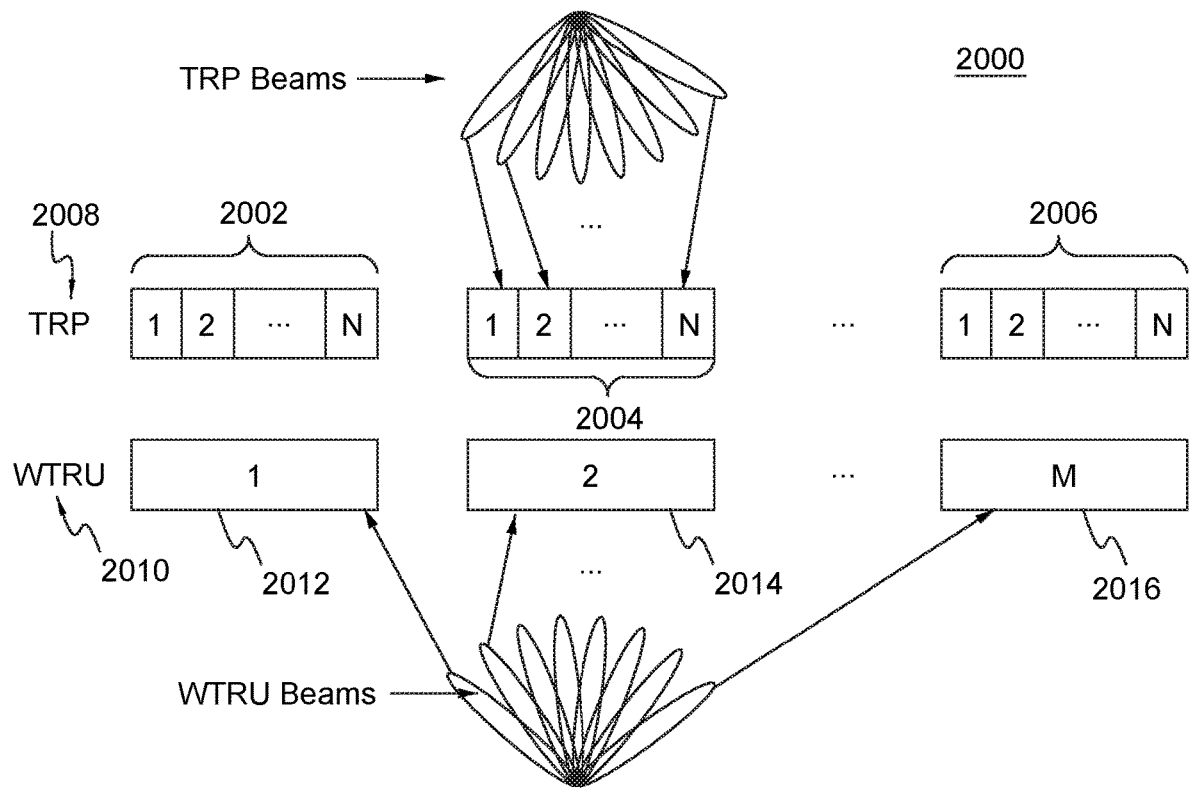
FIG. 20 is an example single stage exhaustive search beam sweep procedure.

One straightforward way to design a full beam sweep procedure using the framework defined in FIG. 19 is to perform an exhaustive search over all available beam pairs at the TRP and WTRU, as shown in FIG. 20.

FIG. 20 illustrates an example single stage exhaustive search beam sweep procedure 2000. In FIG. 20, each SS burst 2002, 2004, 2006 may be comprised of N OFDM symbols, where each symbol transmits a single beam and the N beams cover the entire angular region of the TRP 2008. Also shown, the WTRU 2010 receives from a single beam for the entire SS burst so that a full beam sweep requires M SS bursts 2012, 2014, 2016 to test all possible beam pairs. It should be noted that in order to account for signal blockage at the WTRU 2010, it is likely that there will be more than one receiving array. In one example, an array may be on each side of a rectangular device. With this being the case and with each array supporting M beams the total number of WTRU beams, therefore the total number of SS bursts for a full beam sweep is 4M. As mentioned, system overhead, access latency, and overall power consumption are concerns for the initial access procedures. These concerns are made clear herein with respect to overhead, latency and power consumption. In terms of overhead, each OFDM symbol used for synchronization is not available for other purposes, such as data transmission. This may be a concern for a large N. The duration of the entire procedure may also be viewed as additional overhead with respect to reduced time that may be used for communication. With respect to latency, one of the things that provides an enhanced user experience is the ability to establish a communication link quickly. In this sense, a large M, further coupled with more than one array to combat blocking, may drastically increase access time. Power consumption is another concern, and generally speaking, low power consumption is desirable. Low power consumption is especially desirable at the WTRU since a WTRU is typically a battery operated device. Each beam pair measurement requires WTRU power so that limiting the number of beam pair measurements may be used to reduce power consumption.

Figure 21:
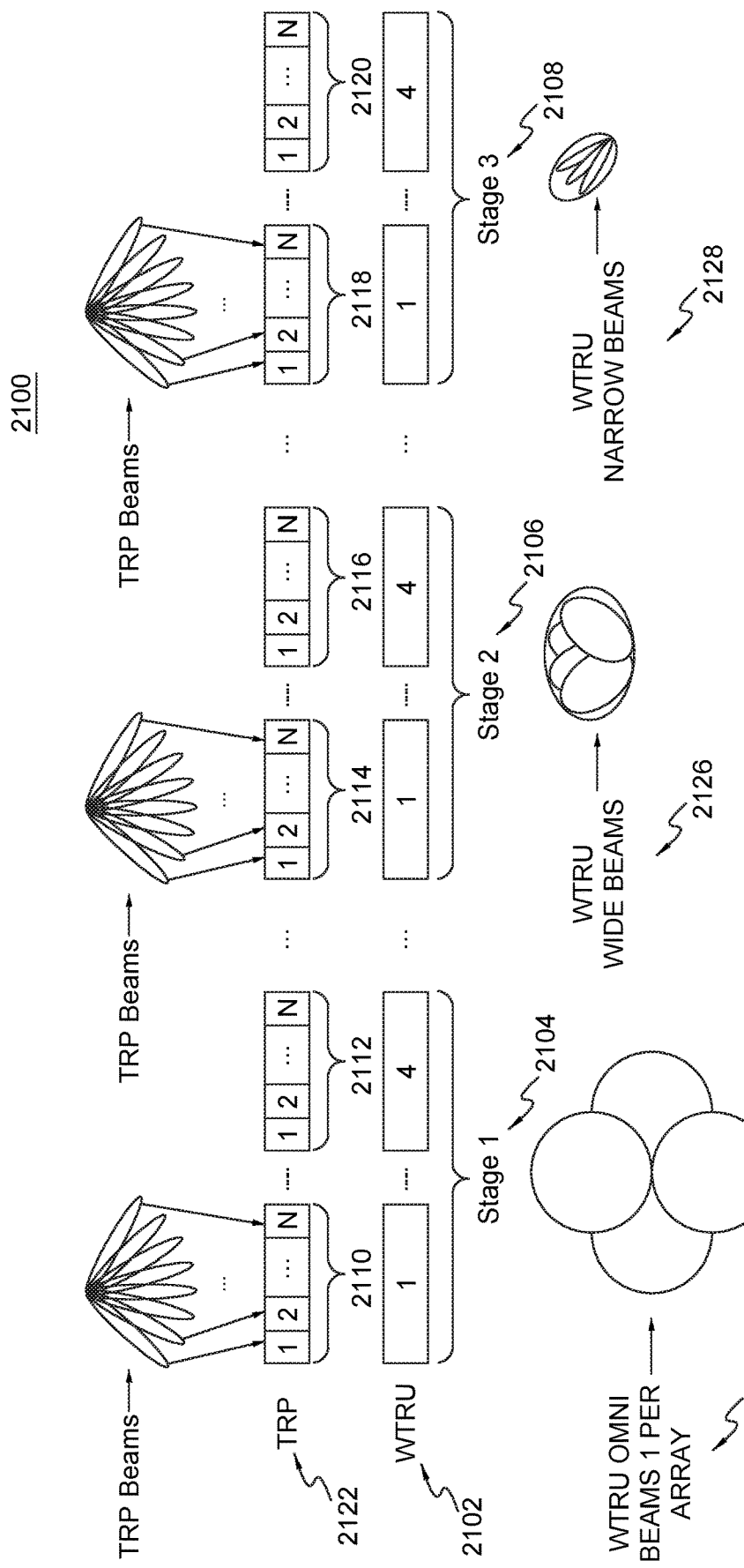
FIG. 21 is an example of a multi stage WTRU hierarchical beam sweep procedure.

FIG. 21 is an example of a multi stage WTRU hierarchical beam sweep 2100. An alternative to the single stage exhaustive beam sweep method shown in FIG. 20 is a multi-stage hierarchical approach 2100. A search may be started with wide beams covering relatively large angular regions in a first stage and then gradually decreasing the angular search space and width of beams used in later stages. This gradual decrease may be applied at the TRP only, WTRU only, or both the TRP and WTRU simultaneously. For illustrative purposes an example of a three-stage hierarchical WTRU beam sweep is shown in FIG. 21. In this example, the WTRU 2102 is using four arrays, each of which covers its angular region using 12 beams. From a latency perspective, an exhaustive beam sweep procedure may require 4*12=48 SS bursts. The three-stage 2104-2108 procedure shown may require only 4+4+3=11 SS bursts 2110-2120. Additionally, from a power consumption perspective the exhaustive beam sweep procedure requires 48N measurements, but the current three stage procedure required only 11N measurements to be performed. In both cases this is an approximate 77% savings. The following disclosure outlines the procedure in more detail. For all stages 2104-2108 the TRP 2122 transmits N beams per SS burst 2110-2120 over N OFDM symbols. The WTRU 2102, on the other hand, operates differently over time. In a first stage 2104, WTRU 2102 receives using a single quasi-Omni beam per array 2124 per SS burst. In a second stage 2106, the WTRU 2102 receives from four wide beams 2126 from the array which resulted in the maximum SINR from stage 1 2104. In a third stage 2108, the WTRU 2102 receives from three narrow beams 2128 that are spatially contained within the wide beam that resulted in the maximum SINR from stage 2 2106.

Figure 22:
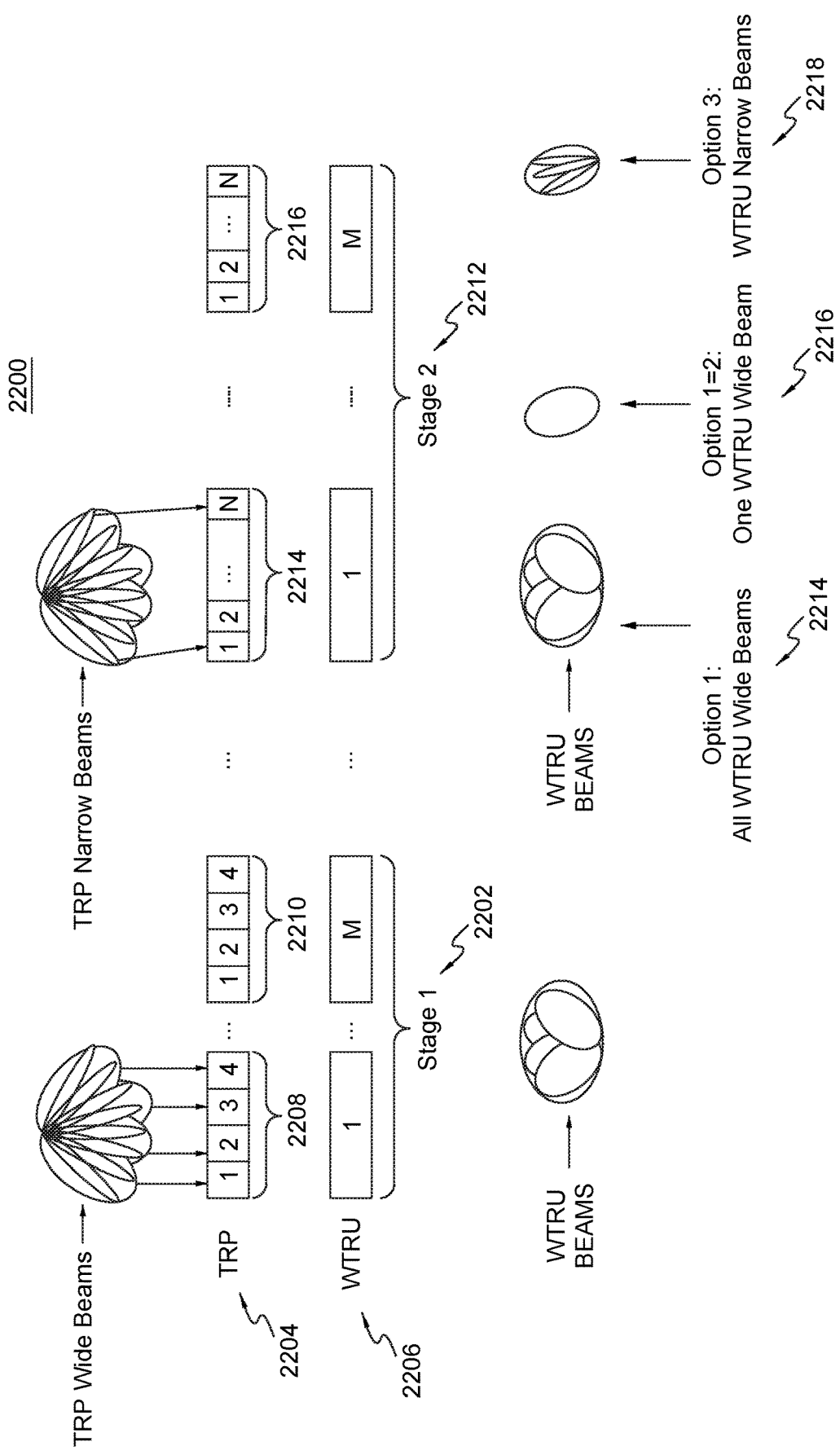
FIG. 22 is an example of a multi stage TRP and TRP/WTRU hierarchical beam sweep procedure.

An additional example of using a multi-stage TRP hierarchical beam sweep is shown in FIG. 22. It should be noted that FIG. 22 also shows an embodiment where the WTRU may be hierarchical, so that a multi-stage TRP/WTRU hierarchical beam sweep is possible. For these cases, an exemplary procedure is as follows. In a first stage 2202, the TRP 2204 transmits from four wide beams for per SS burst 2208-2210 over 4 OFDM symbols. Meanwhile, in the first stage 2202, the WTRU 2206 receives from M beams, using a single beam per SS burst 2208-2210. In a second stage 2212, the TRP transmits from N narrow beams per SS burst 2214-2216 over N OFDM symbols. In the second stage 2212, the WTRU 2206 has three options 2214-2218. In a first option 2214, the WTRU 2206 receives from M beams, using one beam per SS burst, however the WTRU 2206 may only measure the TRP narrow beams that are spatially contained within the TRP wide beam detected in the first stage 2202. In a second option 2216, to further reduce power consumption, the WTRU 2206 may receive from only the one WTRU beam that resulted in the largest SINR measurement from the first stage 2202. In a third option 2218, to increase SINR from directional gain the WTRU may use a hierarchical approach and receive from a set of narrow beams that are spatially contained within detected WTRU 2206 wide beam from the first stage 2202.

For the first two options 2214-2216 if it is assumed there are three narrow TRP beams per wide beam, the number of beam pair measurements required is 4M+3M for option 1 and 4M+3 for option 2. This compares to the number of measurements required in the single stage exhaustive procedure where the number of measurements required is 12M. This results in an approximately 42% and 60% savings respectively. The third option 2218 combines TRP 2204 and WTRU 2206 hierarchal beam sweep. In this case, a number of measurements required is $4M+3M_{narrow}$. In this case, if it is assumed that M=4 and $M_{narrow}=3$, the number of measurements required is 25. It should be noted that this case uses narrower beams in stage 2 2212 and therefore may see an additional array gain associated with the narrow beam compared to option one 2214 and option two 2216. The single stage exhaustive comparison for this option would require 12*12=144 measurements, so that this third option 2218 results in an approximately 83% savings.

Another aspect of an initial access procedure to consider is the amount of interference seen at the WTRU from other TRPs. The multi-stage procedures that were primarily used to reduce latency, power consumption, and overhead may be further modified to also address the interference issue. The main idea for reducing interference is to capitalize on the use of the multiple stages so that information from earlier stages may be used in later stages to potentially "turn off" by filtering out certain TRP beams.

Figure 23:
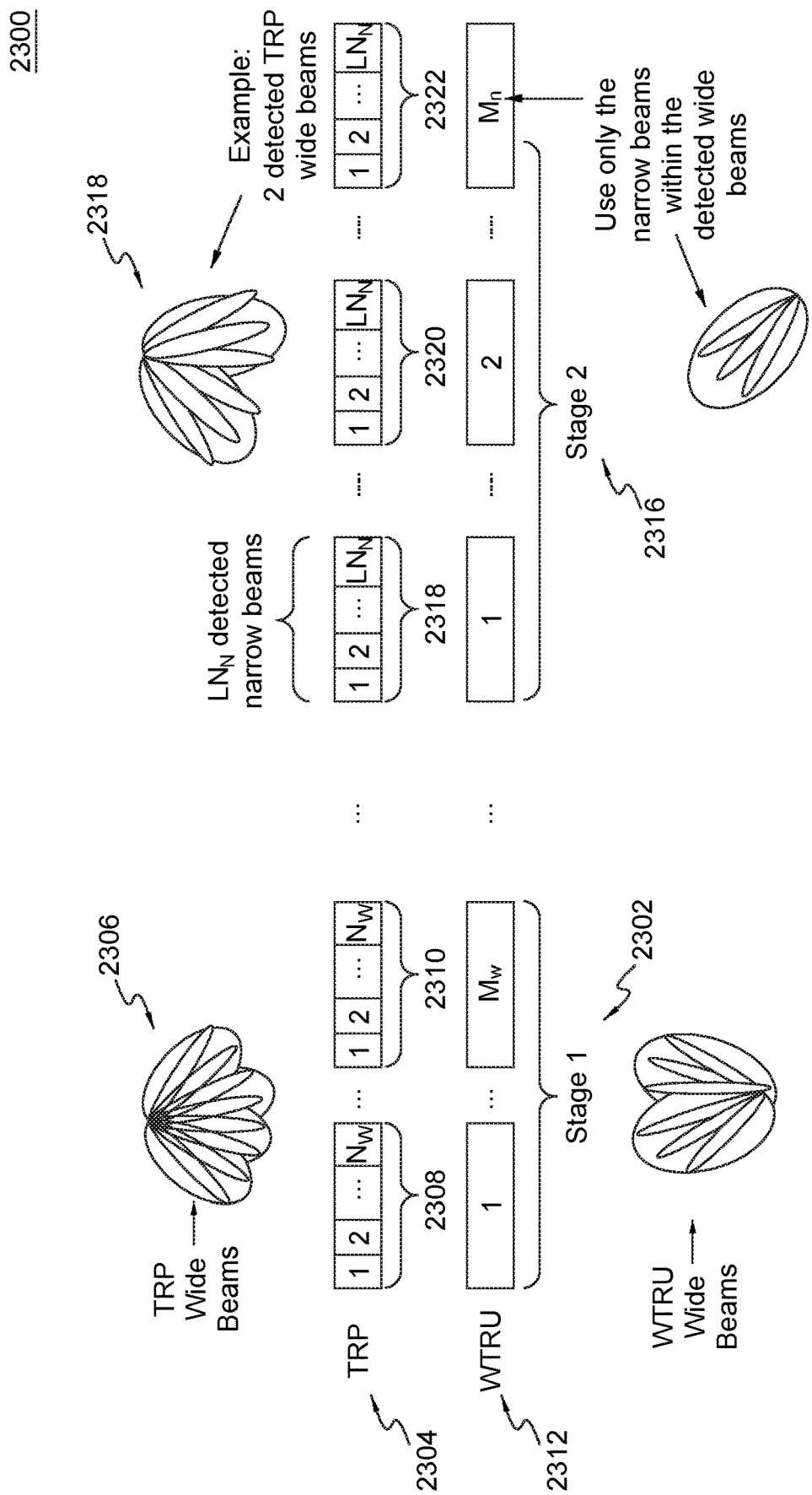
FIG. 23 is an example of a multi stage TRP/WTRU hierarchical, TRP selective beam sweep procedure.

FIG. 23 illustrates an example of such an approach, which is referred to as a selective beam sweep, combined with a multi-stage TRP/WTRU hierarchical beam sweep procedure. A general description of this procedure is detailed as follows. In a first stage 2302, a TRP 2304 transmits from $N_w$ wide beams 2306 for each SS burst 2308-2310 over $N_w$ OFDM symbols. In the same stage 2302, a WTRU 2312 receives from $M_w$ wide beams 2314, using one beam per SS burst. In a second stage 2316, the TRP 2304 transmits from only the selected $LN_N$ narrow beams 2318, where L is the total number of wide beams detected from all WTRUs and $N_N$ is the number of narrow beams within each wide beam. The TRP 2304 may repeat transmission for each SS burst 2318-2322.

The TRPs may learn or acquire the information for the detected wide beams either directly from the WTRUs via an uplink using the beam pair from the first stage or indirectly from an anchor TRP for which the WTRU is already attached. A WTRU may receive from $N_N$ narrow beams spatially contained within the WTRU wide beam detected in the first stage.

The procedure illustrated in FIG. 23 combines a TRP hierarchical beam sweep, a WTRU hierarchical beam sweep, and a TRP selective beam sweep in order to maximize the SINR while at the same time reduce power consumption, latency, and overhead. With regard to the improvement in SINR due the reduction in WTRU interference from "other" TRPs, it should be noted that this method may have advantages when either the WTRU density is low and/or the WTRUs are non-uniformly distributed. As an illustration, a circumstance may be considered in which all WTRUs are gathered in a certain geographical area within a TRP coverage area. For example, this may be the case in a sports viewing event or concert. In this case, each WTRU may be accessing the TRP using similarly directed TRP beams, so that once this is learned by the TRP there is no need for the TRP to transmit on certain beams. It should also be noted that in addition to reducing interference, this embodiment may provide for a power consumption savings at the TRP.

Figure 24:
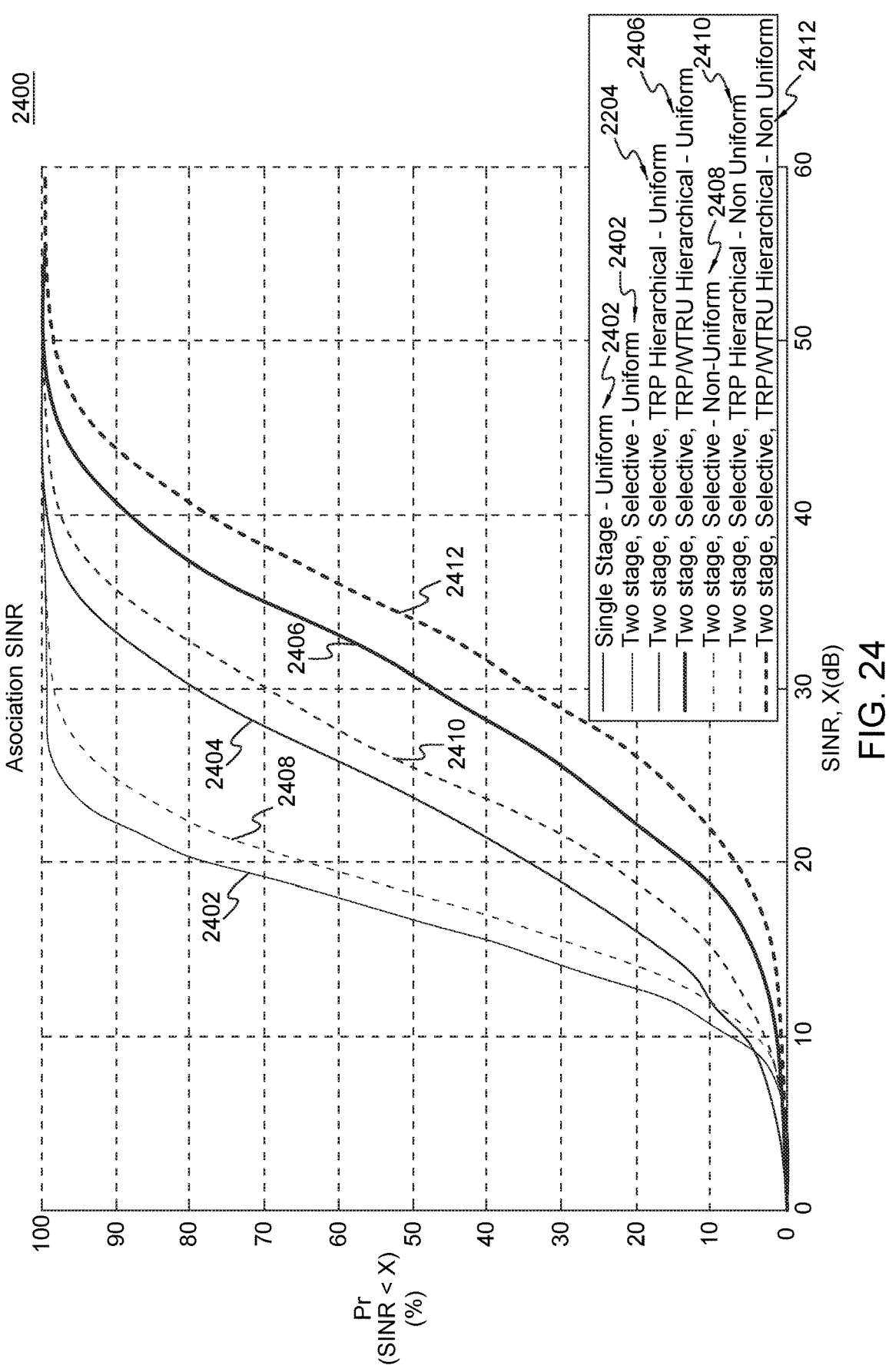
FIG. 24 is an illustration of signal-to-interface-plus-noise ratio (SINR) performance results for various beam sweep procedures.

The advantage of the procedures above may also be seen empirically via system simulations. FIG. 24 illustrates SINR results 2400 from four different beam sweep procedures, three of which are repeated with a non-uniform WTRU distribution to illustrate the TRP selective sweep performance gains. The results of the simulated procedures are summarized herein. One result shown includes a single stage beam sweep 2402. The single stage beam sweep may be a single stage simulation run with a uniform WTRU distribution only, since a second stage is needed to active TRP selective beam sweep. The performance of the single stage beam sweep 2402 is virtually identical to two-stage TRP selective beam sweep procedure with a uniform WTRU distribution. As such, they are both labelled 2402.

There is no hierarchical sweep in two-stage TRP selective beam sweep 2402, so as mentioned above the performance is virtually identical single stage procedure above when the WTRUs are uniformly distributed. When the WTRUs are non-uniformly distributed, an SINR gain based on a reduction in the interference level may be realized. The two-stage selective non-uniform 2408 case is illustrated for comparison.

Another result shown is a two-stage TRP hierarchical selective beam sweep 2404. There is an overall gain with respect to the procedures above based on the TRP hierarchical approach using narrower beams in a second stage. There is also a gain when the WTRUs are non-uniformly distributed again based on a reduction in the interference from TRP beams being "turned off". The two-stage selective TRP hierarchical non-uniform 2410 case is illustrated for comparison.

Another result is a two-stage TRP/WTRU hierarchical selective beam sweep 2406. There is an additional gain based on adding the WTRU hierarchical approach using again narrower beams in a second stage. There is also a gain when the WTRUs are non-uniformly distributed again based on a reduction in the interference from TRP beams being "turned off". The two-stage selective TRP/WTRU non-uniform 2412 case is illustrated for comparison.

Figure 25:
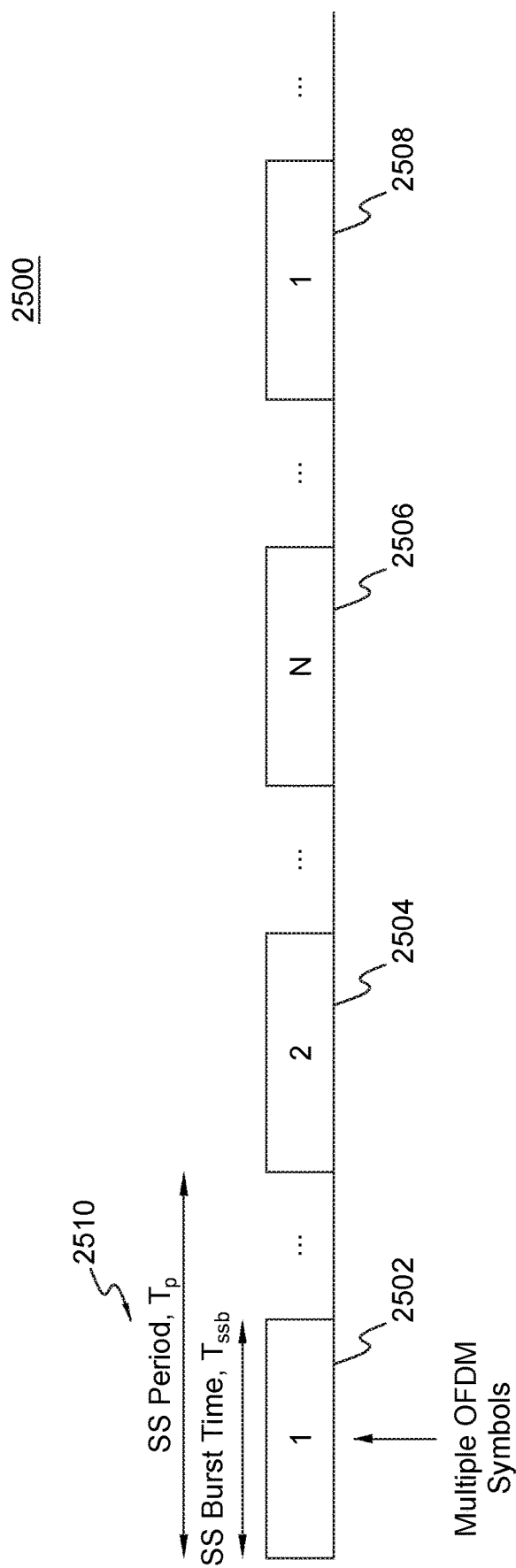
FIG. 25 is an example of an alternate TRP transmission structure for initial access.

FIG. 25 illustrates an alternative form 2500 of the TRP transmission structure shown in FIG. 19. As shown in FIG. 25, the defined SS bursts 2502-2508 and SS period 2510 are still kept. In this case, a single SS burst 2502-2508, which still occupies more than one OFDM symbol is assumed to be transmitted in a single beam direction. The SS burst 2502-

2508 is, as shown before, repeated every $T_P$ seconds in SS period $T_P$ 2510, however in this case instead of repeating the same beam pattern a different beam direction is chosen for each SS burst. After N SS bursts the pattern then repeats. Therefore in this case, a full beam sweep would take a minimum of N SS burst times depending on how a WTRU beam sweep is implemented.

Figure 26:
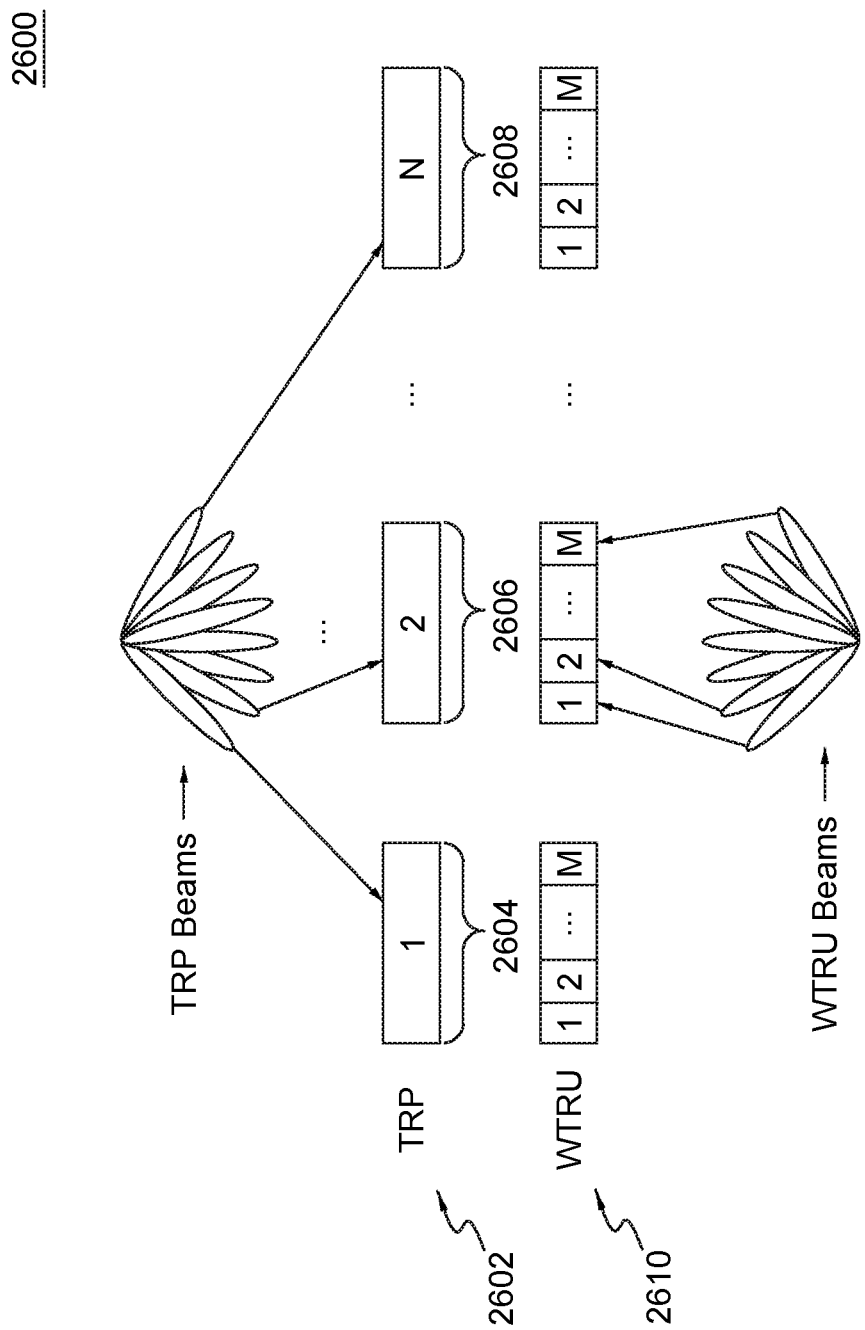
FIG. 26 is an example of an alternative single stage exhaustive search beam sweep procedure.

A straightforward full beam sweep procedure using the framework defined in FIG. 25 may be performed by conducting an exhaustive search over all available TRP and WTRU beam pairs. This procedure 2600, illustrated in FIG. 26, is similar to the procedure shown in FIG. 20, except the roles of the WTRU and TRP are switched with respect to the beam sweep sequencing. The TRP 2602 transmits one of N beam directions during an SS burst 2604-2608 while the WTRU 2610 sequences through all M beam directions during each SS burst 2604-2608. With this process, a full beam sweep requires N SS burst times to complete.

An general observation may apply to cell center WTRUs. In general, it is likely that less antenna gain may be required of the cell center WTRUs as compared to cell edge WTRUs. This is likely to be true during and before completion of the initial access procedure and in order to enable successful data transfers. Furthermore, it should be noted that multiple RF chain transmission is more feasible at the TRP than at the WTRU due to things like cost and power. With these observations in mind, a beam sweep procedure may be performed based on the transmission structure shown in FIG. 25. The procedure may reduce access latency, and save processing power for cell center WTRUs, while simultaneously allowing cell edge WTRUs to acquire access. This procedure is illustrated in FIG. 27.

Figure 27:
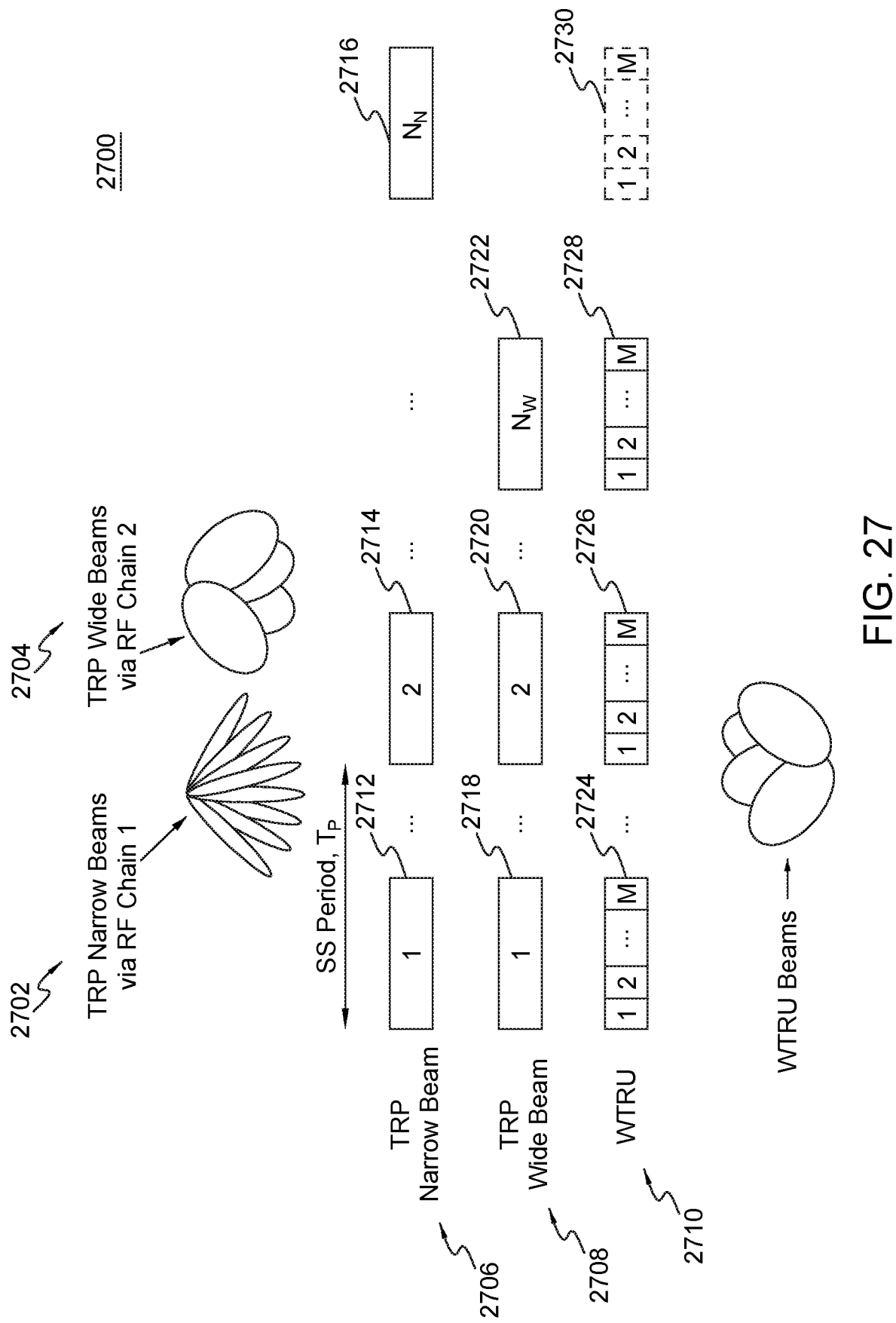
FIG. 27 is an example of a single stage multiple radio frequency (multi-RF) chain TRP beam sweep procedure.

FIG. 27 is an example of a single stage multi-RF chain TRP beam sweep 2700. In the example shown in FIG. 27, two RF chains 2702-2704 are used for the initial access procedure at a TRP. The first RF chain 2702 covers the TRP serving area using $N_N$ narrow beams 2706, while the second RF chain 2704 covers the same TRP serving area with $N_W$ wide beams 2708, where $N_W < N_N$. One or more WTRUs 2710 may then receive from all M beams during each SS burst 2712-2722. This configuration allows cell center WTRUs to finish the initial access procedure with a reduced latency as compared to cell edge WTRUs. The procedure is described in more detail as follows. A first TRP RF chain 2702 transmits one of $N_N$ beams every SS burst 2712-2716. The beam sweep period is $N_N$ bursts. A second RF chain 2704 transmits one of $N_W$ beams every SS burst 2718-2722. The beam sweep period is $N_W$ bursts. In one embodiment, $N_W < N_N$. RF chain 1 and 2 may use same, partially overlapping or completely different circuitry. With respect to the WTRU side, a WTRU cycles through all M beams during each SS burst 2724-2730. Cell center WTRUs may decide on a beam pair after $N_W$ SS bursts. Cell edge WTRUs may decide on a beam pair after $N_N$ SS bursts. WTRUs may decide to search for wide or narrow TRP beam based on various criteria, for example, information from an anchor TRP, an initial signal power measurement, or the like.

MIMO and multi-beam transmission may be enabled for initial access and in one embodiment, grant-free transmissions may be enabled for MIMO and beamforming for PBCH and subsequent DL transmission. At least one set of beamforming parameters may be provided, determined, configured, and/or known, for example, by specification. A configuration may be provided and/or transmitted, for example, by a gNB, via signaling such as broadcast or dedicated signaling. A configuration may be received by a WTRU.

A precoder may be used herein as a non-limiting example of a beamforming parameter. Some other examples include an antenna port, for example, a CSI-RS port, a set of antenna ports, a beam ID, a set of beam IDs, or the like. In the embodiments and examples described herein any other beamforming parameter may be substituted for precoder and still be consistent with one or more embodiments herein.

A WTRU may choose at least one precoder, for example, $W_1$ or $W_2$, from a set of precoders. A WTRU may choose a first precoder from a first set of precoders. A WTRU may choose a second precoder from a second set of precoders. The first and second set may be the same or different. A WTRU may choose a precoder that may be a preferred or recommended precoder. A WTRU may signal or indicate at least one precoder that it chooses, for example to a gNB.

A WTRU may choose a precoder for a broadcast transmission such as for a broadcast channel, for example, PBCH. A WTRU may use a first precoder for a first reception of a broadcast channel. The WTRU may determine or may know the first precoder in advance of use. The first precoder may be a default precoder that may be known by the WTRU.

The WTRU may determine the first precoder from at least one synchronization channel for example from at least one of: a time and/or frequency positions, for example, relative positions, of a first and second synchronization channel; a payload associated with a synchronization channel; or a sequence of a synchronization channel.

The WTRU may use the first precoder, for example until instructed to use another precoder. A WTRU may indicate a precoder, for example, a preferred precoder, for example for a broadcast channel. A WTRU may indicate a precoder to a gNB. The WTRU may indicate a precoder in a grant-free access that WTRU may make, for example before or without establishing an RRC connection. The WTRU may indicate a precoder in a grant-free access that WTRU may make, for example before or without establishing an RRC connection with the gNB.

A grant-free access may be a transmission using resources in time and/or frequency without a grant, for example, an explicit grant. A grant free access may be or include a random access such as a 2-step or 4-step random access. A grant-free access may be or include a 1-step transmission or a 1-step random access, for example, message 1 or only message 1 of a random access procedure.

The resources and/or preambles that may be used for the grant-free access may be configured via the broadcast channel or system information. A grant-free access may include transmission of at least one of the following: a preamble, control information, and/or a data payload. A WTRU may use a preamble, control information, and/or a data payload to indicate a selected precoder. A WTRU may expect a response or acknowledgement to a grant free access and/or to the information conveyed by the grant-free access. Alternatively, a WTRU may not expect a response or acknowledgement to a grant free access such as a grant free access that may be used to indicate a beamforming parameter.

A gNB may receive a precoder indication, for example from a WTRU. A gNB may receive a precoder indication via a grant-free access. A gNB may receive a precoder indication for a broadcast channel. A gNB may use the precoder for semi-open loop MIMO applied to a broadcast channel.

A gNB may receive a first precoder indication from a first WTRU and a second precoder indication from a second WTRU. The gNB may determine a precoder to use, for example for a broadcast channel based on the first precoder indication and the second precoder indication. The gNB may use the determined precoder, for example for the transmission of the broadcast channel.

In an example, the determined precoder may be a compromise between the first precoder and the second precoder. In another example, the first precoder may be used sometimes and the second precoder may be used sometimes. For example the gNB may cycle through a set of indicated precoders it receives from a set of WTRUs that may provide the indications on the same beam or beam set or from the same or similar direction. The gNB may alternate between a first and second indicated precoders.

A gNB may indicate a beamforming parameter such as a precoder in a response to a grant free access. The response may be via DL control information (DCI) or a DL data channel that may have an associated DCI that may indicate the resources of the DL data channel. The DCI may use a common RNTI. A WTRU may monitor for the common RNTI to receive the DCI and/or DL data.

A synchronization (sync) channel or set of synchronization channels may be used to indicate the precoder that may be used for the broadcast channel. The gNB may modify the sync channel or set of sync channel when it modifies the precoder for the broadcast channel. The modification may be to a sync channel sequence, the time and/or frequency positions, for example, using relative positions, of a first and second synchronization channel, and/or to a payload associated with a synchronization channel.

A first broadcast channel may be used to indicate the precoder and/or precoder cycling pattern that may be used for a second broadcast channel. The indication may be provided in the payload carried by the first broadcast channel.

A WTRU may use an indicated precoder and/or precoder cycling pattern for reception of a channel such as a secondary broadcast channel. The indication may be provided by a gNB. A WTRU may use a selected precoder for reception of a channel such as a broadcast channel or secondary broadcast channel. The selected precoder or precoder cycling pattern may be one that the WTRU indicated, for example in a grant-free access. The selected precoder or precoder cycling pattern may be one that the WTRU indicated, for example to a gNB.

In an example, a WTRU may use a first precoder to receive a channel such as a broadcast channel. The WTRU may use a second precoder to receive a channel, for example when reception with a first precoder may not be successful or to receive a secondary broadcast channel.

The first precoder or second precoder may be a precoder selected by the WTRU. The WTRU may use the first or second precoder after indicating the first or second precoder (e.g., to a gNB and/or in a grant-free access). The second or first precoder may be an initial precoder, a default precoder, a configured precoder, or an indicated precoder. A WTRU may use grant-free transmission to feedback at least one of the following: precoder, for example, $W_1$ for long-term statistics; precoder, for example, $W_2$ for short-term statistics or instantaneous channel condition; analog beamformer, for example, beam ID or a set of beam IDs; beam pair link or beam pair link set; antenna port or virtual antenna port, e.g., CSI-RS port or a set of CSI-RS ports; beam-location profile(s); ACK/NACK that responds to beam(s); WTRU beam correspondence or reciprocity; or the like.

A length-72 DMRS sequence may be generated in the case of a time duplicated sequence DMRS. This sequence may then be mapped to 72 REs DMRS of first OFDM symbol and then copied over to the second OFDM symbol. If QPSK modulation is used, length 144 sequence is generated converted to 72 QPSK symbol and mapped to all the REs of each OFDM symbol. If BPSK modulation is used, a length 72 sequence may be generated and mapped to all the REs of each OFDM symbol. In this configuration as only one sequence is generated, it may carry the SS block time index (SBTI). The terms SS block ID, SS block index and SS block time index may be used interchangeably. Different ways of SBTI indication are disclosed. As each DMRS RE is repeated in time, for a second OFDM symbol, and hence a residual CFO estimation may be performed and corrected. However, a reduced length of a sequence may reduce the detection performance of SBTI. Similar to using channel estimation to perform pre-equalization of these symbols being difficult outside of NR-PSS/NR-SSS bandwidth. This may force receiver to perform non-coherent detection and hence reducing performance.

For example, in a frequency duplicated sequence DMRS configuration, a length-72 DMRS sequence may be generated (S(1:72)). This is then mapped center 12 RB on both OFDM symbols of NR-PBCH. This same sequence also copied to the rest of the 12 RB (outside of SS Bandwidth). This may be done in few different ways.

Figure 29:
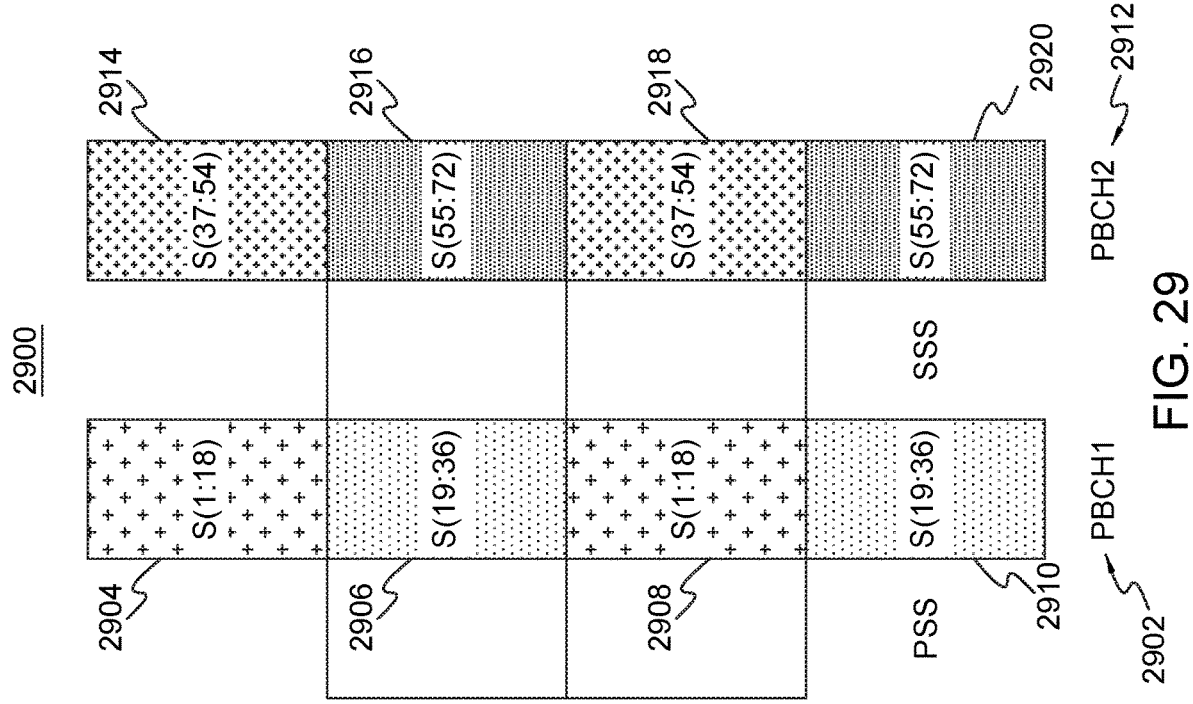
FIG. 29 is another example illustration of a bit pattern frequency swapped repetition.
Figure 28:
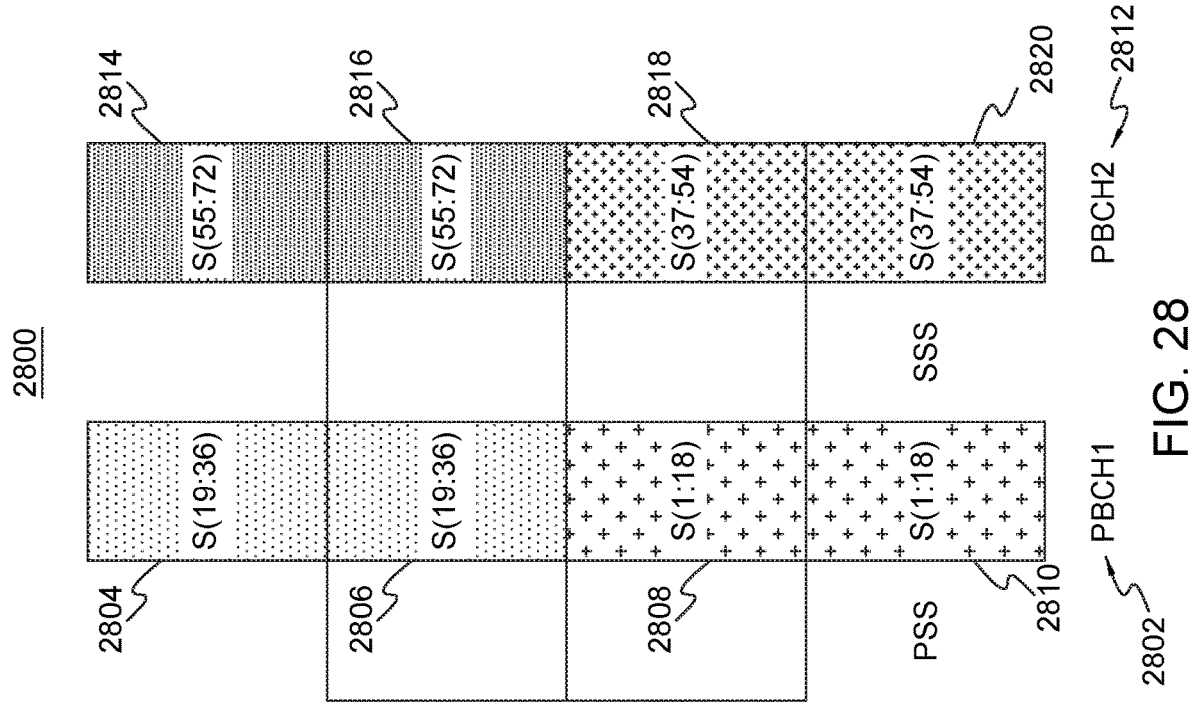
FIG. 28 is an example of a simple bit pattern frequency repetition.

FIGS. 28 and 29 show a frequency repetition or a frequency swapped repetition 2800, 2900. In FIG. 28, on PBCH1, bits S(19:36) 2802-2804 are found twice. The same is true with bits S(1:18) 2808-2810. On PBCH2, a similar ordering may be found. In this example, bits S(55:72) 2814-2816 are repeated twice along with bits S(37:54) 2818-2820. FIG. 28 provides repetition in the frequency domain but not in the time domain.

FIG. 29 is another example 2900 of frequency repetition. In FIG. 29, PBCH1 2902 convey bits S(19:36) 2906 inbetween bits S(1:18) 2904 and bits S(1:18) 2908. Adjacent bits S(1:18) 2908 is another instance of bits S(19:36) 1910. On PBCH2 2912, bits S(55:72) 2916 are found between bits S(37:54) 2914 and bits S(37:54) 2918. Adjacent bits S(37:54) 2918 are bits S(55:72) 2920. Frequency swapping may generate more diversity. It may also be possible to perform a frequency and/or time swap repetition in different ways.

Some exemplary embodiments 3000, 3100 are illustrated in FIGS. 30 and 31. In FIG. 30, on PBCH1 3002, bits S(19:36) 3006 are located inbetween bits S(55:72) 3004 and S(1:18) 3008. Adjacent to bits S(1:18) 3008 are bits S(37:54) 3010. PBCH2 3012 is comprised of bits S(55:72) 3016 located in between bits S(19:36) 3014 and bits S(37:54) 3018. Bits S(37:54) 3018 are located adjacent bits S(1:18) 3020. In this way, redundancy is provided in time domain and frequency interleaving is applied.

FIG. 31 is a similar example to that of FIG. 30. In FIG. 31, on PBCH1 3102, bits S(19:36) 3106 are located inbetween bits S(37:54) 3104 and S(1:18) 3108. Adjacent to bits S(1:18) 3108 are bits S(55:72) 3110. PBCH2 3112 is comprised of bits S(55:72) 3116 located in between bits S(1:18) 3014 and bits S(37:54) 3118. Bits S(37:54) 3118 are located adjacent bits S(19:36) 3120. FIG. 31 reverses bit ordering of FIG. 30 in such a way that higher numbered bits 3004 and 3014 of FIG. 30 are moved to opposite frequency ends 3110, 3120 of FIG. 31. This is similar with respect to bits S(37:54) 3002 and S(1:18) 3020 of FIG. 30 with S(37:54) 3104 and S(1:18) 3114 of FIG. 31.

A potential feature of these configurations is that only the center RE may need be decoded to find the SBTI. If it is known that a channel condition is good, based on NR-PSS/NR-SSS detection, these configurations may reduce the SBTI detection complicity. In this configuration NR-PSS/NR-SSS may be used for the pre-equalization for the coherent detection of a sequence carried on the center RBs. For the RBs outside of NR-SS bandwidth, non-coherent detection may have to be performed. They may be combined with coherent detection of center RBs.

NR-PSS and NR-SSS may occupy only N REs, for example, N=127 REs in the center instead of all 144 REs of 12 RBs. Hence, good channel estimation may be performed only for 31 REs in one OFDM symbol or a total of 62 REs in two OFDM symbols. Extrapolation of the channel estimates may not perform very well. Also, this method may not allow the sub-carriers to be repeated in time and hence residual CFO estimation is not possible. Hence a modified method may be used additionally or in combination.

In one embodiment, a length-62 DMRS sequence may be mapped to the central 12 RBs on the sub-carrier which are overlapping with NR-PSS/NR-SSS, and a repeated sequence is mapped the remaining 12 RBs. FIG. 32 shows a length 62 sequence with repetition in frequency. An exemplary illustration of a PBCH1 3202 and PBCH2 are shown. Areas marked with x 3204-3216 are areas where a payload may be transmitted. Shaded areas of FIG. 32 represent REs and a sequence for PBCH DMRS, but not a payload. DMRS sub-carriers 3204-3216 are populated with symbols which are repeated in a second OFDM symbol of NR-PBCH on DMRS REs. Because of asymmetry, the upper band (outside of SS bandwidth) has 2 such REs and the lower band (outside of SS bandwidth) has 3 such REs in each OFDM symbol. They may be used for CFO compensation and channel estimation. In regions outside the NR-SS bandwidth these sub carriers may be distributed more evenly. This length 62 scheme may also have different configurations, for example, time and frequency swapping, as illustrated in FIGS. 28-31. As shown in FIG. 32, shaded areas 3218-3236 may carry a sequence for PBCH DMRS. PBCH2 contains payload elements 3240-3252 and bits used for DMRS 3254-3270. In this way, payload elements may be interleaved with DMRS.

All the schemes described above had only single sequence containing the information about SBTI. Hence, for channel estimation using these DMRS is only possible after the SBTI is decoded. Hence to coherently decode SBTI, only information within SS-Bandwidth may be used. To overcome this issue, another design is disclosed. In this design, there are two sequences used. The first sequence is mapped on DMRS REs of first OFDM symbol of NR-PBCH. The second sequence is mapped on DMRS REs of the second OFDM symbol NR-PBCH.

A first sequence is generated using a Cell ID. For convenience, this is referred to as reference-DMRS. A Cell ID may be determined from the detection of NR-PSS/NR-SSS. Using the Cell ID, the first sequence may be determined. Channel estimation may be performed on those REs using the knowledge of the sequence. These channel estimates may be used to pre-equalize DMRS REs or sub-carriers. The second sequence depends on SBTI only or depends jointly on Cell ID and SBTI. As this sequence is used for indicating SBTI, as used herein the term indication-DMRS is used to refer to this sequence. After coherently detecting the second sequence, the SBTI may be decoded. This sequence may be a function of a number of variables.

In another variation of a similar concept, a known base sequence may be generated. The base is modified using the Cell ID to generate a sequence for reference-DMRS. The sequence may also be modified using SBTI to generate a sequence for indication-DMRS. The reference-DMRS is used for pre-equalization and coherently estimating the indication-DMRS and hence detecting SBTI.

These modifications as function of SBTI may be performed using some of the following ways: different initialization of linear feedback shift register (LFSR) for an M-Sequence of a gold code; a frequency or circular shift of an M sequence of a gold code; a frequency or circular shift of a gold sequence; a cyclic shift; and performing scrambling on top of original sequences.

Once NR-PSS and NR-SSS are detected, they may be used as a known sequence for channel estimation and pre-equalization for the central RBs, it may be possible to use the reference-DMRS on only RBs (or sub-carriers) not occupied by the NR-PSS/NR-SSS. Hence the indication-DMRS are mapped on first and second OFDM symbol of NR-PBCH for the bandwidth that overlaps with NR-PSS and NR-SSS. This may increase the length of a sequence used for indication-DMRS and may improve the performance of indication-DMRS.

In the design above, the first sequence is mapped on the first OFDM symbol of NR-PPBCH and second sequence is mapped on the second OFDM symbol. It also may be possible to alternate the two sequences within one OFDM symbol. Hence the sequence is mapped on DMRS REs of alternating OFDM symbols of NR-PBCH. This may improve the channel estimation performance using one of the sequences. It may also improve diversity for the second sequence and hence the detection performance of SBTI. This pattern is illustrated in FIG. 33 which shows an NR-PBCH DMRS distribution of two sequences in a comb pattern.

FIG. 33 is an example 3300 of an NR-PBCH DMRS distribution of two sequences in a comb pattern. In FIG. 33, r1 3304-3310 shows the REs where the reference-DMRS are mapped and r2 3312-3316 shows the REs where indication DMRS are mapped. With reference to NR-PBCH1 3302, r1 3304-3310 are dispersed between r2 3312-3316. With reference to NR-PBCH2 3318, r1 3320-3324 are dispursed inbetween r2 3326-3332.

This comb pattern may be use to transmit reference-DMRS and indication-DMRS. In one design, reference-DMRS sequence may be generated using Cell ID only. This may then be modified using SBTI to generate indication DMRS sequence.

In another option, a known base sequence is generated. This sequence is modified using the Cell ID to generate sequence for reference-DMRS. The base sequence is also modified using SBTI to generate sequence for indication-DMRS.

Like the simple pattern case, a different modification as a function of SBTI may be performed in one or more of the following ways: a different initialization of a Linear Feedback Shift Register (LFSR) for an M-Sequence of a gold code; a frequency or circular shift of an M sequence of a gold code; a frequency or circular shift of a Gold sequence; a cyclic shift; and/or a scrambling on top of one or more original sequences.

Like the simple pattern case, NR-PSS and NR-SSS may be used for channel estimation and pre-equalization for the central RBs. It is possible to use the reference-DMRS only on the RBs (or sub-carriers) not occupied by the NR-PSS/NR-SSS. Hence the indication-DMRS are mapped on a first and second OFDM symbol of NR-PBCH for the bandwidth that overlaps with NR-PSS and NR-SSS. This may increase the length of a sequence used for indication-DMRS and hence may improve the performance of indication-DMRS.

Short LFSR gold sequences may be implemented with shift registers. In this way, different length shift registers may be used to generate the gold sequence. For example, if short length lf LFSR of length 7 is used:

$c(n)=(x_1(n)+x_2(n))\bmod 2$ $x_1(n+7)=(x_1(n+4)+x_1(n))\bmod 2$ $x_2(n+7)=(x_2(n+1)+x_2(n))\bmod 2$ One or both the m-sequences may be initialized with the state x(0)=0, x(1)=0, x(2)=0, . . . ,x(5)=0 x(6)=1. If only one LFSR is initialized with [00001], another LFSR may be initialized using SS Block Time index or Cell ID or combination of both.

A long LFSR Gold sequence may be used in addition or combination. A long LFSR gold sequence may also be generated via a longer shift register and a shift (Nc) while selecting the output may be used to select the part of gold sequence of desired length.

$c(n)=(x_1(n+N_C)+x_2(n+N_C))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$ Nc may be defined as an integer. For eg: $N_C$=1600.

A very long LFSR gold sequence, for example of length 64, may also be generated by longer shift register and a shift (Nc) while selecting the output may be used to select the part of gold sequence of desired length.

$c(n)=(x_1(n+N_C)+x_2(n+N_C))\bmod 2$ $x_1(n+63)=(x_1(n+1)+x_1(n))\bmod 2$ $x_2(n+63)=(x_2(n+38)+x_2(n+13)+x_2(n+1)+x_2(n))\bmod 2$ In this example, n=01, 2, 3 . . . . $N_{RE}^{DMRS}$−1. Here Nc may be much larger integer number and may be found experimentally to find good correlation sequences.

Any of the above sequences may have scrambling applied on top before modulation (BPSK/QPSK). The scrambling code may be generated from similar length LFSR.

Cyclic shifts may be applied to any of the Gold sequences after modulation (BPSK/QPSK).

A cyclic shift may be of the form $$seq_{cs}(m) = seq(m) \times e^{\frac{2\pi m \times i}{M}},$$

where m=0, 1, . . . M−1 and i is the shift index. In this example, seq is the original modulated sequence and seq, is the sequence with cyclic shifts.

Modulation is used for the sequences and all of the above sequences may be BPSK or QPSK modulated.

Using BPSK, r(m)=(1−2·c(m)) m=0, 1, . . . , $N_{RE}^{PBCH}$−1.

Using QPSK, every two bits may be combined into one symbol $$r(m) = \frac{1}{\sqrt{2}}(1 - 2\cdot c(2m)) + j\frac{1}{\sqrt{2}}(1 - 2\cdot c(2m+1)),$$

$m = 0, 1, \ldots, N_{RE}^{PBCH} - 1.$

Bits which are at a $N_{RE}^{PBCH}$ distance apart, may be combined into one symbol, $$r(m) = \frac{1}{\sqrt{2}}(1 - 2\cdot c(2m)) + j\frac{1}{\sqrt{2}}(1 - 2\cdot c(m + N_{RE}^{PBCH})),$$

$m = 0, 1, \ldots, N_{RE}^{PBCH} - 1.$

In an embodiment, a NR-PBCH DMRS time block ID indication/detection may be implemented. A different initialization of M-Sequence LFSR may be performed.

As an example, consider the gold code defined by:

$c(n)=(x_1(n)+x_2(n))\bmod 2$ $(n+7)=(x_1(n+4)+x_1(n))\bmod 2$ $x_2(n+7)=(x_2(n+1)+x_2(n))\bmod 2$ x1 is first m sequence and x2 is second m sequence to generate the gold code. The LFSR to generate one or both m-Sequences x1, x2 used to generate the gold code may be initialized using SBTI or Cell ID or combination of both or combination of even more number of variables such as RNTI, slot number, cell ID, half frame.

Different examples of these initializations are enumerated below:

Option 1: $c_{int}=N_{ID}^{cell}$. Option 2: $c_{int}=\bmod(N_{ID}^{cell},x)$, where x is a known integer. Option 3: $c_{int}=2^x\,N_{ID}^{cell}-1$ (x is an integer <$L_{lfsr}$-1-10), as 10 bits are used to indicate $N_{ID}^{cell}$. Option 4: $c_{int}=2^x\cdot(2\cdot N_{ID}^{cell}+1)+2\cdot sbti-1$. Option 5 may be more generalized option of option 5. $c_{int}=2^{x1}\cdot(x2\cdot N_{ID}^{cell}+x3)+x4\cdot sbti+x5$, where x1 to x5 may be determined imperially to have best correlation properties. More options are also possible.

It may also be possible to generate two different gold sequences using two different initializations. For Example, a first shift resulting in reference-DMRS may be used for pre-equalization and another shift resulting in indication-DMRS may be used for indicating the SBTI.

If only one sequence is used, partial coherent/partial non-coherent detection may be performed. Different hypothesis of gold sequences be generated (using different initialization of M sequences) at the receiver to detect SBTI.

A frequency or circular shift of individual M sequence may be applied.

$c(n)=(x^{m0}_1(n)+x^{m1}_2(n))\bmod 2$ $x_1(n+7)=(x_1(n+4)+x_1(n))\bmod 2\;\; x_1^{(m0)}(n)=x_1((n+m0)\bmod L)$ $x_2(n+7)=(x_2(n+1)+x_2(n))\bmod 2$ where $x_2^{(m1)}(n)=x_2((n+m1)\bmod L)$ Circular shift values m0,m1 are jointly or individually determined by a Cell ID and/or SBTI. Knowing the relations between the Cell ID SBTI and m0, m1, and the knowledge of Cell ID from detection of PSS/SSS, a hypothesis may be generated for SBTI, and may be used to detect which SBTI was indicated in the gold code.

It may be possible to generate two different gold sequences using two different circular shifts in M sequences. First shift resulting in reference-DMRS used for pre-equalization and another shift resulting in indication-DMRS used for indicating the STBI. If only one sequence is used, partial coherent/partial non-coherent detection may be performed. Different hypothesis be generated (using different frequency shift of individual M-Sequences) at the receiver to detect STBI.

A frequency or circular shift of a gold sequence may be:

$r=c((n+m0)\bmod L)$ $c(n)=(x_1(n)+x_2(n))\bmod 2$ $x_1(n+7)=(x_1(n+4)+x_1(n))\mod 2$ $x_2(n+7)=(x_2(n+1)+x_2(n))\mod 2$ Circular shift values m0 may be determined by the Cell ID and/or SBTI. Knowing the relations between the Cell ID SBTI and m0, and the knowledge of Cell ID from detection of PSS/SSS, a hypothesis may be generated for SBTI. And detect which SBTI was indicated by the gold code. This is a special case of the 'Circular shift of individual M sequence' where both sequence have same shift. (m0=m1).

It may be possible to generate two different gold sequences using two different circular shifts in frequency. One used for pre-equalization and another for indicating the SBTI.

If only one sequence is used, partial coherent/partial non-coherent detection may be performed. A different hypothesis may be generated, for example using a different frequency shift of this gold sequence, at the receiver to detect STBI.

FIG. 34 is an example 3400 of DMRS and STBI indication using cyclic shifts. FIG. 35 is an example 3500 of DMRS and STBI indication using cyclic shifts in a comb pattern. Cyclic shift techniques may be employed and some examples are illustrated herein. A first sequence (Reference DMRS) is generated using following procedure: An initial value $c_{int}$ may be used to generate a sequence c of length 144 $(6N_{RB}^{PBCH}-1)$. The demodulation reference-signal for first OFDM symbol of NR-PBCH $r_1^{pbch}(m)$ are QPSK modulated and is defined by:

$$r_1^{pbch}(m) = \frac{1}{\sqrt{2}}(1-2\cdot c(2m)) + j\frac{1}{\sqrt{2}}(1-2\cdot c(2m+1)),$$

$$m = 0, 1, \ldots, 6N_{RE}^{PBCH}-1$$

In the above equation, $N_{RB}^{PBCH}=24$ denotes the assigned bandwidth in resource blocks of the NR-PBCH transmission. The pseudo-random sequence c(i) is may be defined according to one or more embodiments described herein.

A second sequence (Indication DMRS) is generated using following procedure: The demodulation reference-signal for a second OFDM symbol of NR-PBCH is generated with cyclic shifts to the sequence of first symbol.

$$r_2^{pbch}(m) = r_1^{pbch}(m) \times e^{\frac{2\pi m \times sbti}{2^k}}$$

$$m = 0, 1, \ldots, 3N_{RB}^{PBCH}-1$$

$$sbti = 0, 1, \ldots, 2^k-1$$

In this example, k=2 or 3 depending on how many bits needs to be indicated for SS Block timing index. These sequences may be mapped in a simple pattern of a comb pattern. Due to the circular nature of cyclic shifts, every 8th tone of both the reference-DMRS and indication-DMRS will be identical. This property be used to estimate CFO at the receiver and the cyclic shift may be used to estimate the SBTI.

The CFO estimation may be performed using:

$$rCfo = fc \times \text{mean}\left(\arctan\left(\frac{RE_{bpch1}}{RE_{pbch2}}\right)\right) \times \frac{2}{\pi \times \Delta nOFDM},$$

where fc is carrier frequency, ΔnOFDM=2 (distance been two OFDM symbols). This property illustrated below.

As an example $$e^{\frac{2\pi m \times [0-7]}{8}}$$

for m=0:17 is shown in FIG. 36.

The 8 rows (rows 0-8) shown in FIG. 36 represent different cyclic shifts used to indicate a different SBTI. Different columns are used to show values of a multiplier used for DMRS REs. These cyclic shifts are orthogonal to each other.

The cyclically shifted DMRS may also be taken to the time domain. The phase shift in frequency domain translates to time-index-offset in time domain. This may result in faster detection of SBTI (without multiple hypothesis testing).

Hence a ratio of $(DMRS_{pbch2}/DMRS_{pbch1})$ is a differential estimation free of channel (if channel hasn't changed much from one symbol to other). IFFT of these ratios for each STBI are time shifted version of each other. Hence coherent detection of SBTI may be performed quickly and with lower complexity.

A scrambling sequence, which may be a function of SBTI, may be applied to the reference-DMRS to generate indication-DMRS. Using the scrambling pattern known at receiver, hypothesis to find SBTI may be generated and hence SBTI may be detected.

The transmit power of REs for PBCH DMRS could be higher than that of REs for PBCH data. To achieve this, power boosting with a known factor could be applied for PBCH DMRS transmission. Knowledge of this factor at receiver may be important.

Although the features and elements of the present invention are described in the preferred embodiments in particular combinations, each feature or element can be used alone without the other features and elements of the preferred embodiments or in various combinations with or without other features and elements of the present invention. Although each one of the beams shown in the FIGs may be illustrated as to a particular direction, it should be kept in mind that this is for illustration purposes and a limitation with respect to a particular beam format, width or orientation is not intended.

Although the embodiments described herein consider LTE, LTE-A, New Radio (NR) or 5G specific protocols, it is understood that the embodiments described herein are not restricted to this scenario and are applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a wireless transmit/receive unit (WTRU), the method comprising:
   demodulating a payload of a physical broadcast channel (PBCH) transmission, using a demodulation reference signal (DMRS), in at least a second, in time, OFDM symbol, and a fourth, in time, OFDM symbol of a synchronization signal block (SSB), wherein the DMRS is located in same subcarriers in the second, in time, OFDM symbol and the fourth, in time, OFDM symbol and is interleaved in frequency with the payload of the PBCH;
   wherein the SSB includes a primary synchronization signal (PSS) in a first, in time, OFDM symbol of the SSB and a secondary synchronization signal (SSS) in a third, in time, OFDM symbol of the SSB;
   wherein the SSB spans only the first, in time, OFDM symbol, the second, in time, OFDM symbol, the third, in time, OFDM symbol and the fourth, in time, OFDM symbol;
   wherein the PSS and the SSS span a same frequency spectrum and the PBCH spans a wider frequency spectrum than the PSS and the SSS.

2. The method of claim 1, further comprising demodulating the payload of the PBCH using the PSS and/or the SSS and the DMRS.

3. The method of claim 1, wherein the subcarriers in which the DMRS is placed are based on a cell identification (ID).

4. The method of claim 3, wherein the DMRS is derived from a scrambling sequence based on the cell ID and an SSB index.

5. The method of claim 1, wherein the DMRS is based on a gold sequence used by the WTRU as a reference signal (RS) for PBCH demodulation and for SSB time index detection.

6. The method of claim 4, wherein 2 bits are used as an SSB index.

7. The method of claim 4, wherein 3 bits are used as an SSB index.

8. The method of claim 1, wherein the SSB spans only the first, in time, OFDM symbol, second, in time, OFDM symbol, third, in time, OFDM symbol and fourth, in time, OFDM symbol.

9. A wireless transmit/receive unit (WTRU) comprising:
   a demodulator configured to use a demodulation reference signal (DMRS) to demodulate a payload of a physical broadcast channel (PBCH) transmission in at least a second, in time, OFDM symbol and a fourth, in time, OFDM symbol of a synchronization signal block (SSB), wherein the DMRS is located in same frequency locations in the second, in time, OFDM symbol and the fourth, in time, OFDM symbol and is interleaved in frequency with the payload of the PBCH;
   wherein the SSB includes a primary synchronization signal (PSS) in a first, in time, OFDM symbol of the SSB and a secondary synchronization signal (SSS) in a third, in time, OFDM symbol of the SSB, wherein the DMRS is located in same frequency locations in the second, in time, OFDM symbol and the fourth, in time, OFDM symbol and is interleaved in frequency with the payload of the PBCH;
   wherein the SSB spans only the first, in time, OFDM symbol, the second, in time, OFDM symbol, the third, in time, OFDM symbol and the fourth, in time, OFDM symbol;
   wherein the PSS and the SSS span a same frequency spectrum and the PBCH spans a wider frequency spectrum than the PSS and the SSS.

10. The WTRU of claim 9, wherein the demodulator is configured to demodulate the payload of the PBCH using the PSS and/or the SSS and the DMRS.

11. The WTRU of claim 9, wherein subcarriers in which the DMRS is placed are based on a cell identification (ID).

12. The WTRU of claim 11, wherein the DMRS is derived from a scrambling sequence based on the cell ID and an SSB index.

13. The WTRU of claim 9, wherein the DMRS is based on a gold sequence used by the WTRU as a reference signal (RS) for PBCH demodulation and for SSB time index detection.

14. The WTRU of claim 12, wherein 2 bits are used as an SSB index.

15. The WTRU of claim 12, wherein 3 bits are used as an SSB index.

16. A wireless transmit/receive unit (WTRU) comprising:
   a receiver configured to receive a synchronization signal block (SSB), wherein the SSB includes:
   a primary synchronization signal (PSS) located in a first, in time, orthogonal frequency division multiplexing (OFDM) symbol of the SSB;
   physical broadcast channel (PBCH) information located in at least a second, in time, OFDM symbol of the SSB and a fourth, in time, OFDM symbol of the SSB, wherein a demodulation reference signal (DMRS) is located in same frequency locations in the second, in time, OFDM symbol and the fourth, in time, OFDM symbol and is interleaved in frequency with a payload of the PBCH; and
   a secondary synchronization signal (SSS) located in a third, in time, OFDM symbol of the SSB;
   wherein the SSB spans only the first, in time, OFDM symbol, the second, in time, OFDM symbol, the third, in time, OFDM symbol and the fourth, in time, OFDM symbol;
   wherein the PSS and the SSS span a same frequency spectrum and the PBCH spans a wider frequency spectrum than the PSS and the SSS.

* * * * *